US008084117B2

(12) United States Patent (10) Patent No.: US 8,084,117 B2
Lalvani (45) Date of Patent: Dec. 27, 2011

(54) MULTI-DIRECTIONAL AND VARIABLY EXPANDED SHEET MATERIAL SURFACES

(76) Inventor: Haresh Lalvani, New York, NY (US)

( * ) Notice: Subject to any disclaimer, the term of this patent is extended or adjusted under 35 U.S.C. 154(b) by 956 days.

(21) Appl. No.: 11/288,462

(22) Filed: Nov. 29, 2005

(65) Prior Publication Data

US 2007/0122590 A1    May 31, 2007

(51) Int. Cl.
*B32B 3/24* (2006.01)
(52) U.S. Cl. ............ 428/136; 428/135; 52/671; 52/670; 52/635
(58) Field of Classification Search .................. 428/136, 428/135; 52/671, 670, 635
See application file for complete search history.

(56) References Cited

U.S. PATENT DOCUMENTS

| | | | |
|---|---|---|---|
| 297,382 A | 4/1884 | Golding | |
| 320,242 A | 6/1885 | Golding et al. | |
| 527,242 A | 10/1894 | Golding | |
| 1,332,030 A | 2/1920 | Collinson | |
| 221,807 A | 4/1938 | Miller | |
| 2,570,692 A | 10/1948 | Knight | |
| 2,556,071 A * | 6/1951 | Denton | 428/134 |
| 2,800,423 A * | 7/1957 | De Swart | 428/136 |
| 2,989,145 A | 6/1961 | Goodloe | |
| 3,297,461 A * | 1/1967 | Siddall | 428/136 |
| 4,124,925 A | 11/1978 | Barnett | |
| 4,259,385 A | 3/1981 | Keller | |
| 4,262,059 A * | 4/1981 | Frankowski | 428/597 |
| 4,734,337 A | 3/1988 | Patton | |
| 4,881,307 A | 11/1989 | Gaissmaier | |
| 5,188,874 A * | 2/1993 | Kauffman et al. | 428/47 |
| 5,302,466 A | 4/1994 | Davis et al. | |
| 5,431,980 A * | 7/1995 | McCarthy | 428/116 |

OTHER PUBLICATIONS

Metalex, Company catalog, excerpts from website <www.metlx.com>, 1page entitled 'Process', 2 pages entitled 'Products' (Intermediate Meshes, Small mesher), 1 page entitled 'Micromesh'—total 4 pages.
Expanded Metal Company, U.K., excerpts from website <www.expandedmetalfencing.com>, 2 pages entitled 'History', 3 pages entitled 'Mesh References'—total 5 pages.

* cited by examiner

*Primary Examiner* — William P Watkins, III

(57) ABSTRACT

Expandable surfaces made from sheet materials with slits distributed on the surface of sheet material where the surfaces expand by application of force along or/and across the surface of sheet material. The unexpanded surfaces are flat sheets, or closed surfaces like cylinders, spheres, tubes, or custom-designed organic shapes marked with pre-formed or post-formed slit designs. The expanded surfaces can be single units or modules which can be attached to one another through various means. The sheet materials range from hard surfaces like metals, to softer materials like papers and plastics, or pliable materials like fabrics, rubbers, synthetic surfaces or bio-surfaces. The slits are arranged in patterns ranging from periodic, non-periodic to irregular designs. The slits can be straight, bent, curved or irregularly shaped with even or uneven spacing. Slitting can be achieved by digital cutting or punching devices like laser-cutting, water-jet cutting, digital punching, automated dies, etc. or pre-formed when casting the sheet material. Force can be applied manually with tools or through the use of machines and special set-ups. Applications range from architectural surfaces, walls, ceilings, panel systems, structures and sculpture. On a smaller scale, applications include containers, packaging material, fabrics and human wear. On micro- to nano-scale, applications range from expandable surfaces for gauzes, band-aids, stent designs, skin grafts, semi-permeable membranes and microfilters for various industries including purification of fluids and chemical substances.

26 Claims, 42 Drawing Sheets

MULTI-DIRECTIONAL AND VARIABLY EXPANDED SHEET MATERIAL SURFACES

FIELD OF INVENTION

This invention deals with the application of expandable sheet materials for building products ranging from architectural scale to nano-scale. More specifically, this patent deals with transforming a sheet material so it can be formed into a large variety of 3-dimensional surfaces by a variable expansion of sheet material enabled by a variety of slitting patterns distributed over the surface of the material.

BACKGROUND OF THE INVENTION

Sheet materials are surfaces in which the length and width of the material determine the over-riding dimensions of the material. Though the thickness of a sheet can be varied, it is substantially less than the other two dimensions. Examples of sheet materials include all varieties of sheet metal, paper and cardstock, textiles and architectural fabrics, various plastics and rubbers, veneers, fiberboards, aerogel, smart materials, etc. Of these, materials like metal, rigid plastics, fiberboards and veneers are relatively stiff sheets while materials like rubbers, softer plastics, aerogel and fabrics are flexible. Though sheet materials can be used in a variety of ways to make useful products, the most interesting use of such materials is to convert the 2-dimensional surface into a 3-dimensional one to perform different functions. Various ways to achieve this are known and are in practice today. These include various methods of 3-dimensional forming like pressing in a mould, rolling, bending in brake presses, attaching to a pre-formed substrate or sub-structure. Softer sheet materials can be hardened into 3-dimensional shapes by various hardening techniques and harder sheet materials can be softened till they become pliable for 3-d forming. Among the more interesting applications of sheet material is the expanded sheet concept, specifically in metal and more recently in some pliable materials, where a slitting pattern enables an expansion of the surface by applying a force like bending, pulling or stretching.

PRIOR ART

The expanded sheet metal, invented by John French Golding (U.S. Pat. Nos. 297,382, 320,242 with Durkee and U.S. Pat. No. 527,242) allows the expansion of a sheet material by parallel slitting and bending in one fabrication process. The slitting pattern comprises rows of parallel slits where alternating rows are offset in a staggered manner. The bending process introduces a 3-dimensionality to the expanded surface. The expanded sheet material covers a greater surface than the original acquires strength and has additional design advantages like porosity and transparency. Subsequent improvements on this expanded metal concept have been relatively less revolutionary and have retained the parallel slitting pattern while improving other aspects. These include: applications to different types of metals and thickness; special-case expansion so the sheet remains flat after expansion (see, for example, the brochure from the company Metalex); small-scale corrugation of an expanded sheet for an electrical resistance element (U.S. Pat. No. 1,332,030 to Collinson); a variation on the basic parallel slitting pattern by interrupting the slit offsets but retaining the parallel slits (U.S. Pat. No. 2,218,007 to E. W. Miller); introducing curved cuts in the basic parallel slitting design (U.S. Pat. No. 2,570,692 to W. F. Knight); parallel slitting with crimps (U.S. Pat. No. 2,989,145 to A. M. Goodloe); improved methods of manufacturing parallel slit expanded metal (U.S. Pat. No. 4,124,925 to F. Barnett, U.S. Pat. No. 4,881,307 to R. Gaissmaier); expanded surface with larger opening sizes (U.S. Pat. No. 4,734,337 to J. M. Patton); application to sandwich panels (U.S. Pat. No. 4,259,385 to R. N. Keller). Other improvements include the use of serrated slit edges, use of flexible materials (plastics, foam, etc.) for applications in the packaging and food industry (e.g. fruits and vegetables). Expanded sheet material, especially in metal, has been used for flat architectural surfaces, wall and ceiling panel systems, fencing material, stair treads, containers, and so on. Expanded sheet metal has also been used for making cylindrical or conical objects like bins.

All prior art in expanded sheet material is based on parallel slitting pattern and thus deals with expansion along one direction of the sheet material. Though this single directionality appears to be expedient in fabrication, it has severe limitations. One-directional expansion restricts the formation of a variety of 3-dimensionally curved surfaces, especially those having a compound curvature, i.e. curved in two directions. There are no prior examples of expanded sheets in stiff materials (like metal, for example) for making surfaces with a compound curvature. Further, expanded surfaces based on rows of parallel slits as currently used in the building art, lead to repeating patterns which are limited in many ways. They are visually limiting due to the repetition and thus less appealing from an aesthetic point of view, a criterion that is important for most designers of forms and spaces—architects, interior designers, industrial designers, sculptors, engineers and others. They are also functionally limited as they work best for uniform conditions that require uniform solutions. This is not often the case and variability in design conditions is a common phenomenon requiring a variably modeled surface, as in the design of variable transparency, variable porosity, variable strength, variable surface geometry, and so on.

SUMMARY OF THE INVENTION

These limitations in prior art will be alleviated if the sheet material were to expand in more than one direction and were to do so in a variable manner. Such multi-directional and variably expanded sheets will have a built-in ability to be formed into a large variety of 3-dimensional surfaces with a compound curvature, providing a spatial advantage over conventionally expanded sheet materials. Such 3-d surfaces include domes, saddles and other doubly- or multiply-curved surfaces, both regular and irregular. In addition, these surfaces would be aesthetically more interesting, both visually in terms of varying transparency and functionally. They will thus have a greater usefulness for designers and artists. The multiple-directions of expansion of a surface will also permit a more isotropic expansion of sheet material over its surface area since its expansion is not linear. The multi-directionally expanded surface also provides greater surface area and more edge per surface in special-case applications where it is embedded in a fluid and greater surface area is needed for exchange of materials between the expanded surface and its environment. Variably expandable surfaces exhibit a variable surface-to-volume ratio and are thus natural solutions to the design of objects with variable densities, variable volumes and variable surface areas. When the expanded gaps are filled with a filler material, the invention provides a way to fabricate smooth, continuously and variably-curved biomorphic geometries.

Accordingly, this invention discloses a class of multi-directional slitting patterns for sheet material that expands in two or more directions by expanding the slits through various means. This class of slitting patterns includes designs based on all tessellations and tiling patterns—regular, semi-regular, non-periodic and completely irregular or random, and with straight or curved edges. The single most unique property of the slitting patterns is that the slits are arranged to define relatively large polygonal regions that-remain attached to each other after expansion through small un-slit regions corresponding to vertex regions of the tiling pattern. The expansion is made possible by rotation of adjacent polygons around these vertex regions. This rotation is mirror-symmetric and is evident in tiling patterns exhibiting symmetry. In the process of rotation, the adjacent polygons rotate and counter-rotate alternately around the un-slit regions enabling the slit to expand into openings. After expansion, the expanded tiling pattern consists of closed polygonal regions attached to one another at the vertex regions (un-slit portions) and separated by openings formed by the expansion of the slits.

Another object of the invention is to enable the forming of a variety of curved 3-dimensional surfaces from a sheet material according to the multi-directional slitting patterns. The sheet material can have pre-formed slits formed during the casting process, or the slits can be inscribed in available sheet material that comes in flat sheets or rolls. The expansion of the sheet material could be even or variable.

Another object of the invention is to form 3-dimensional curved modules from multi-directional expanded sheet material that can be joined to other modules to achieve larger curved surfaces. These composite surfaces could be regular or irregular, periodic or non-periodic.

Another object of the invention is to provide a variably morphable surface out of a sheet material that can revert to its original state or change from one surface to another. This can be achieved through the application of external force, or by using shape-memory and smart materials, or by using physical, chemical, electric or other means at various scales ranging from the macroscopic to microscopic or nano scales. In addition, stretch materials like various rubbers or certain plastics can be used.

Another object of the invention is to provide a means for achieving a compound curvature in sheet material that is slit according to the slitting patterns. This includes the application of force to form the flat surface into any desired 3-dimensionally-curved surface. The force can be applied manually or through mechanically or digitally controlled machines. The force can be applied uniformly to achieve a uniform curvature or applied variably to achieve a variable curvature. Various forming devices like molds, positive and negative, or specially designed machines with curved dies, presses and rollers can be used.

Another object of the invention is to provide a means of fabricating continuous compounds surfaces (without holes) where a suitable filler material is applied to the expanded surface to fill in the gaps in the surface. The expanded surface could act as a structural core as another possibility.

Applications of the invention include the following: architectural surfaces for interior or exterior use including wall surfaces, ceilings, paneled systems, space-defining surfaces with variably-curved geometries, organically shaped enclosure systems, coverings for interior or exterior architectural elements like columns, beams, pipes, window elements, handrails; structural elements and surfaces, canopies, domes, vaults and roofs; expandable packaging materials that transform by changing the size of their openings for hard and soft objects like fruits and vegetables; textiles, expandable bags, expandable wearable items like socks, shoes, gloves, knee or elbow guards; fixed volume containers like bins and vases; furniture like stools and benches, and furniture elements like seats; expandable wrappers and protective or thermal sleeves for containers like bottles, cups, etc.; expandable band-aids and gauze material, expandable skins for grafts, expandable stents; structural reinforcement in one or more layers for cast materials; variably morphing surfaces at the micro- and nanometer scale.

Though preferred embodiments of the invention are shown here, it would be clear to those skilled in the art that variations on the theme could be derived as obvious extensions without departing from the scope of the invention.

BRIEF DESCRIPTION OF DRAWINGS

Now, referring to the drawings that are integral to the disclosure.

DETAILED DESCRIPTION OF THE INVENTION

Figure 1:
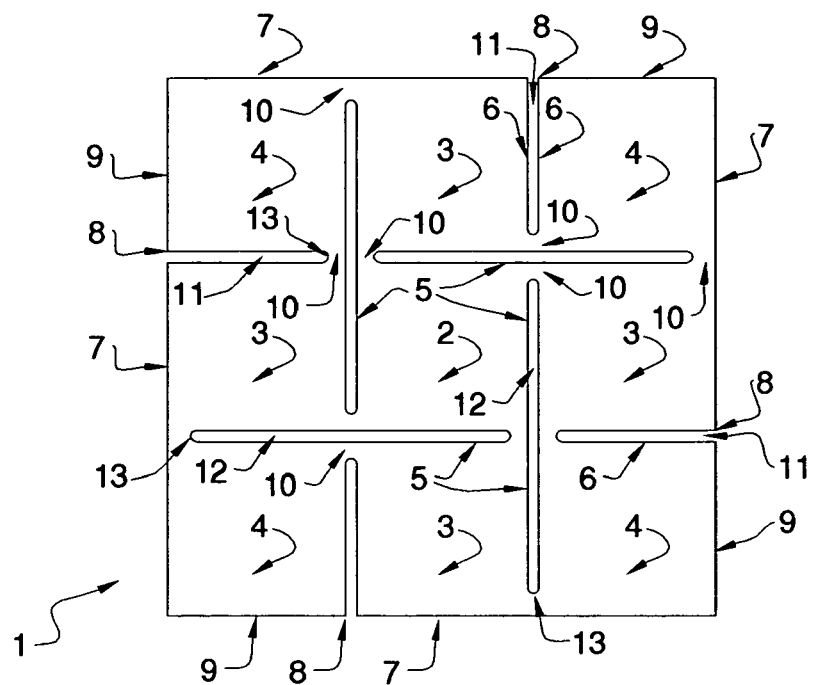
FIG. 1 shows a square-shaped surface material in two different states, a flat unexpanded state with a 3×3 square-grid slitting pattern, and the flat expanded state where the slits have expanded in the same plane.
Figure 1:
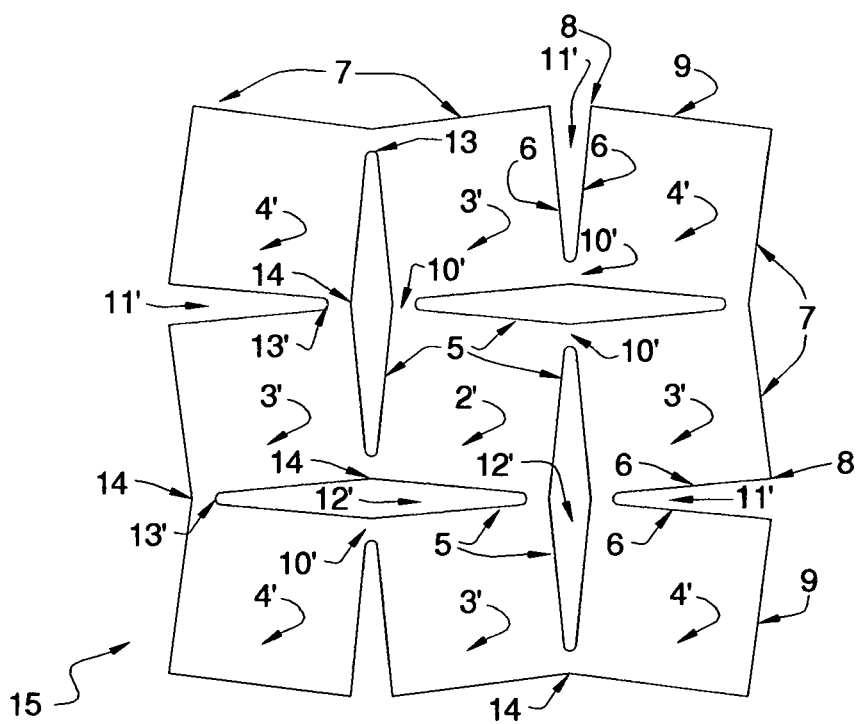

According to this invention, any sheet material can be cut or preformed in multi-directional slitting patterns and then expanded in various ways to produce useful surfaces, designs and products. The slitting patterns can be inscribed on the sheet material by various means like laser-cutting, water-jet cutting, physical dies, computer driven punches and slitting apparatus, and other techniques for cutting and piercing surfaces. Alternatively, they can be cast in the configuration of slit patterns during the casting of sheet material. The expansion can be achieved by applying external forces to the sheet material, e.g. by pulling along the surface in one or more directions from the boundary of the sheet material, or by pushing across the surface of the sheet material, or a combination of both. Various forming techniques can be used for this, for example the use of a mold or anvil to shape the surface, the use of automated presses, the use of a positive and negative mold to form into specific shapes, the use of gravity-forming, hydro-forming methods, or heat-forming. Special apparatus for expansion, e.g. with grips in an expandable configuration, and specially designed dies attached to automated presses can be designed to achieve this. Softer materials can be shaped by hand or small hammering tools and pliable materials can be shaped around objects or different shapes. Variable shapes of external molds, or internal pneumatic molds which can be variably inflated, can be used. Digitally operated hammering devices, e.g. a large array of digitally controlled mini-hammers where each hammer is an actuator that is independently remote-controlled by a computer, can be programmed to shape a pre-slit surface into precise surface geometries. Each actuator has either fixed or variable x, y co-ordinates, and the z position determines the extent of the deformation (and hence, force) needed to shape the surface according to its desired geometry.

The materials that can be expanded range from hard materials like metals on one hand to soft materials like paper, pliable materials like fabric and certain plastics, to stretch materials like latex and rubbers. Harder materials, like sheet metals (steel, titanium, aluminum, zinc) are more useful for architectural surfaces like walls, ceilings, or entire architectural envelopes, or sculptural objects. Softer materials like paper, fiber boards, etc, are more suited for small-scale applications like lamps, containers, etc., though in some instances these can be scaled up to an architectural scale. Pliable materials like rubberized foam sheets, certain types of fabrics or rubbers, can be used for packaging, bags, and expandable protective or thermal sleeves for containers, ducts and pipes, or for human wear such as gloves, shoes and socks, or wearable bands for wrist, elbow, knee or forehead. The thickness of material, the size of the slits and the size of the unexpanded polygonal regions will vary according to the material and application.

Expanded surfaces from soft or pliable materials can be hardened with the application of hardening materials like resins, cements, etc. On an architectural scale, the gaps in the expanded metal surfaces can be filled with filler materials, e.g. by spraying resins or special synthetic compounds or dipping in vats of such materials. The expanded surface can act as a core for compound curved architectural surfaces made from standard building materials like cement, concrete, or plaster. Materials with a shape memory can be used for reversible forming from neutral unformed surfaces like a flat plane, cylinder, cone, sphere, or complex irregular forms, to their expanded states and back to their original neutral states. The shape memory component can be embedded in the joints of expandable sheets, for example by insertion of martensic alloys like nitinol or, on a simpler level, by introducing "live" hinges as in variable composition of certain plastics.

Referring to the drawings, FIG. 1 shows a square-shaped surface of a sheet material in two different states, 1 and 15, based on the invention. The flat unexpanded state 1 shows a slitting pattern based on a 3×3 portion of a base square grid and the basic principle described here can be extended to a larger square grid or a grid with different geometry. The flat state 1 comprises square polygonal regions 2, 3 and 4, separated by edge regions defined by full slits 12 and peripheral half-slits 11, and vertex regions 10 which join adjacent polygonal regions. The face regions 2 lie on the interior portion of the base grid, regions 3 lie on the outer edges of the base grid, and regions 4 lie on the outer corners of the base grid. Slits 12 lie on the interior of the base grid and the half slits 11 lie at its perimeter. The full slit 12 is bound by edges 5 and rounded ends 13, and half slits 11 are bound by edges 6, one rounded end 13, and two corners 8 lying on the perimeter edge of the sheet material. The perimeter edges 7 bound two adjacent squares 3 and 4 on the perimeter, and the perimeter edge 9 bounds the corner squares 4.

The expanded state 15 shows the configuration of the sheet material after it has been stretched in two directions. This is a special-case expansion where the sheet material is constrained on a flat plane and the vertex regions 10 undergo a relatively substantial material transformation as in more pliable materials. In the expanded state, the flat polygonal regions 2, 3 and 4 have rotated to 2', 3' and 4', respectively, the edge regions defined by the slits 12 and 11 have expanded to open regions 12' and 11', respectively, and the vertex regions 10 have changed to 10' to accommodate the rotation of the polygonal regions. The polygonal regions rotate clockwise and counter-clockwise in an alternating manner as the slits enlarge to enable the expansion of the surface. The vertex regions 10 undergo a material deformation by squishing along the surface of the material and/or by rising above the surface to permit the expansion of the sheet material. The deformed regions 10' accommodate the rotations of flat polygonal regions. The expanded slit regions 12' are now rhombic openings bound by four sides 5 and four rounded ends, two ends 13' alternating with two new ends 14. The half-slits 11' are bound by two sides 6, one rounded end 13' and outer corners 8. The outermost edges 7 and 9 rotate correspondingly with the edges 7 bending at mid-points 14.

Figure 2:
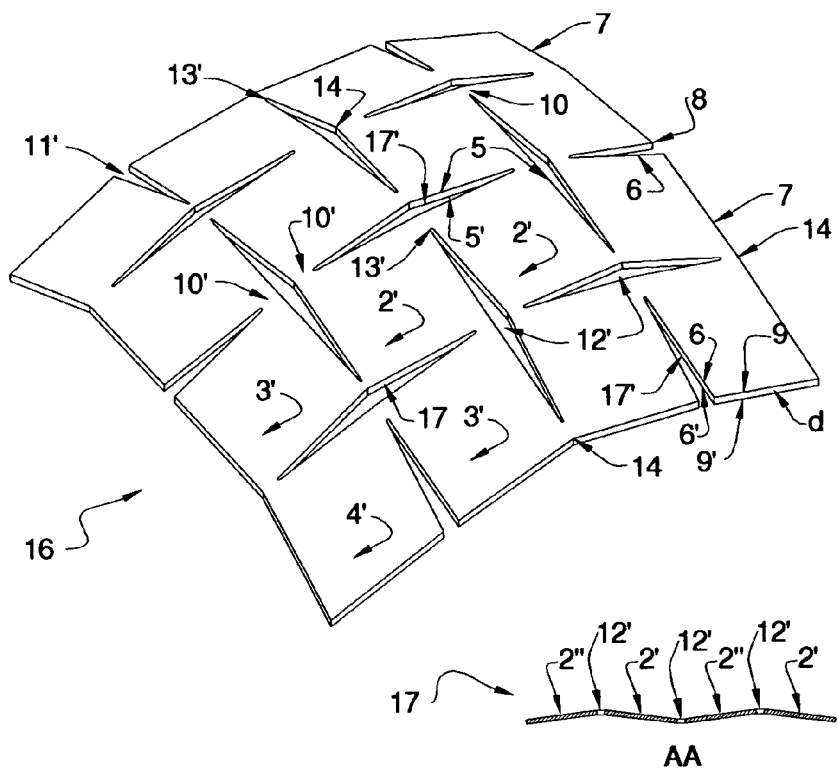
FIG. 2 shows two different expansions of a 4×4 flat sheet material having a square-grid slitting pattern, an expanded 3-dimensional curved dome-type surface (above) and a 3-dimensional folded-type surface with alternate squares in two different tilted orientations (below).
Figure 2:
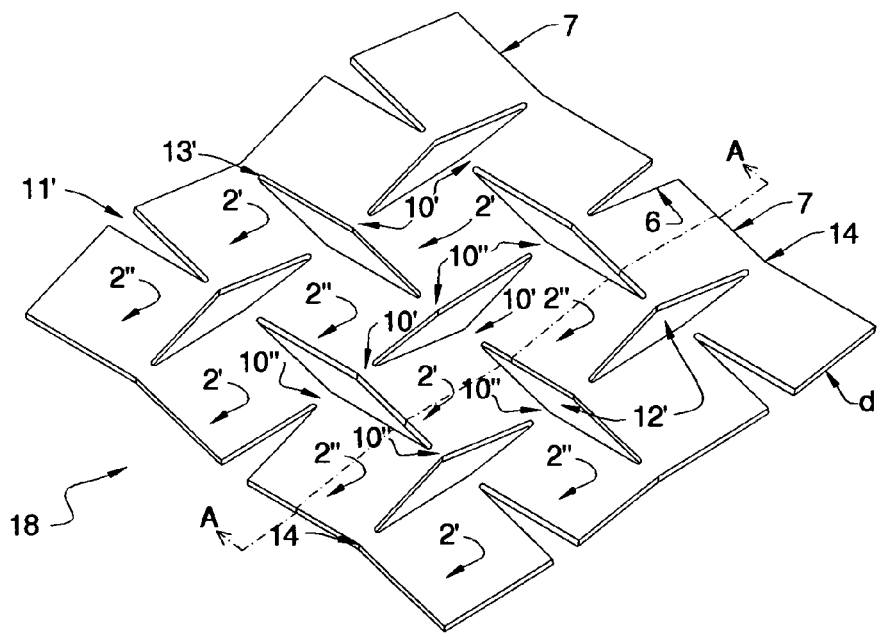

FIG. 2 shows two different expansions of a 4×4 unexpanded square grid slit pattern. In 16, the sheet material is expanded into a dome-type surface obtained by applying a force across (perpendicular or at an angle to) the surface of the sheet material. It is composed of inner expanded square regions 2', outer expanded square regions 3' and corner expanded square regions 4'. These regions rotate clockwise and counter-clockwise in an alternating manner around the vertex regions 10' where they remain attached. The material deforms at 10' differently from the simple expansion in 15 of FIG. 1 as the vertex regions here deform in a compound manner comprising a variable bending in the vertical plane in addition to the rotation in the horizontal plane. The full slits on the interior, bound by opposing pair of ends 13' and 14, expand to openings 12' and half-slits on the exterior expand to 11'. The outer edges 7 bend at 14. The thickness of the surface introduces vertical faces d between the outer edges 9 on the upper surface and 9' on the bottom surface. The edges 5 on the top surface of full slits 12', and 5' on the bottom surface, define the bounding walls 17 of openings 12'. For half-slits 11', the top edges 6 and bottom edges 6' define the bounding walls 17'. The curvature of the surface can be varied by changing the bending angle at the vertex regions 10'.

A different type of expansion from the same slitting pattern leads to the zig-zag folded surface 18. This surface is obtained by pulling the surface outwards along four directions of diagonals radiating from the center of the square grid slitting pattern. After expansion, the square regions 2' and 2" fold up and down in an alternating checkerboard manner but their center points remain substantially in the same plane. Each region 2' is oriented identically and each region 2" has a mirrored orientation with respect to 2'. Each square region pivots around the surrounding four vertex regions such that two adjacent vertex regions 10' around each square region fold upwards and the remaining two vertex regions 10" around the same square region fold downwards. The same holds true for the vertex regions surrounding the openings 12', i.e. two adjacent vertex regions are 10' folding upwards and the other two adjacent ones are 10" folding downwards. Section AA shows the alternating and mirrored relationship between the regions 2' and 2". The transverse sections also zig-zag in the same manner. A variation of this type of expansion can be produced by securing the outermost square regions independently on each of the four outer sides of a square sheet material. In this arrangement, the zig-zag folding of the individual square regions would increase progressively to the center of the entire sheet material, giving it a variable depth across its cross-section after expansion.

Figure 3:
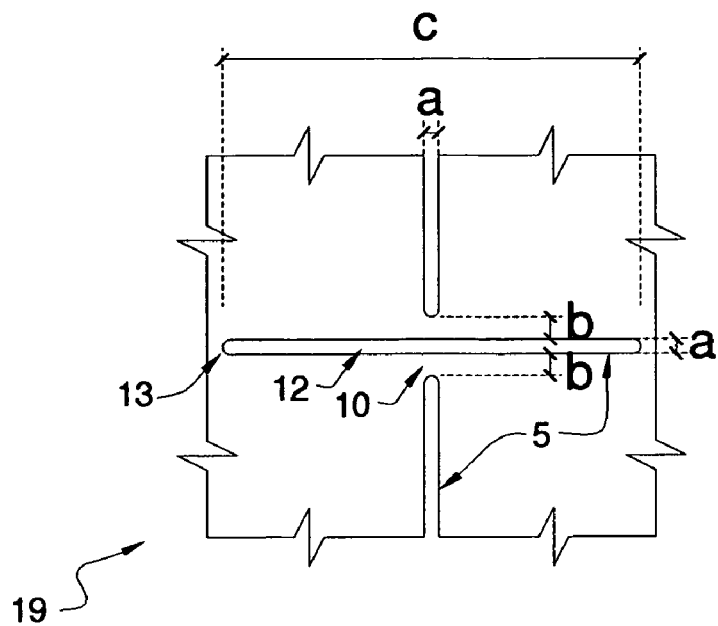
FIG. 3 shows the proportions of the slitting pattern with slit 5 of length 'c' and width 'a' separated by gaps 10 of width 'b'.
Figure 3:
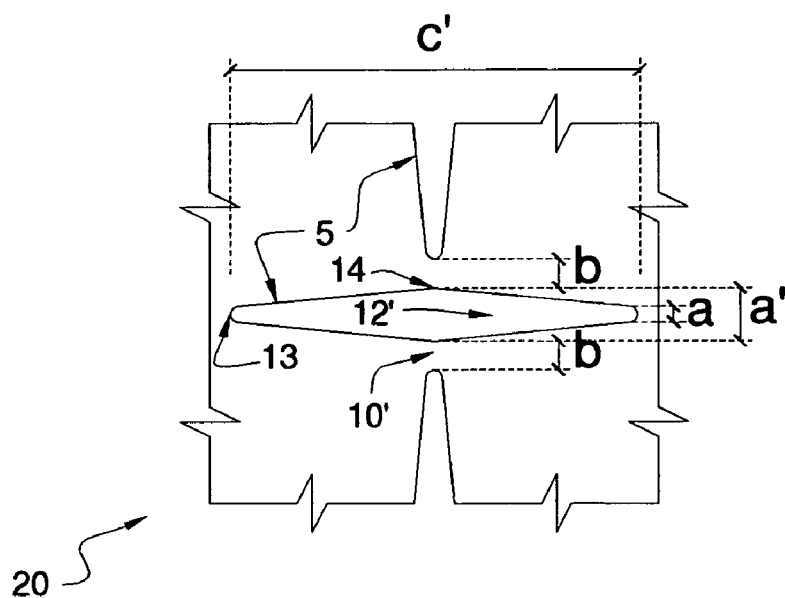

FIG. 3 shows the details of the full slit in unexpanded state 16 and expanded state 17. In 16, the full slit 12, bound by edges 5 and ends 13, has a length 'c' and width 'a'. The vertex region 10 has a width 'b'. In 17, the expanded slit 12', bound by edges 5 and edges 13, has a modified length 'c'' which is less than 'c' and the expanded width 'a''. The width 'b' is approximately equal to the thickness of the sheet material. The values of 'a', 'b' and 'c' will vary with the material and size of the specific application. On an architectural scale, expanded surfaces in, say, metal, would require 'a' to be equal to the thickness of laser or water-jet or a punch, 'c' will vary from $1/8^{th}$ inch to 4" or so, and 'b' will equal $1/32^{nd}$ inch to $1/16^{th}$ inch or more. For small-scale architectural surfaces made from sheet metal, the metal thickness for non-structural expanded surface could range from 0.020 inches to 0.060 inches or more, especially for applications require small tooling and manual manipulation. Thicker metal sheets, say $1/8$ inch or more, will require considerable force to shape the surface and will require machine presses and special dies. Larger slits are possible but will produce bigger size holes and larger polygonal areas giving the surface a faceted look. These openings could be filled with a suitable filler material. For smoother looking surfaces, the polygonal regions need to be smaller in relation to the size of the surface, or the angle of bend between the facets needs to be small.

For non-architectural surfaces, say, on a smaller scale, the size of polygonal regions and slits could be as small as the slitting technology permits. In general, for surfaces which are a few inches across to a few feet, smaller regions of $1/8^{th}$ inch thru $1/2$ inch across are desirable for a smooth curved appearance. For slits smaller than $1/8$ inch, say, $1/32$ inch or $1/64$ inch across or less, will be useful for applications such as filters, gauzes and band-aids. Smaller scale slits will be needed in medical technologies for skin grafts and stent designs. At micro-levels, expandable surfaces based on the invention can be used for semi-permeable membranes as artificial cell walls or as filters in purification of fluids. The principle of expansion could be extended to molecular and nano-technology levels.

Figure 4:
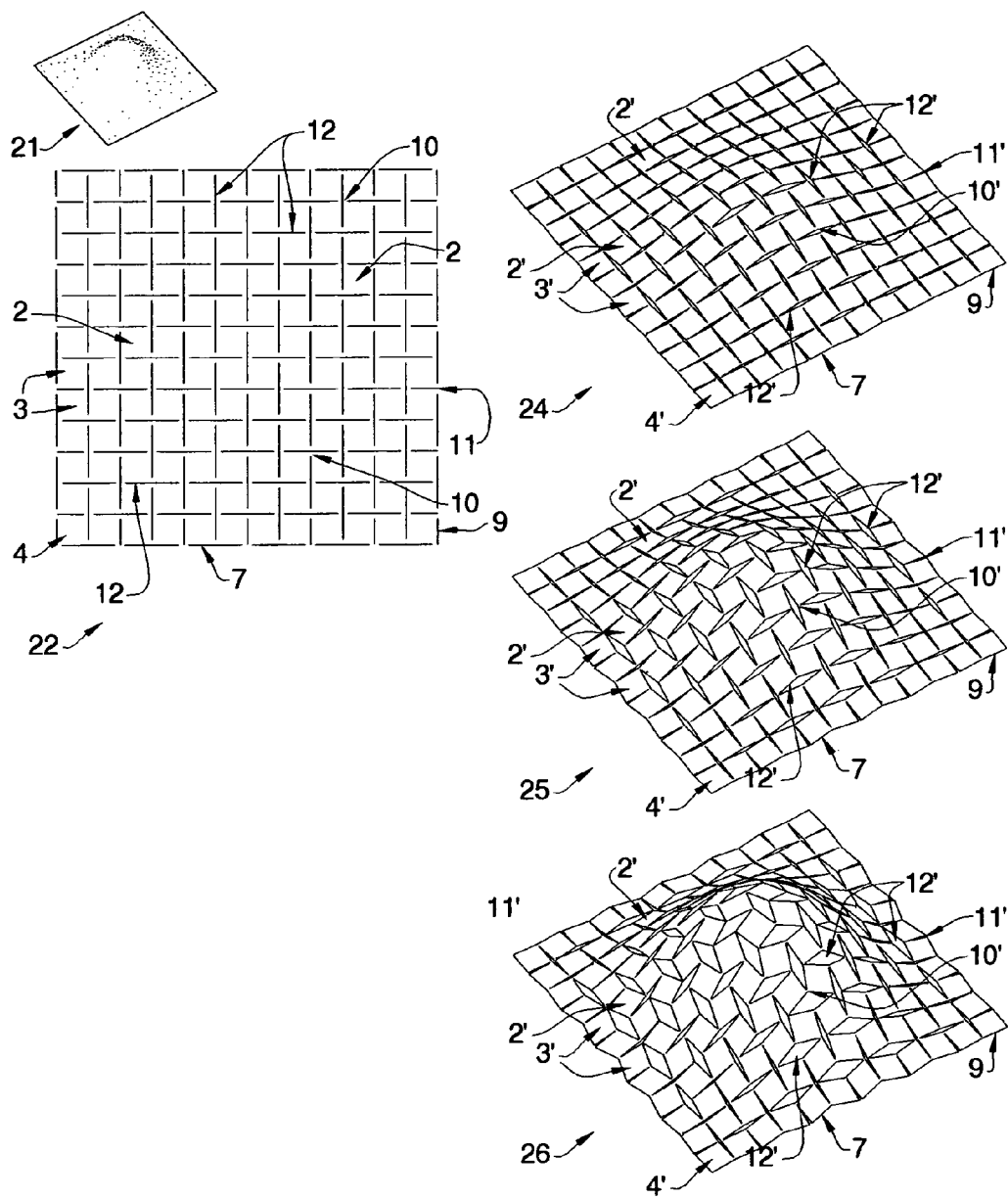
FIG. 4 also shows a sequence of expansion of a square-shaped surface material scored in a 12×12 square-grid slitting pattern into 3-dimensional domed-surfaces such that the squares on the boundary remain constrained on a flat plane after expansion.

FIG. 4 shows a 12×12 square grid slitting pattern 22 and the domical surface 21 shown schematically and in detail in 24-26. Slit pattern 33 has internal squares regions 2, boundary square regions 3 and corner square regions 4. The square regions are separated by full slits 12 and boundary half-slits 11 and meet at vertex regions 10. The outer edges 7 correspond to full slits and corner edges 9 correspond to half-slits. The surfaces 24, 25 and 26 show three different stages of expansion of 22 obtained by applying a force across the surface of the sheet material. As before, the slits 12 have expanded to 12', 11 to 11', and the vertex regions 10 have changed to 10', and the square regions have rotated to 2', 3' and 4' correspondingly. The expansion of the slits enables the domical form of the surface.

Figure 5:
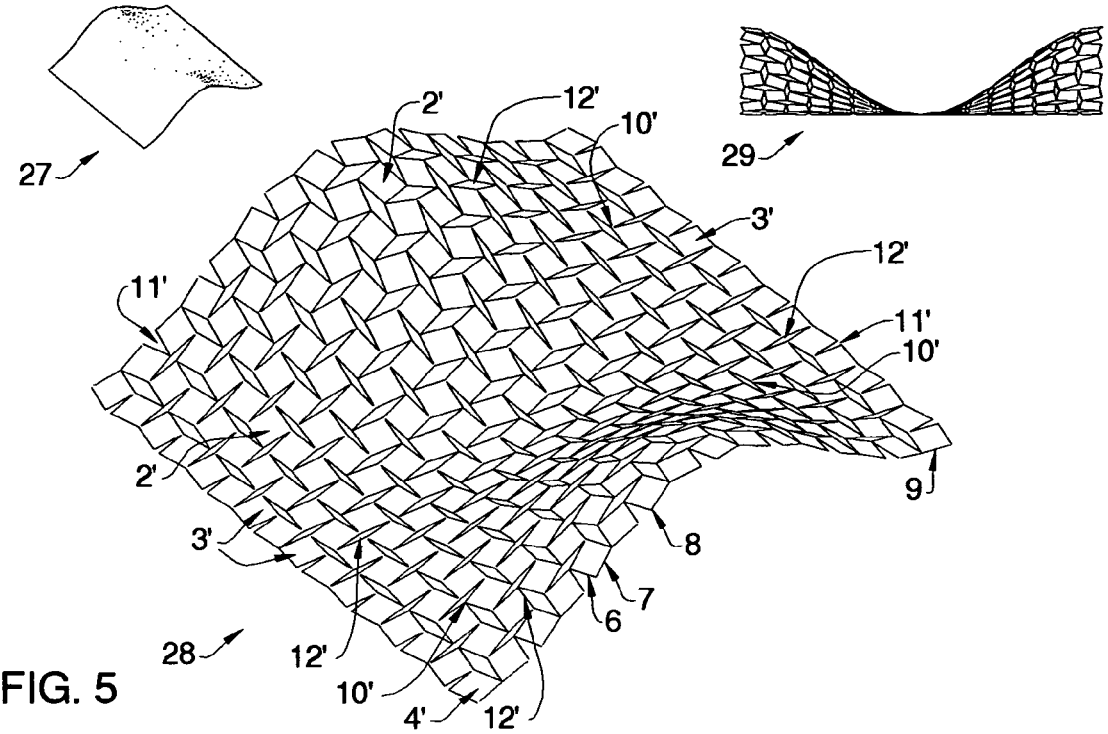
FIG. 5 shows a variant of FIG. 4 where the boundary squares on two opposite sides of the 3-dimensional curved surface remain flat while those on the other two sides are curved in the same direction after expansion of a 16×16 grid slitting pattern.

FIG. 5 shows the curved surface 27 and its corresponding expanded surface 28, also obtained from 22 in FIG. 4. Surface 28 has internal square regions 2', outer square regions 3' and corner square regions 4', expanded slits 12' and peripheral half-slits 11', and deformed vertex regions 10'. The surface is obtained by applying a force against the sheet material on two opposite ends to produce half-domes back to back and a valley region in the middle as seen in the side view 29.

Figure 6:
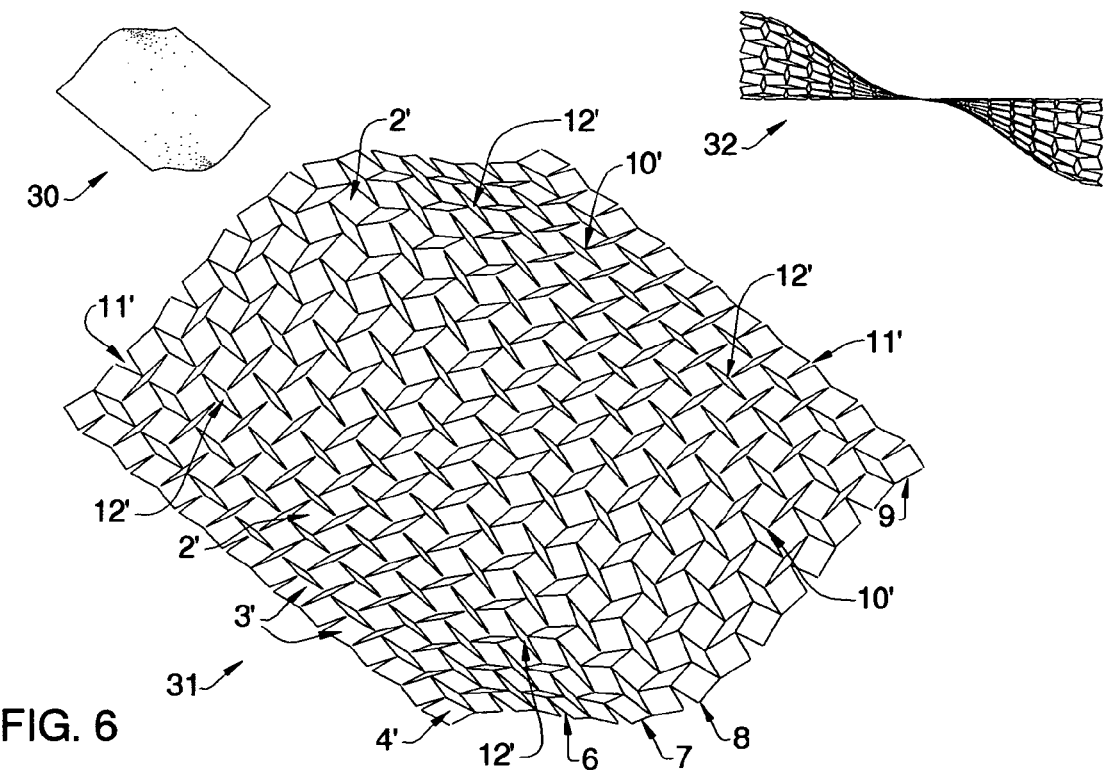
FIG. 6 shows a variant of FIG. 5 where the boundary squares on two opposite sides of the 3-dimensional curved surface remain flat while those on the other two sides are curved in opposite directions after expansion of a 16×16 grid slitting pattern.

FIG. 6 shows the surface 30 and its corresponding expanded surface 31 obtained from 22 in FIG. 4. As before, surface 30 has internal square regions 2', outer square regions 3' and corner square regions 4', expanded slits 12' and peripheral half-slits 11', and deformed vertex regions 10'. The surface is obtained by applying a force against the sheet material on two opposite ends in the opposite directions to produce a half-dome on one end and an inverted half-dome on the other as seen in the side view 32.

Figure 7:
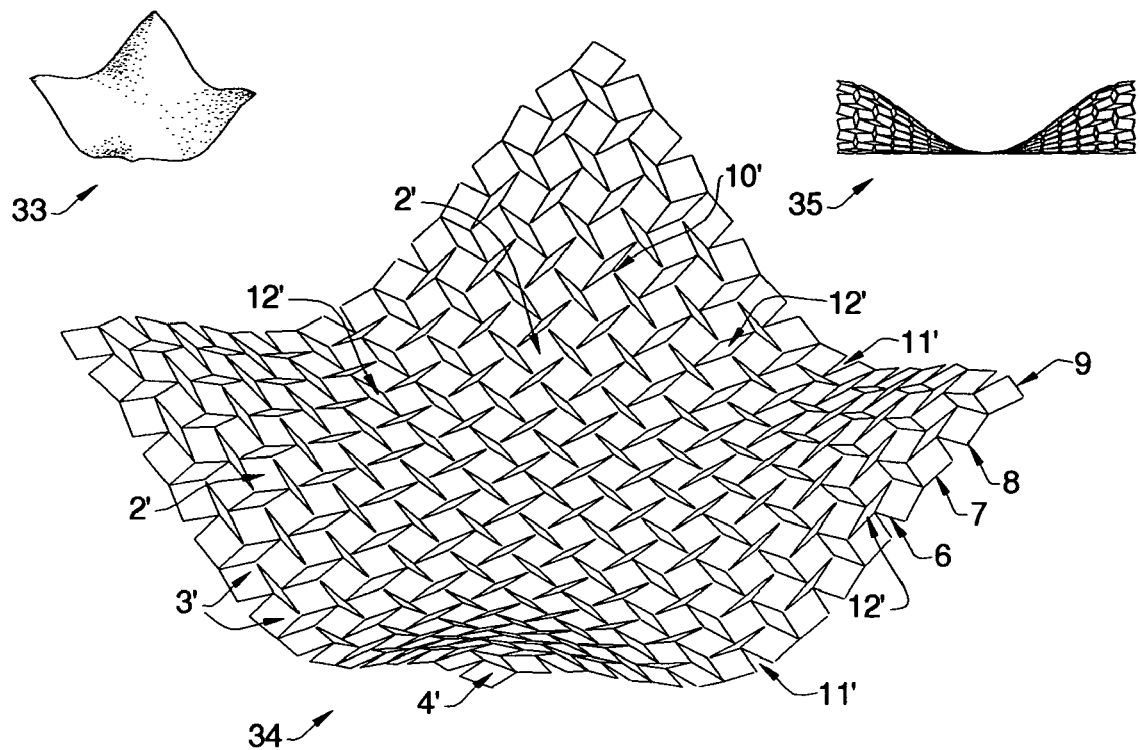
FIG. 7 shows another 3-dimensional surface obtained by expanding a 16×16 square-grid slitting pattern in a reversed dome-type surface.

FIG. 7 shows the surface 33 and its corresponding expanded surface 34, also obtained from 22 in FIG. 4. As in the earlier examples, surface 34 has internal square regions 2', outer square regions 3' and corner square regions 4', expanded slits 12' and peripheral half-slits 11', and deformed vertex regions 10'. The surface is obtained by applying a force against the sheet material on all four corners of the sheet material to produce quarter-domes as seen in the side view 35.

Figure 8:
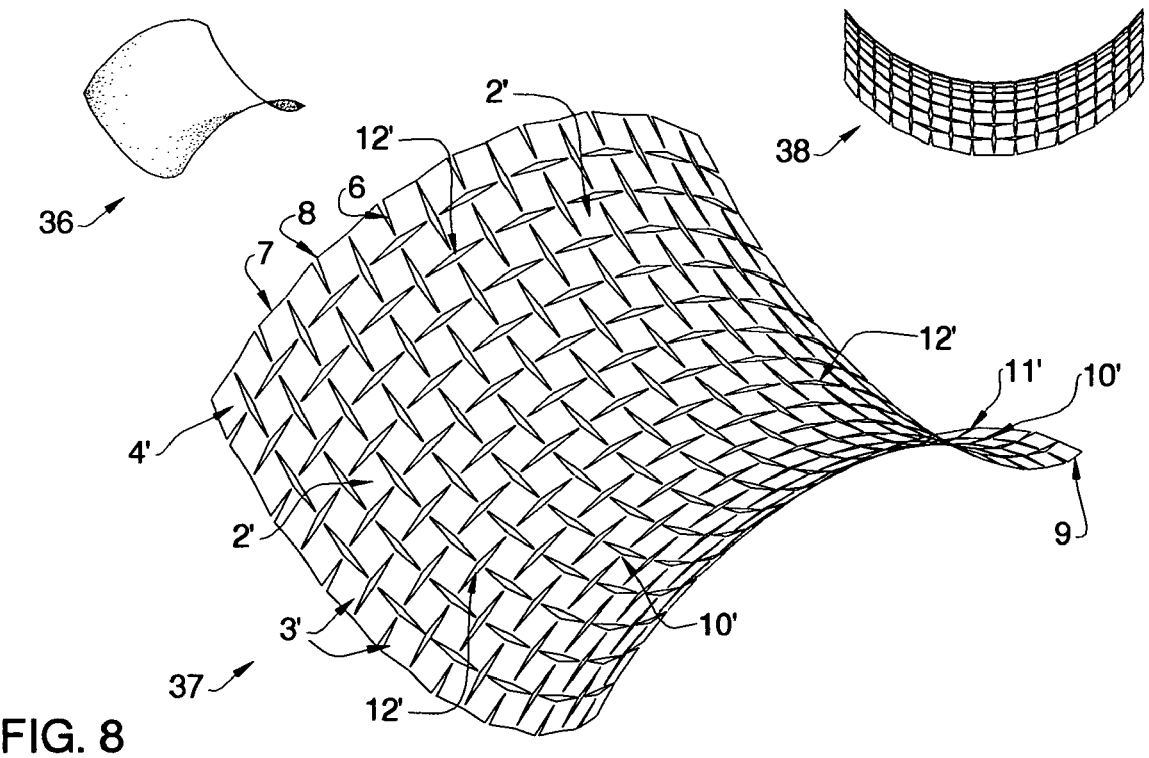
FIG. 8 shows a saddle-shaped surface by expanding a 16×16 square-grid slitting pattern.

FIG. 8 the saddle surface 36 and its corresponding expanded sheet material surface 37 formed by raising two opposite ends and lowering the other two opposite ends as seen in the side view 38. Surface 37 is also obtained from 22 in FIG. 4, and like the earlier examples it has internal square regions 2', outer square regions 3' and corner square regions 4', expanded slits 12' and peripheral half-slits 11', and deformed vertex regions 10'.

Figure 9:
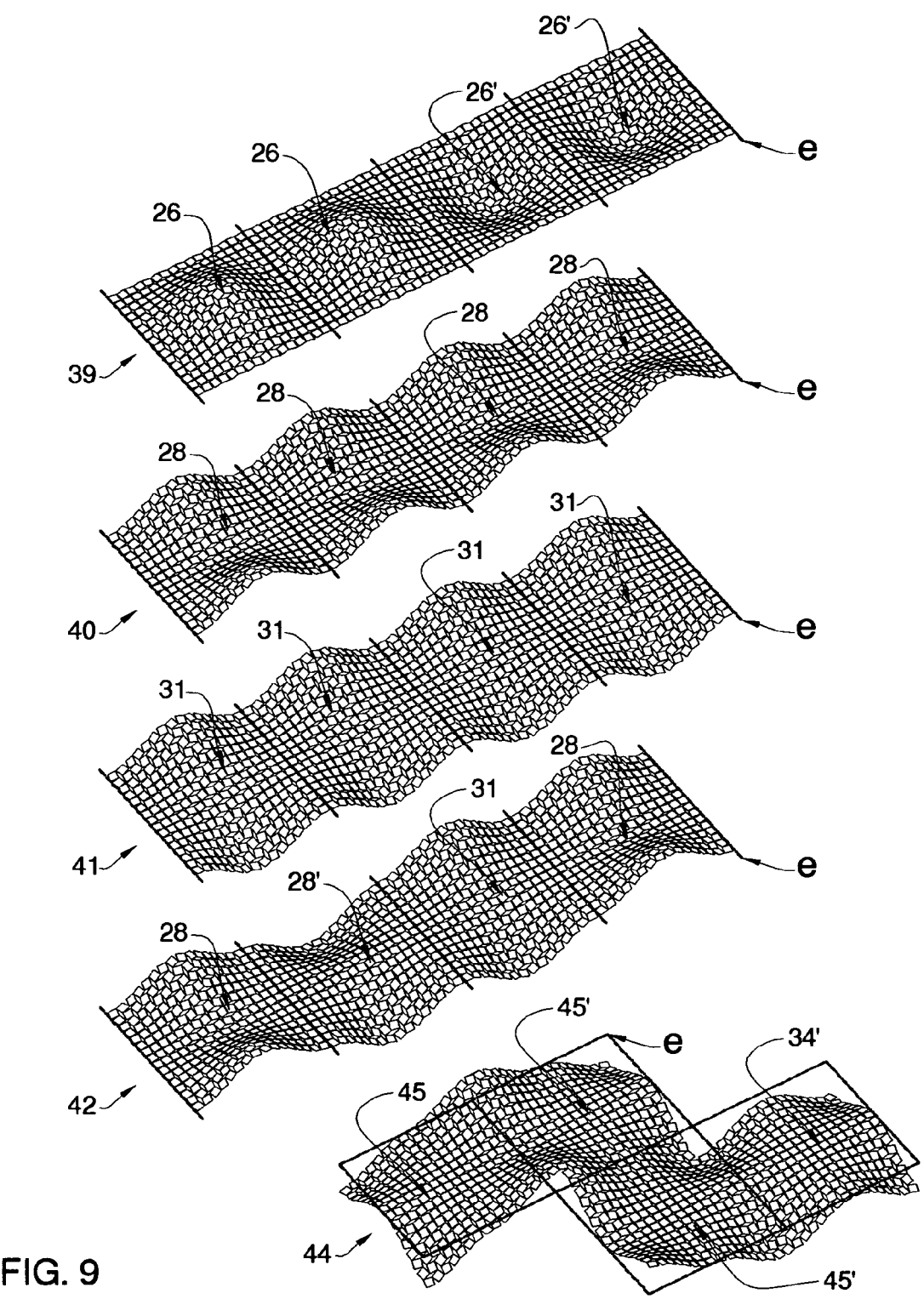
FIG. 9 shows four different types of 3-dimensional curved surfaces in strip configurations and composed of units from FIGS. 4-8; the one at the bottom is an irregular surface with offset plan geometry.

FIG. 9 shows five different expanded surfaces produced by combining some of the surfaces in FIGS. 4-8 in linear arrays. Surface 39 is composed of expanded surface modules 26 and upside-down modules 26 demarcated by dashed lines e. Surface 40 is composed of surface modules 28, surface 41 is composed of surface modules 31, and surface 42 is composed of modules 28, 28' and 31. Surface 44 is a zig-zag surface configuration comprising modules 45, 45' and 34'.

Figure 10:
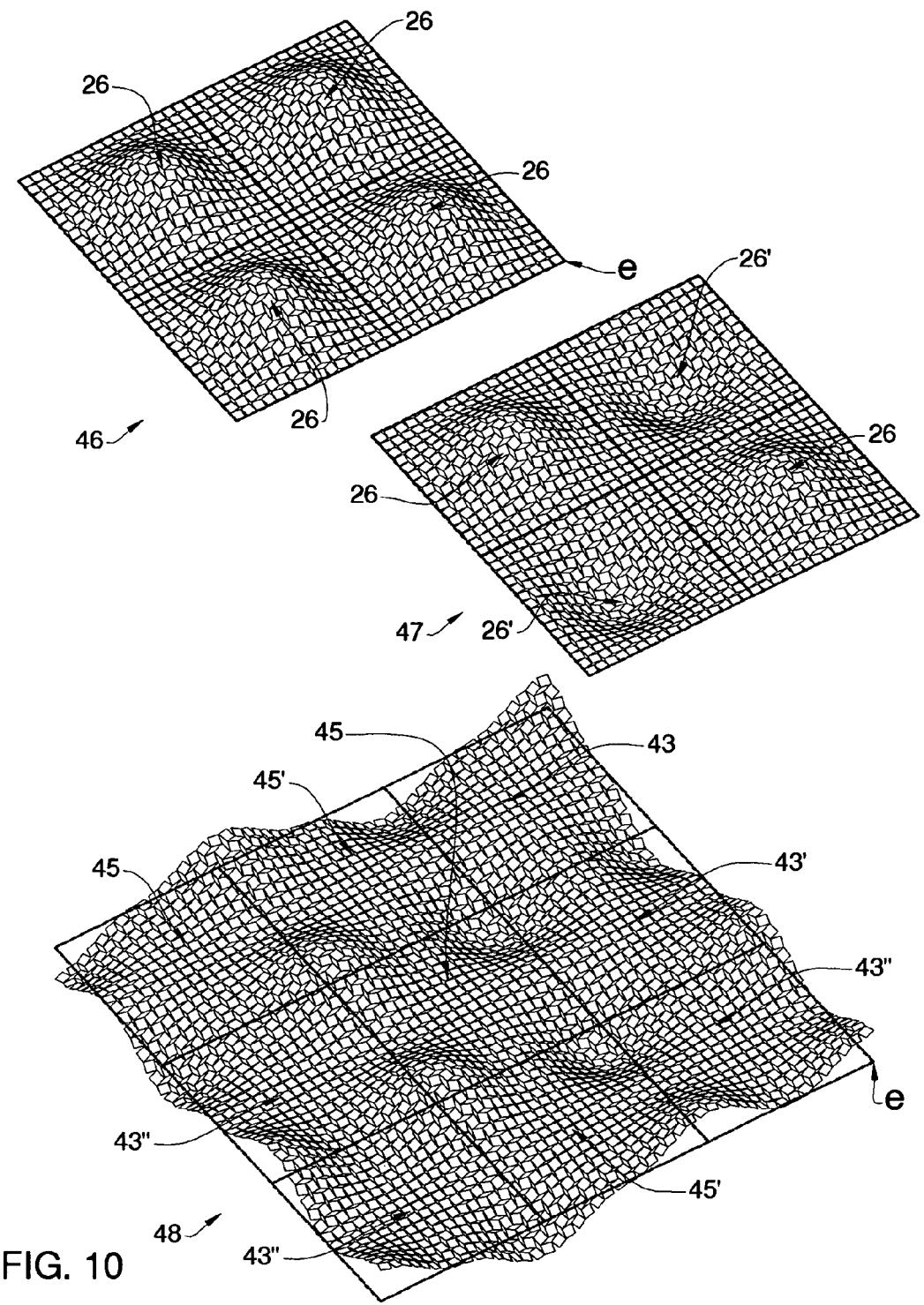
FIG. 10 shows extendable 3-dimensional curved surfaces composed of units from FIGS. 4-8 and having flat or undulating boundaries.

FIG. 10 shows expanded surfaces that extend in planar arrays and composed of modules having a square plan as indicated by the dashed lines e. Surface 46 is composed of modules 46 in a periodic array, surface 47 is composed of modules 26 and 26' in an alternating periodic array, and surface 48 is an irregular surface composed of several different modules.

Figure 11:
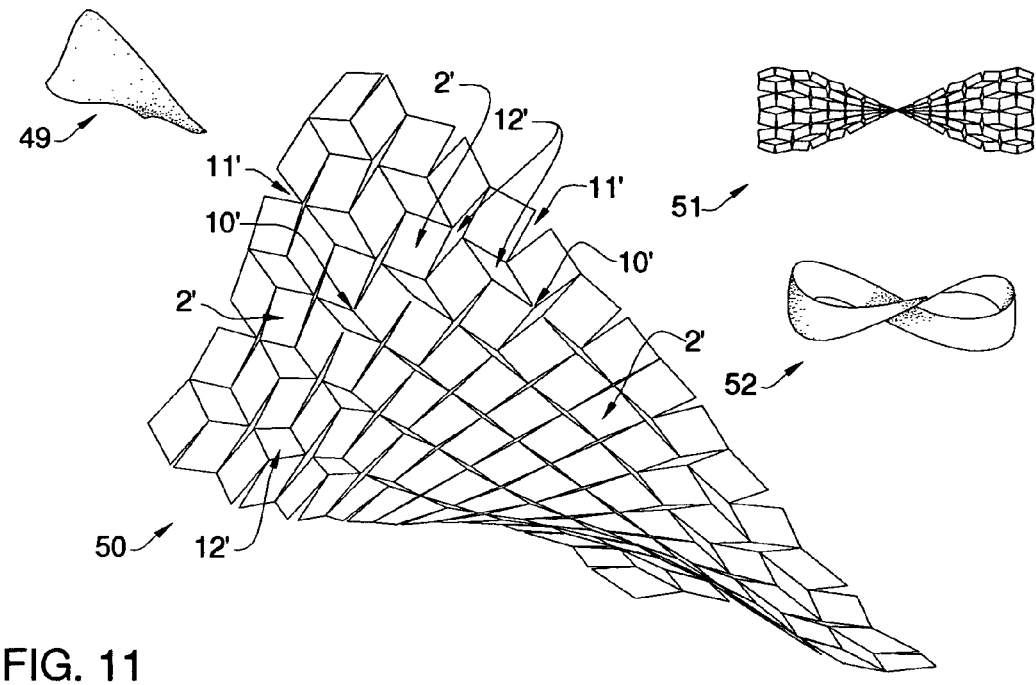
FIG. 11 shows a twisted surface, a part of the Mobius-strip, obtained by expanding a square grid slitting pattern.

FIG. 11 shows the twisted surface 49 in its expanded state 50 and its side view 51. In the forming process, this involves twisting the flat unexpanded surface, a 16×6 square grid slit pattern, and stretching it in two directions as well. As before, the square regions rotate in the expanded state to 2', the primary slits expand to 12' and the peripheral slits 11' and the vertex regions transform to 10'. Surface 50 can be extended to become a Mobius trip 53 shown schematically here.

Figure 12:
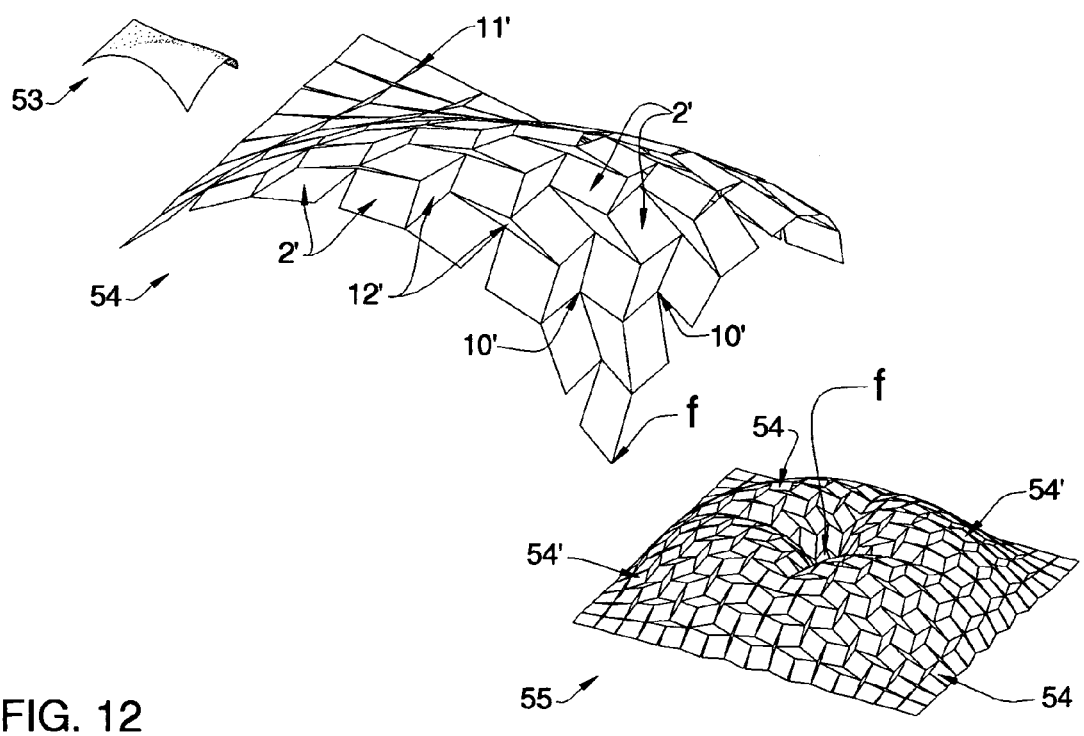
FIG. 12 shows a square-plan domical surface with a dimpled point and composed of four units, each expanded from 8×8 square grid slitting patterns.

FIG. 12 shows a curved surface module 53 having a square plan and its expanded state 54. As before, the expanded state comprises rotated square regions 2', expanded primary slits 12', perimeter slits 11', meeting at transformed vertices 10'. The composite surface 55 is obtained by using four modules around the dimpled point f. Two of these modules are identical to 54, the other two are 54' which are its mirrored versions.

Figure 13:
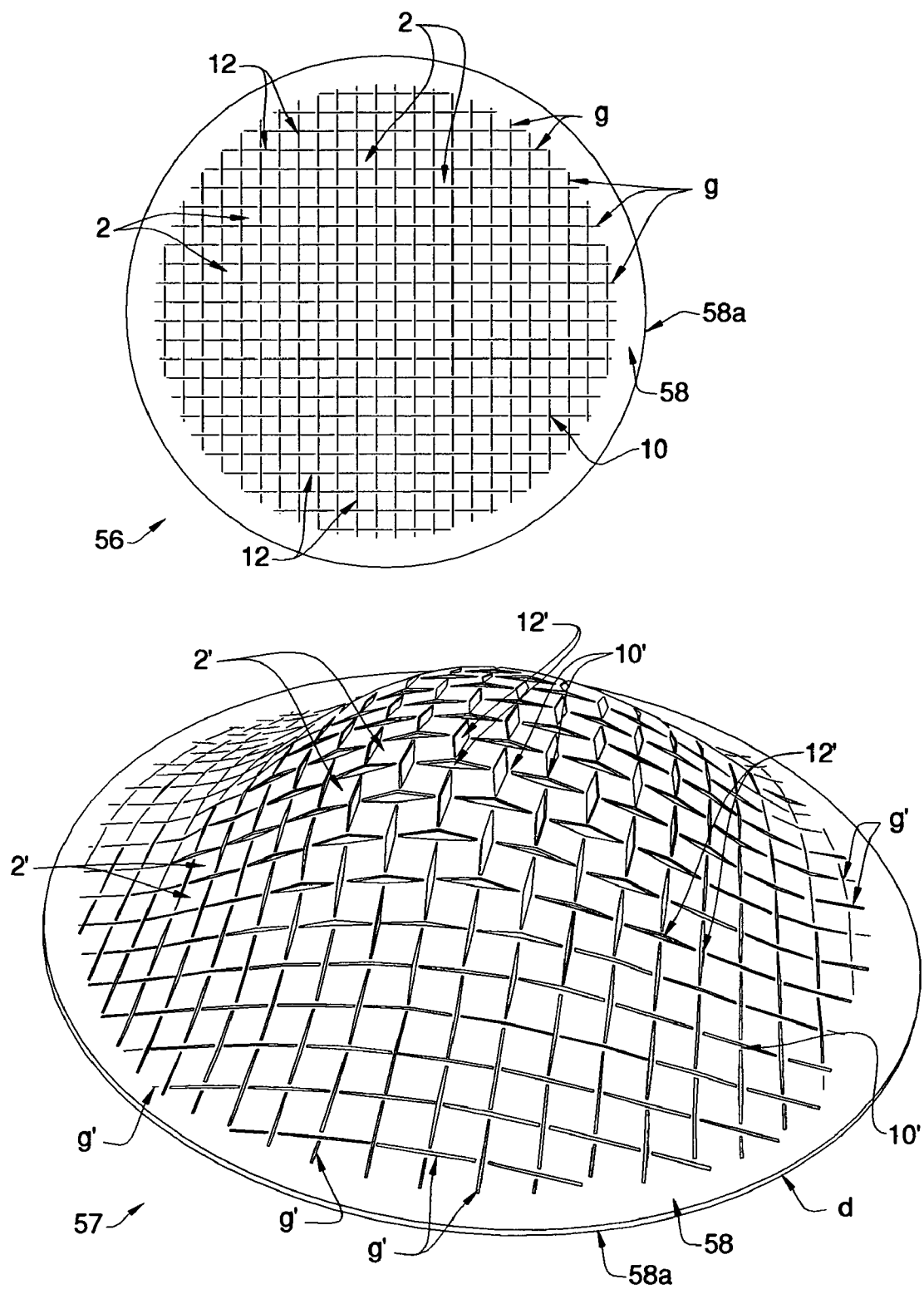
FIG. 13 shows a circular layout from a square grid slitting pattern and its expanded domical state.

FIG. 13 shows a slitting pattern 56 based on a square grid but in a circular profile. It has square regions 2, primary slits 12 meeting at vertex regions 10 as before, perimeter slits g, and perimeter regions g1 which are portions of square regions that are cut off by the perimeter band 58 defined by the outer rim 58a. The rim binds the surface on its periphery and constrains its expansion. The expanded state 57 is produced by a forming force against or across the surface. In the example shown, the surface is a dome which alters it curvature to blend with the surface of the rim 58. In the expanded state, the slits have expanded to 12', the square regions have rotated to 2' around the vertex regions 10' which undergo a deformation. The perimeter slits have expanded to g' and the regions g1 have expanded to g1A. This example, shown here with a depth d, is suited for domes on an architectural scale, skylights or domical covers of varying sizes depending on the application. On a smaller scale, applications can range from caps or hat covers, to fruit bowls (upside-down version of 57) to containers. On a micro scale, the gauzes and band-aids are possible applications.

Figure 14:
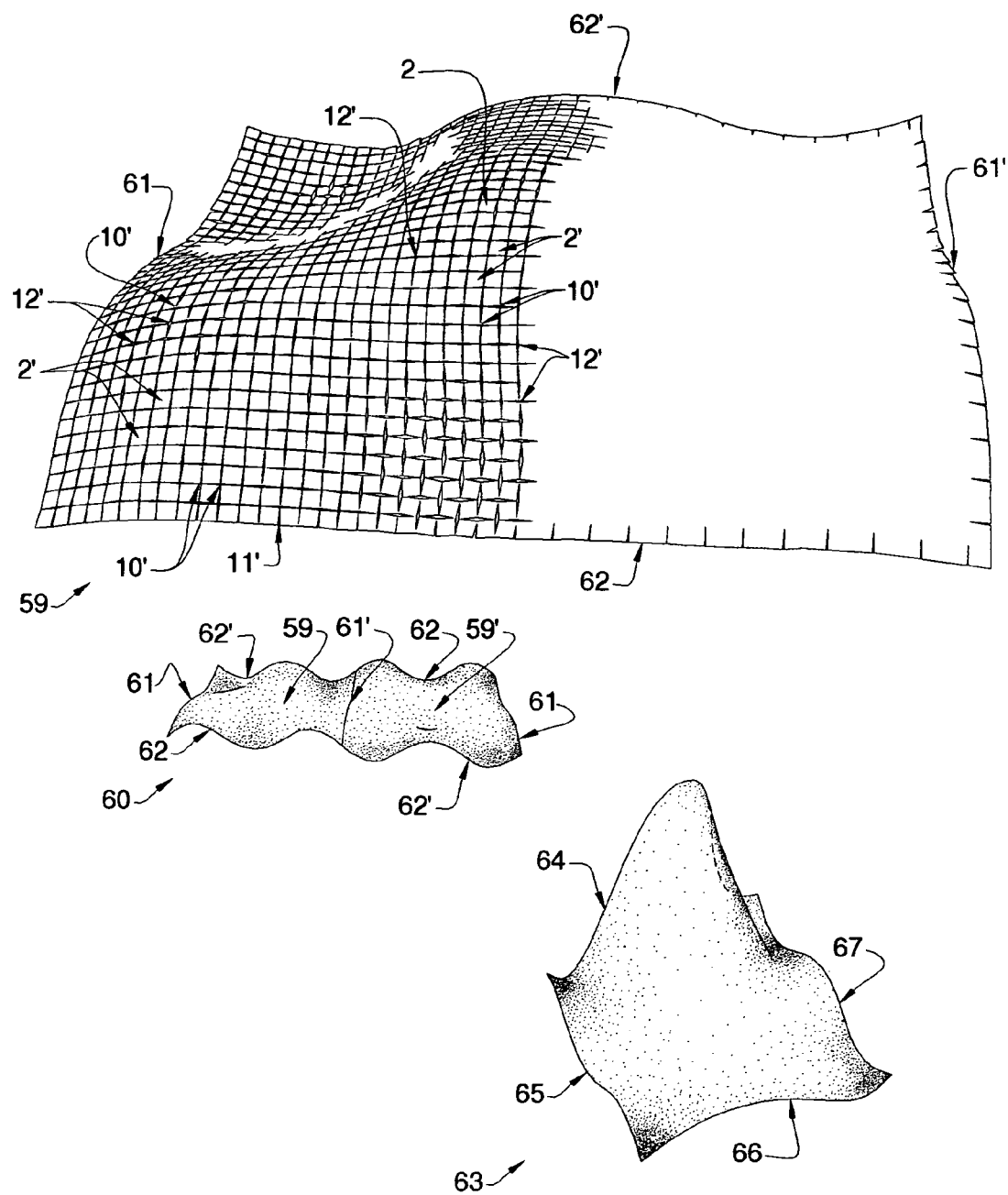
FIG. 14 shows a compound-curved module with wavy edges and an undulated surface expanded from a square grid slitting pattern. The module can be added to others to create a larger organically shaped surface.

FIG. 14 shows the expanded surface 59 (the expanded grid is indicated on one-half of the surface for the purposes of illustration only) which is composed of expanded square regions 2', expanded slits 12', expanded vertex regions 10', and the corresponding expanded elements on the perimeter, namely, the expanded square regions 3' and 4', and the expanded half-slits 11'. The surface has three depressed regions, one each on top left and top right corners, and the third in the middle front region, and is bound by wavy edges 61, 62, 61' and 62'. The surface 60 shows a schematic configuration of two modules 59 and a related module 59' which is also bound by the same four wavy edges 61, 62, 61' and 62' but in a different configuration. Surface 63 is a schematic diagram for a related surface with wavy edges 64, 65, 66 and 67. By varying the curvature of waves, numbers of crests and troughs on the edges, and the number of sides of the curved modules, other related surfaces can be derived. All such surfaces provide the basis for the surface geometry of expanded sheet material surfaces based on the invention.

Figure 15:
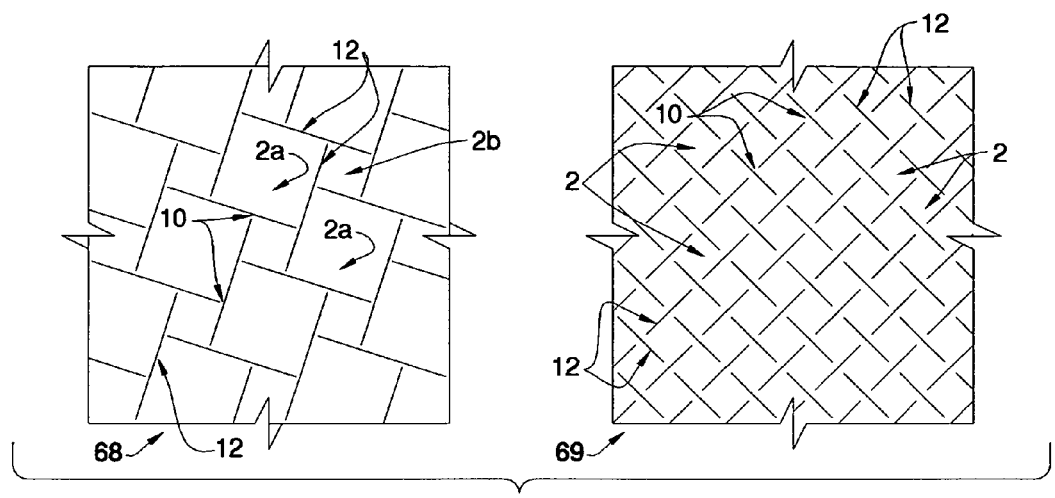
FIG. 15 shows two different slitting patterns, one with offset squares of two different sizes, and another with a square grid oriented at 45 degrees.

FIG. 15 shows two different slitting patterns 68 and 69, both composed of squares that are turned at an angle to the outer sides. 68 is composed of two different square regions 2' and 2b with the former larger than the latter, slits 12 that meet at T-shaped vertex regions 10, with each slit having a region 2' and 2b on either side as shown. 69 is a simple square grid turned at 45 degrees and composed of square regions 2 meeting at vertex regions 10 and separated by slits 12, as in earlier square grid slit patterns.

Figure 16:
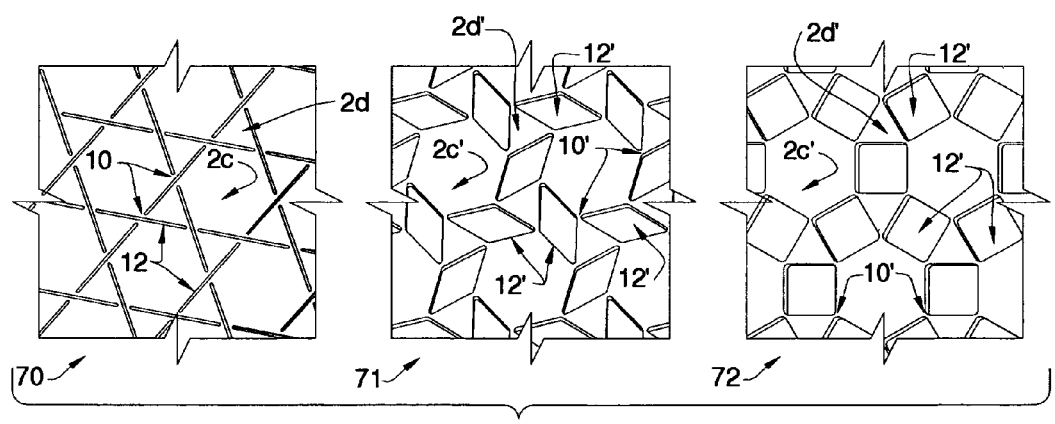
FIG. 16 shows a sequence of expansions of a slitting pattern with alternating triangles and hexagons.
Figure 17:
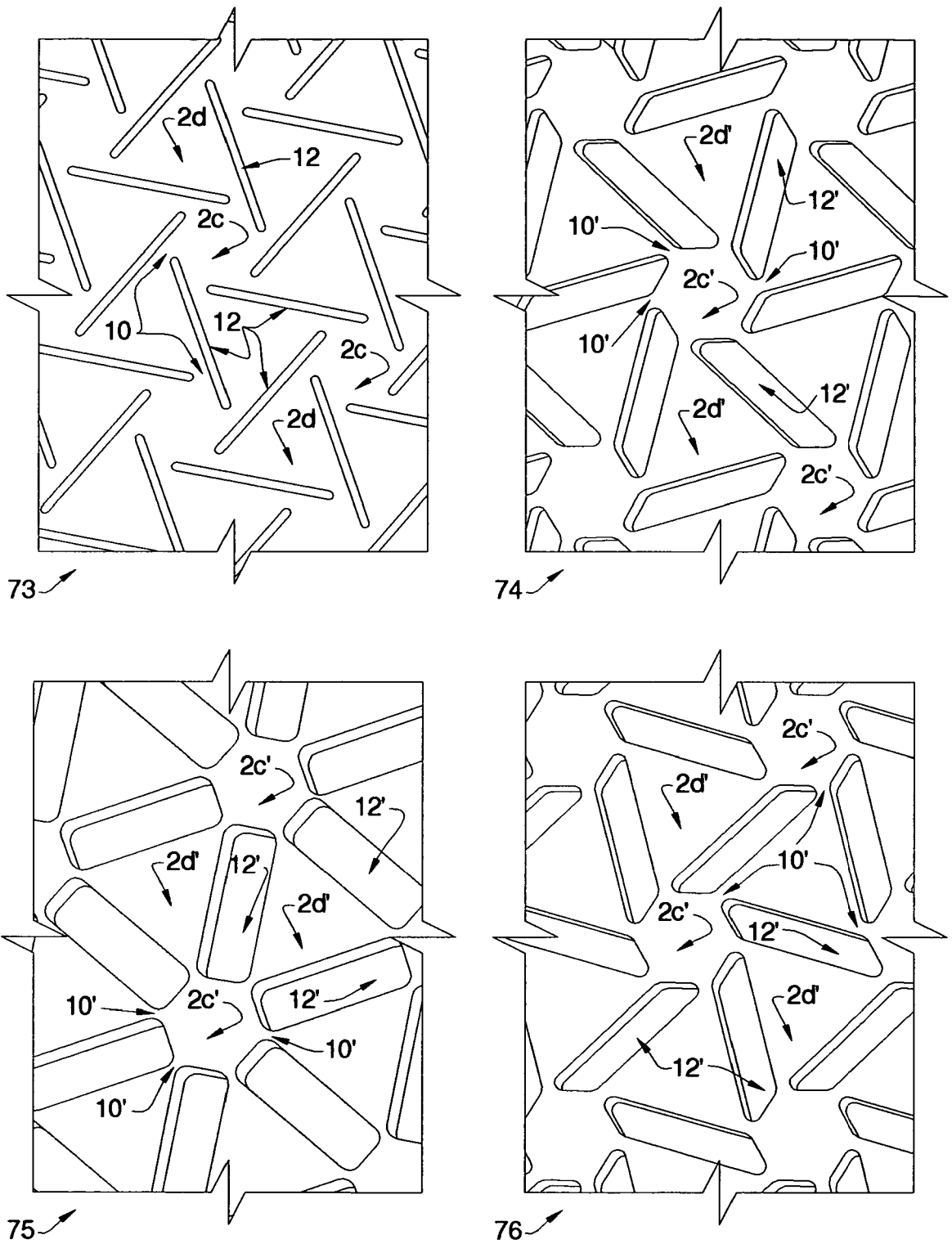
FIG. 17 shows a sequence of expansions of a slitting pattern composed of triangles and hexagons arranged in a cyclic manner.

FIGS. 16 and 17 show two different geometries of slit patterns based on triangular-hexagonal geometries in different stages of expansion. In both examples, the expansion is along the surface of the sheet material and is enabled by the deformation of the vertex regions 10 and the rotation of the polygonal regions in the same manner as in FIG. 1. The surface is expanded by applying a mechanical force in three or six equal directions away from the center of the material. In FIG. 16, pattern 70 expands to 71 and 72 in succession. The unexpanded state 70 shows a slit pattern composed of hexagonal regions 2c alternating with triangular regions 2d, meeting at vertex regions 10 and separated by slit edges 12. In the expanded state 71, the hexagonal regions have rotated to 2c', the triangular regions have rotated to 2d', the edge slits have expanded to rhombic openings 12', and the vertex regions have deformed to 10'. In the further expanded state 72, this process is continued till the expanded slit regions 12' have become squares.

In FIG. 17, the unexpanded slitting pattern 73 is composed of hexagonal regions 2c surrounded by triangular regions 2d in a pinwheel arrangement. These polygonal regions meet at vertex regions 10 and are separated by slits 12. In the expanded state 74, the hexagonal regions have rotated to 2c', the triangular regions have rotated to 2d', the slits have expanded to parallelogram openings 12' and the vertex regions have deformed to 10'. In the further expanded state 75, the hexagonal and triangular regions continue to rotate as the slit regions enlarge to rectangular openings 12'. The expanded state 76 is a mirrored version of 74, suggesting that the polygonal regions could also be rotated in the opposite direction.

Figure 18:
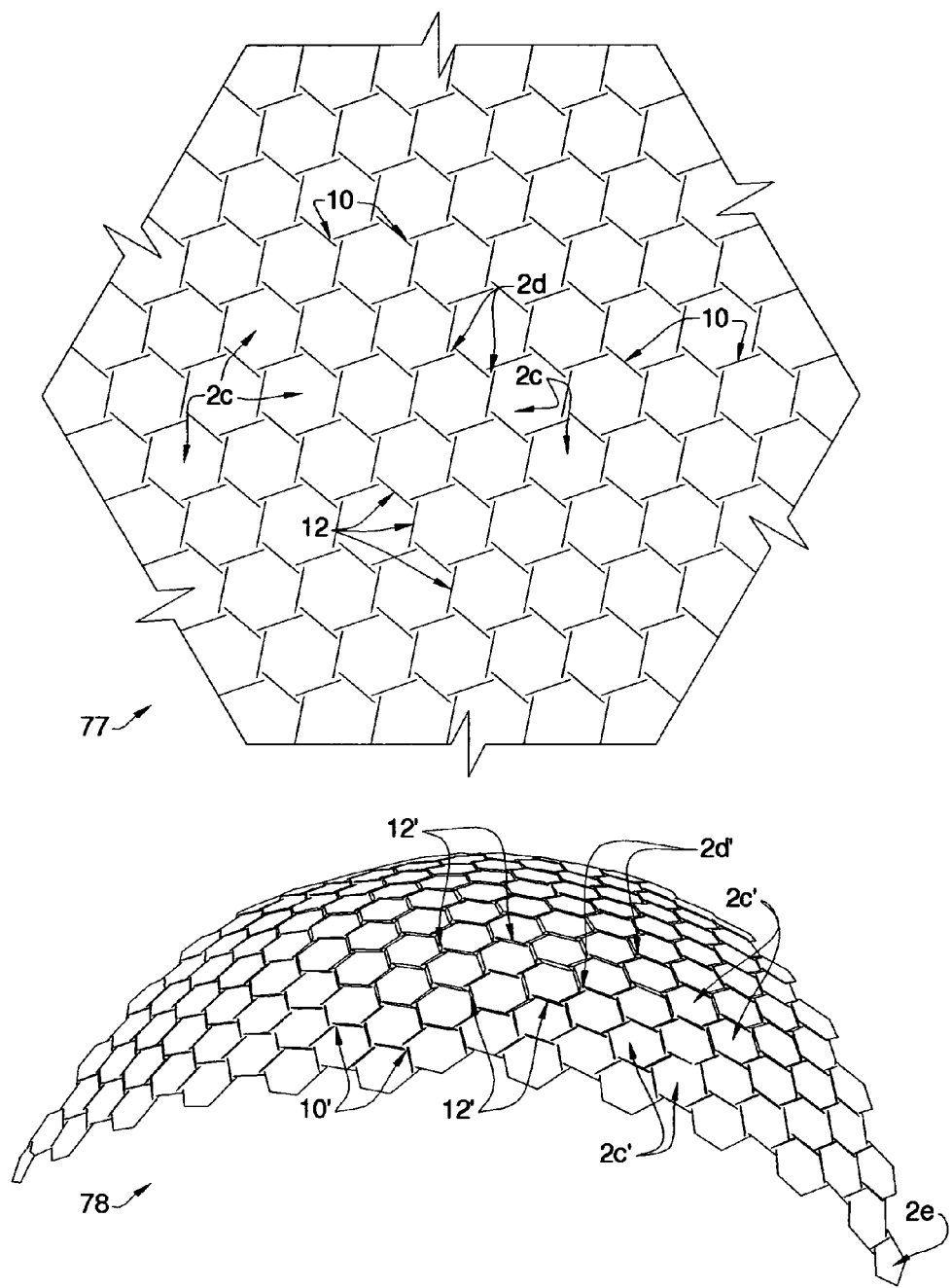
FIG. 18 shows a cutting pattern with hexagons surrounded by small triangles and a domical form after expansion.

FIG. 18, the unexpanded slit pattern 77 is also composed of hexagonal regions 2c surrounding small triangular regions 2d in a pinwheel arrangement. The polygonal regions meet at vertex regions 10 and are separated by slits 12. The slit pattern extends like a tiling pattern and can be configured in triangular, hexagonal or other layouts which can then be expanded. One example is shown with the expanded domical surface 78 obtained by the expansion of a triangular layout excerpted from 77. Surface 78 is obtained by applying a force against the surface of the sheet material to make it round as shown. As before, the expansion is made possible by the rotations of regions 2c and 2d to their new orientations 2c' and 2d', the slits variably expand to 12', and the vertex regions deform to 10'. In this particular example shown, pentagonal regions 2e can be added at some of the corners of the triangular regions to enable the construction of a spherically expanded geodesic sphere by joining twenty modules of 78.

Figure 19:
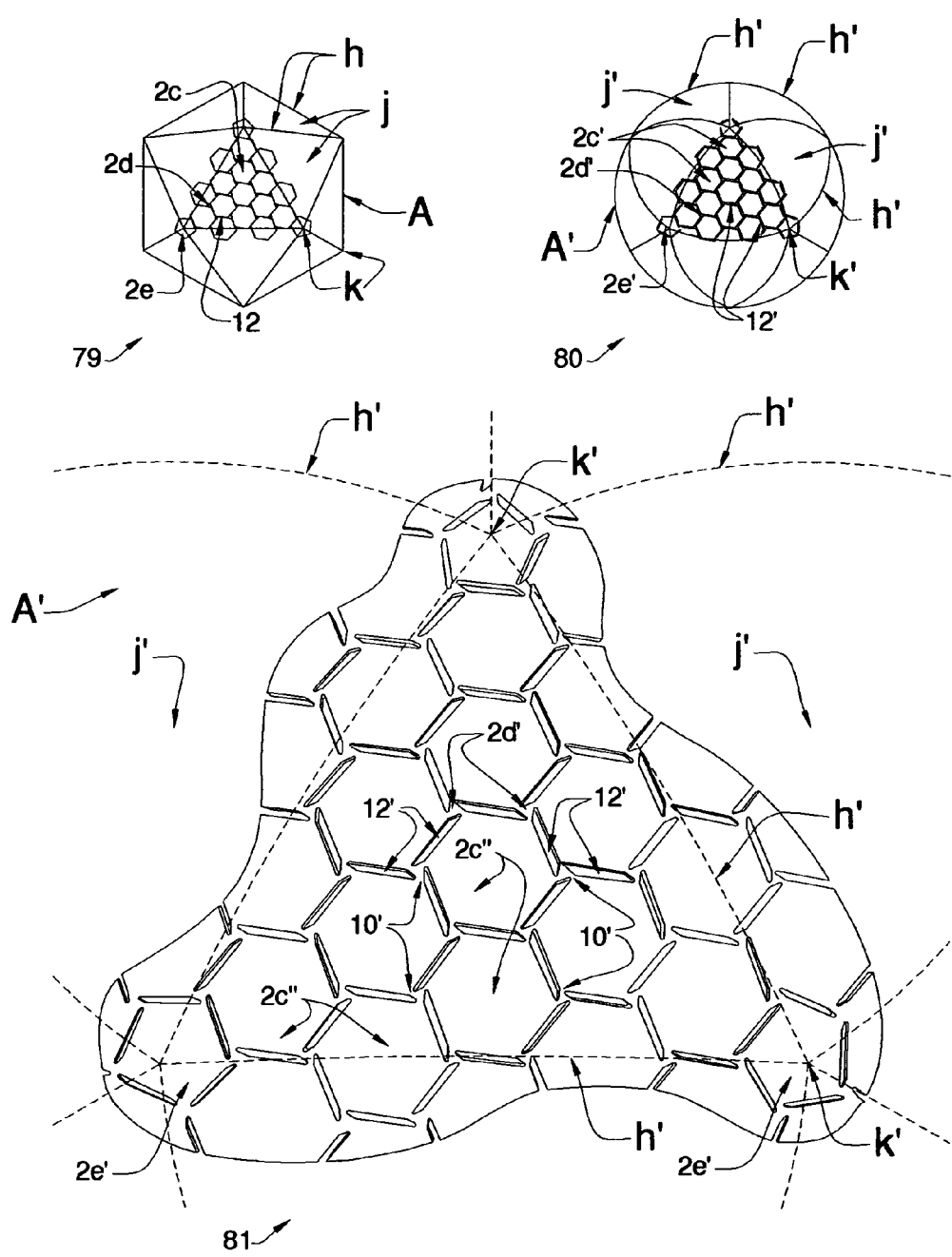
FIG. 19 shows the application of the slitting pattern in FIG. 18 to a net of twenty triangles defining a geodesic sphere.

FIG. 19 shows the application of the invention to a geodesic sphere. In 79, a portion of the flat slitting pattern 77 of FIG. 18 is selected to match one triangle face of the icosahedron A, a well-known regular polyhedron composed of twenty triangular faces j, thirty edges h, and twelve vertices k. The slitting pattern is composed of hexagons 2c surrounded by triangles 2d and demarcated by slits 12 as shown on one of the twenty triangular faces; the hexagons lying on the perimeter are shown shared with neighboring triangles. In the expanded state 80 and shown in detail 81, the icosahedron A has inflated to a spherical icosahedron A', the faces j have inflated to j', the edges h have curved to h' and the vertices k have changed to k'. The hexagons have rotated to 2c', the triangles have rotated to 2d', the slits have expanded to 12' and the vertex regions 10 have deformed to 10' to enable the expansion as before. The expanded slits 12' are warped parallelograms that vary in their shape according to their location on the sphere. The expanded sphere can be constructed by building individual triangular modules which are individually expanded by applying a force across the surface of the sheet material (as in pressing against a mould), and then attaching to each other or to a common structural framework. Alternatively, a flat-faced icosahedron could be constructed and then inflated by a pneumatic or a hydraulic force. In another embodiment, a spherical surface can be pre-slit according to the slitting pattern and then inflated by an internally applied radial force.

Figure 20:
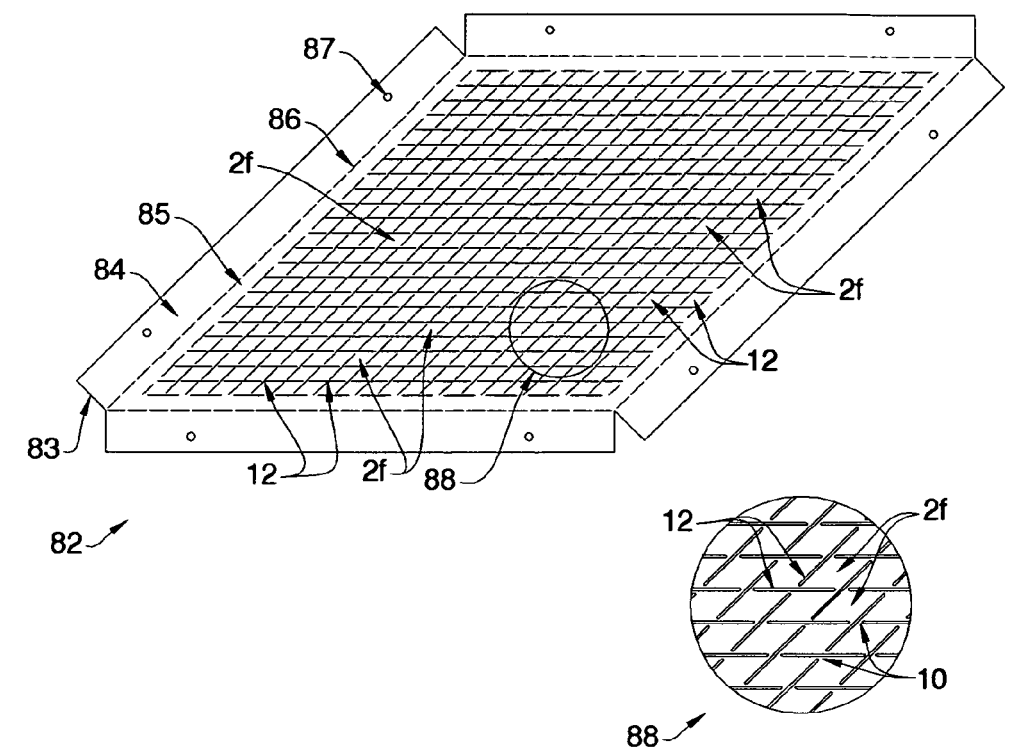
FIG. 20 shows a periodic rhombic grid slitting pattern and an expanded surface module which can be tiled with others by attachment along common flanges.
Figure 20:
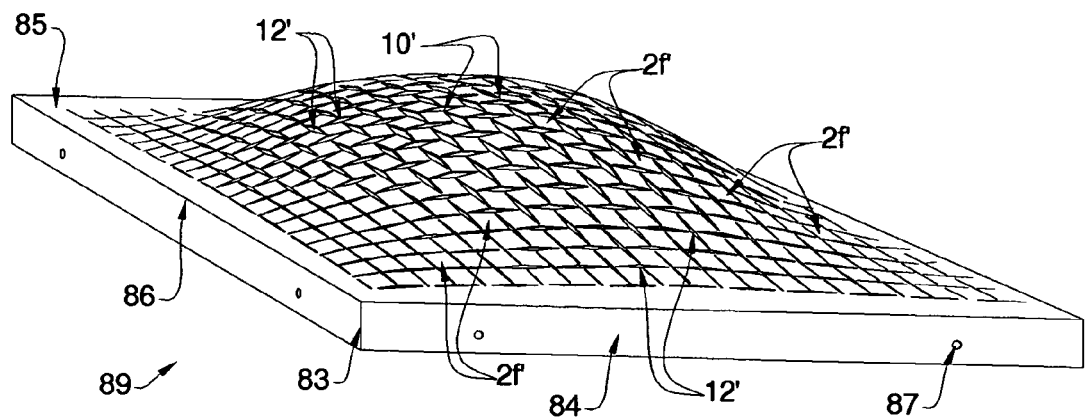

FIG. 20 shows a different design for a slitting pattern and its expansion into a domed module with rhombic plan geometry. The slit pattern and the unfolded layout of a reversed tray-type module is shown in 82, 88 is the detail of the slit pattern, and 89 shows the module after folding the flanges and then expanding the surface. In 82 and 88, the slit pattern is a rhombic grid composed of rhombic regions 2f meeting at vertex regions 10 and separated by slits 12. In the layout in 82, the pattern is bound by an uncut peripheral band 85 which is bordered by rectangular flange regions 84 which join at edges 83 after folding at edges 86 as shown in 89. In the expanded state of the surface material in 89, the rhombic regions have rotated to 2f', the slits have expanded variably to 12', and the vertices have morphed to 10' to enable the expansion. The expansion of the surface is achieved by applying a force against the surface, where a greater force is applied at the portion where the surface bulges the most and the force is graded towards the perimeter as the curvature becomes shallower. The force could be applied manually or with automated techniques of pressing into a pre-shaped mold.

Figure 21:
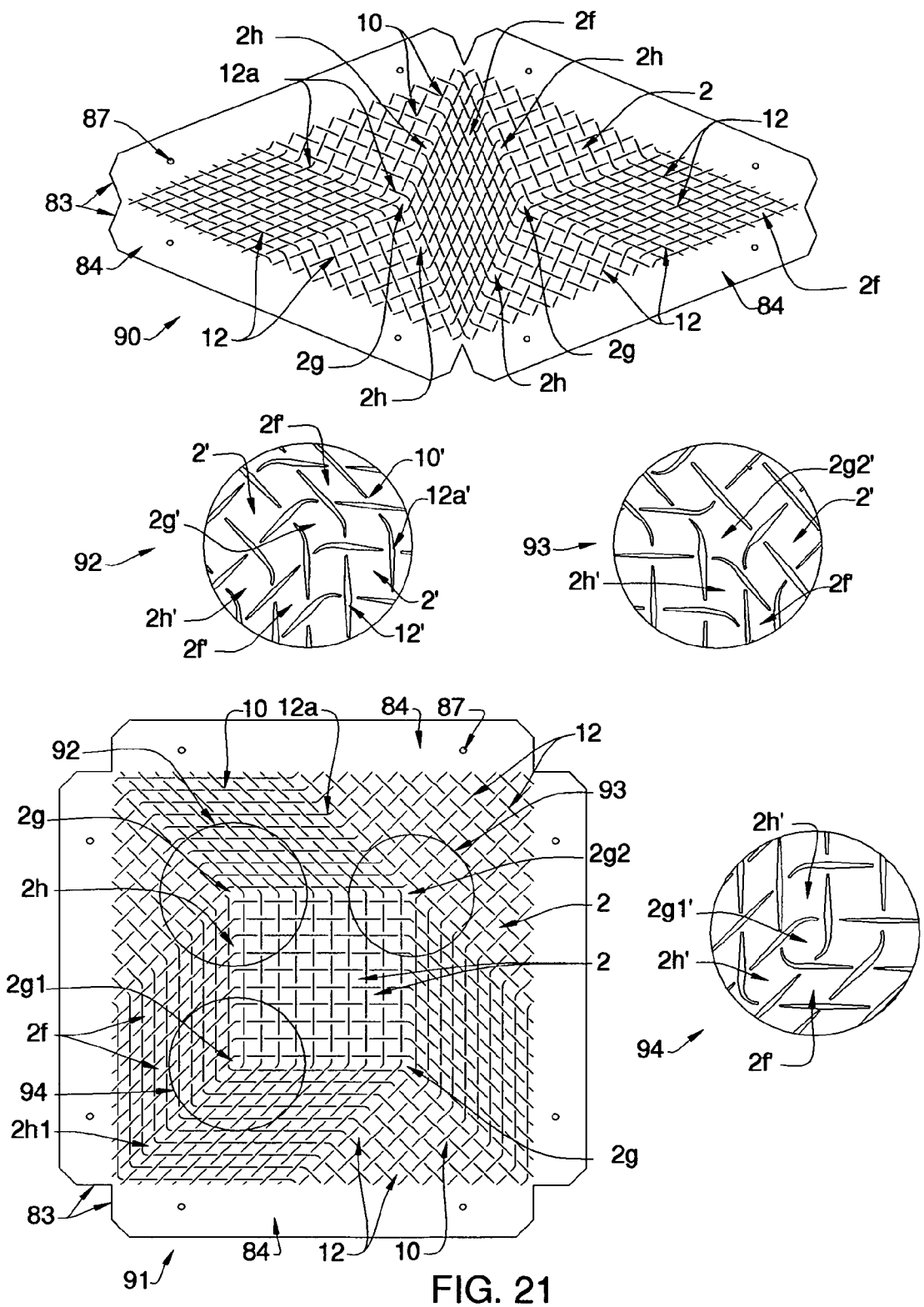
FIG. 21 shows slitting patterns for two different modules, each pattern comprising square and rhombic grids which can be expanded to produce curved surfaces and the modules can be extended non-periodically.

FIG. 21 shows two different designs 90 and 91 for slitting patterns for folded tray-type modules with an expandable surface. The overall geometry of both designs is based on dividing the modules into large polygonal regions which are further subdivided into smaller polygonal regions. Module 90 is divided into three large 45 degree rhombuses and four half-squares (45 degree isosceles triangles) which are then subdivided into smaller rhombic and square grids. Module 91 is divided into four larger rhombuses, one large square and four large 45 degrees isosceles triangles (half-squares). In both designs, the small square regions 2 within the square grid and small rhombus regions 2f within the rhombic grid meet adjacent small squares and small rhombuses at vertex regions 10 and are separated by slits 12. The square grids and rhombic grids meet along linear arrays of "bent" quadrilateral regions 2h. These linear arrays of 2h meet at "bent" quadrilaterals 2g in 90. In 91, these linear arrays meet at a "bent" triangle 2g 1, two "bent" quadrilaterals 2g, and one "bent" pentagon 2g 2. In the expanded states 92-94, the slits 12 expand to 12', bent slits 12' expand to 12", vertex regions 10 change to 10', the square regions 2 rotate to 2', the rhombic regions 2f rotate to 2f' and the "bent" polygons 2h rotate to 2h', 2g to 2g', 2g1 to 2g1', and 2g2 to 2g2'. The modules are folded into trays by bending the flanges 84 which are joined at edges 83. The slots 87 enable the joining between the folded modules. After folding, the surface is expanded by applying a physical force against the surface and the 3d are assembled in periodic or non-periodic configurations.

Figure 22:
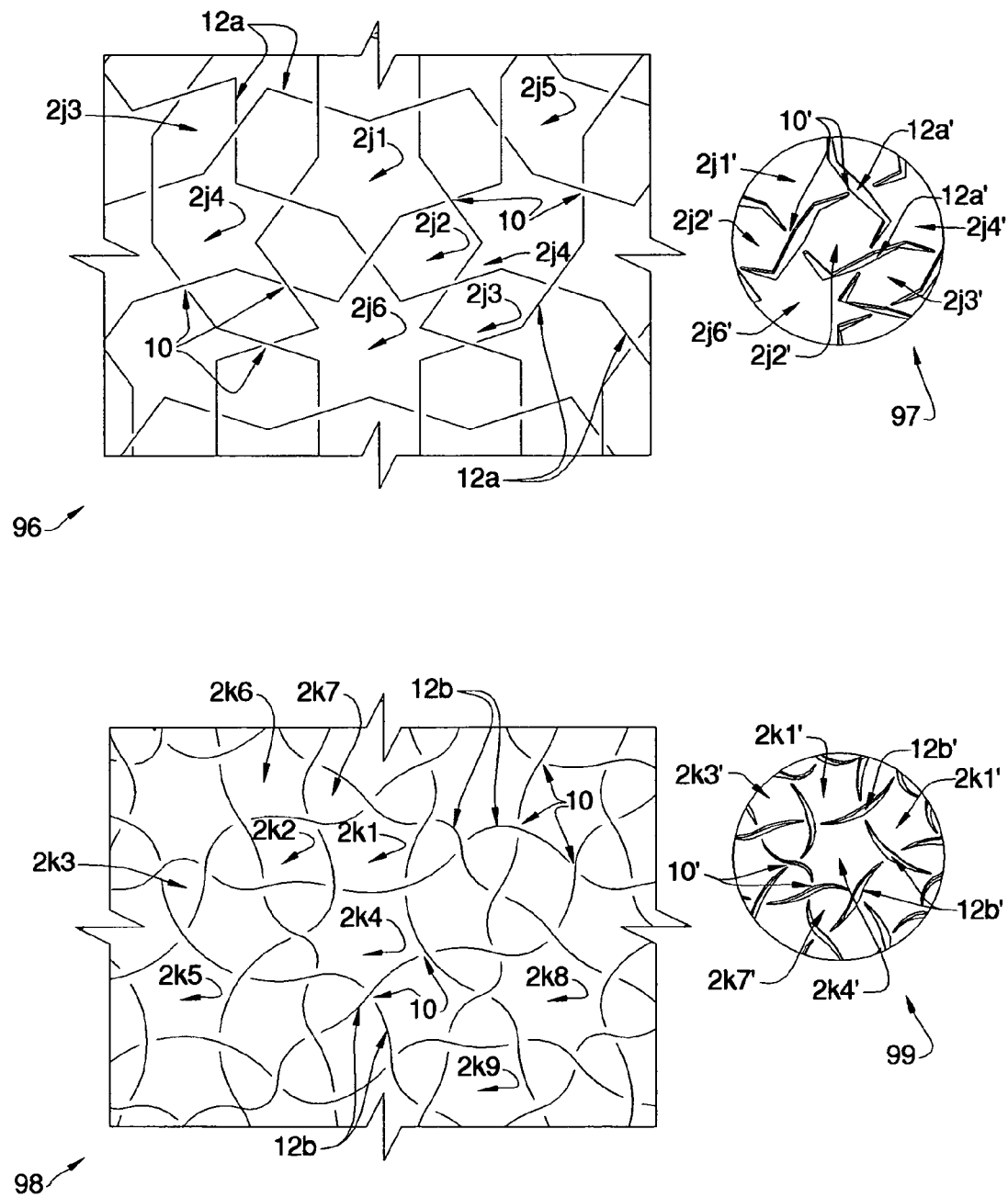
FIG. 22 shows two non-periodic slitting patterns, one with straight-bent slit edges and the other with curved slit edges, both derived from the Penrose tiling.

FIG. 22 shows two non-periodic slitting designs 96 and 98 based on the subdivision of Penrose tiling. In 96, the bent slits 12' bound the polygonal regions 2j1, 2j2, 2j3, 2j4, 2j5 and 2j6 with different number of sides and meet adjacent polygonal regions at vertex regions 10. In the expanded state 97, the slits have expanded to 12", the polygonal regions have rotated to their corresponding rotated states 2j1', 2j2', 2j3', 2j4' and 2j6', and the vertex regions 10 have morphed to 10' in the detail portion shown. Design 98 is related to 96 in its underlying topology though it is shown for a different portion of the tiling design. The main difference between the two is that the bent slits 12' have been replaced with curved slits 12b. The curved polygonal regions 2*k*1 thru 2*k*9 are bound by 12*b* and meet each other at vertex regions 10. In the expanded state 99 shown in detail, the slits 12*b* have expanded to 12*b*', the polygonal regions have rotated to their corresponding rotated states 2*k*1', 2*k*3', 2*k*4' and 2*k*7', and the vertex regions 10 have transformed to 10' to enable the expansion. These two surfaces can be expanded by pulling along the surface of the sheet material in five or ten directions, or by pushing against the surface of the material.

Figure 23:
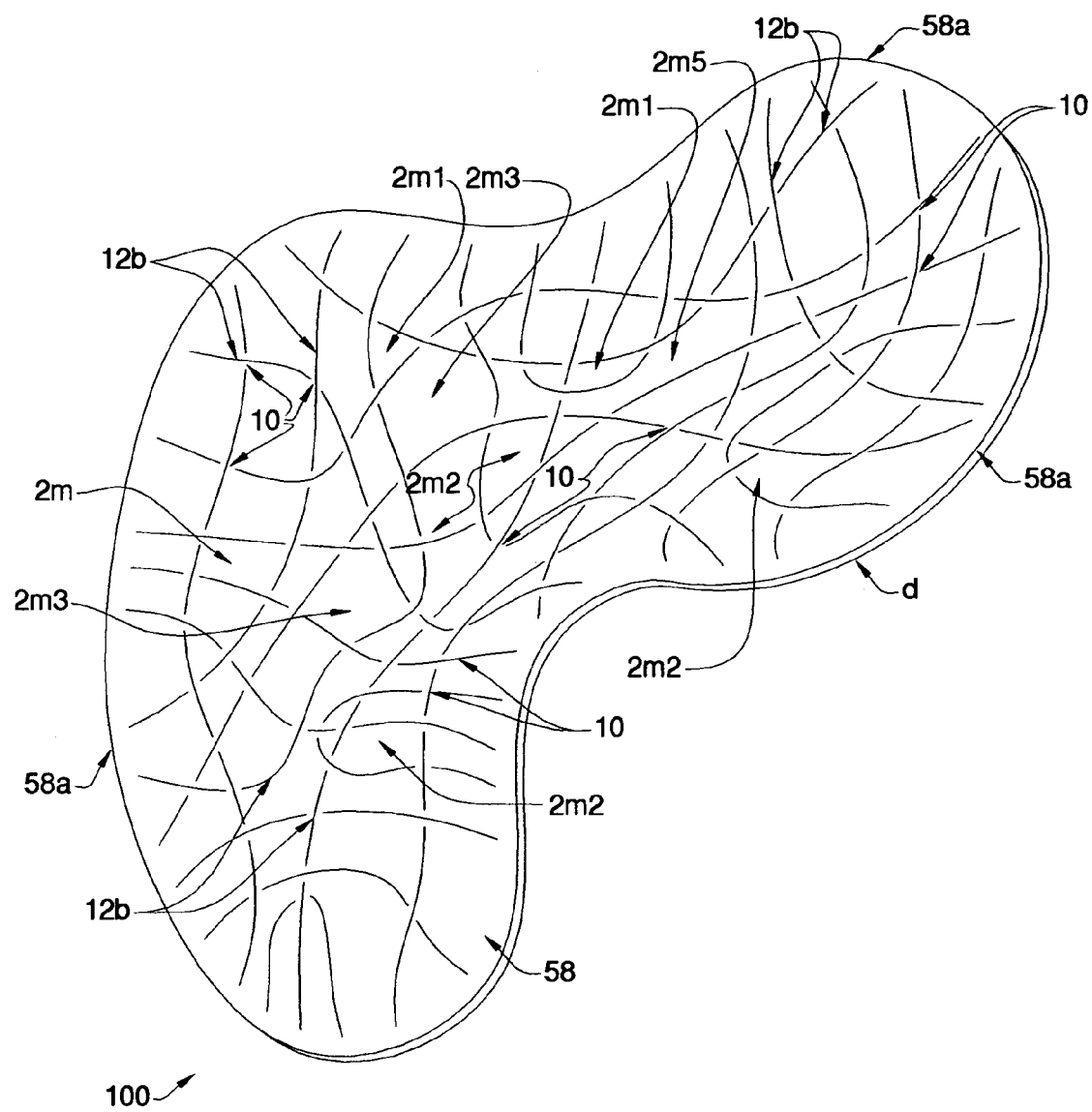
FIG. 23 shows an irregular slitting pattern with curved cutting lines.

FIG. 23 shows and irregular slitting design 100 composed of irregular polygonal regions with a varying number of sides bound by vertex regions 10 and irregular curved slits 12*b*. In the example shown here, the polygonal regions are 3-sided regions 2*m*1, 4-sided regions 2*m*2, 5-sided regions 2*m*3 and 7-sided region 2*m*5. The profile of the design shown is an irregular closed curve with an outer rim 58*a* having a depth d. The slits ending at the perimeter are separated from 58*a* by an un-slit region 58.

Figure 24:
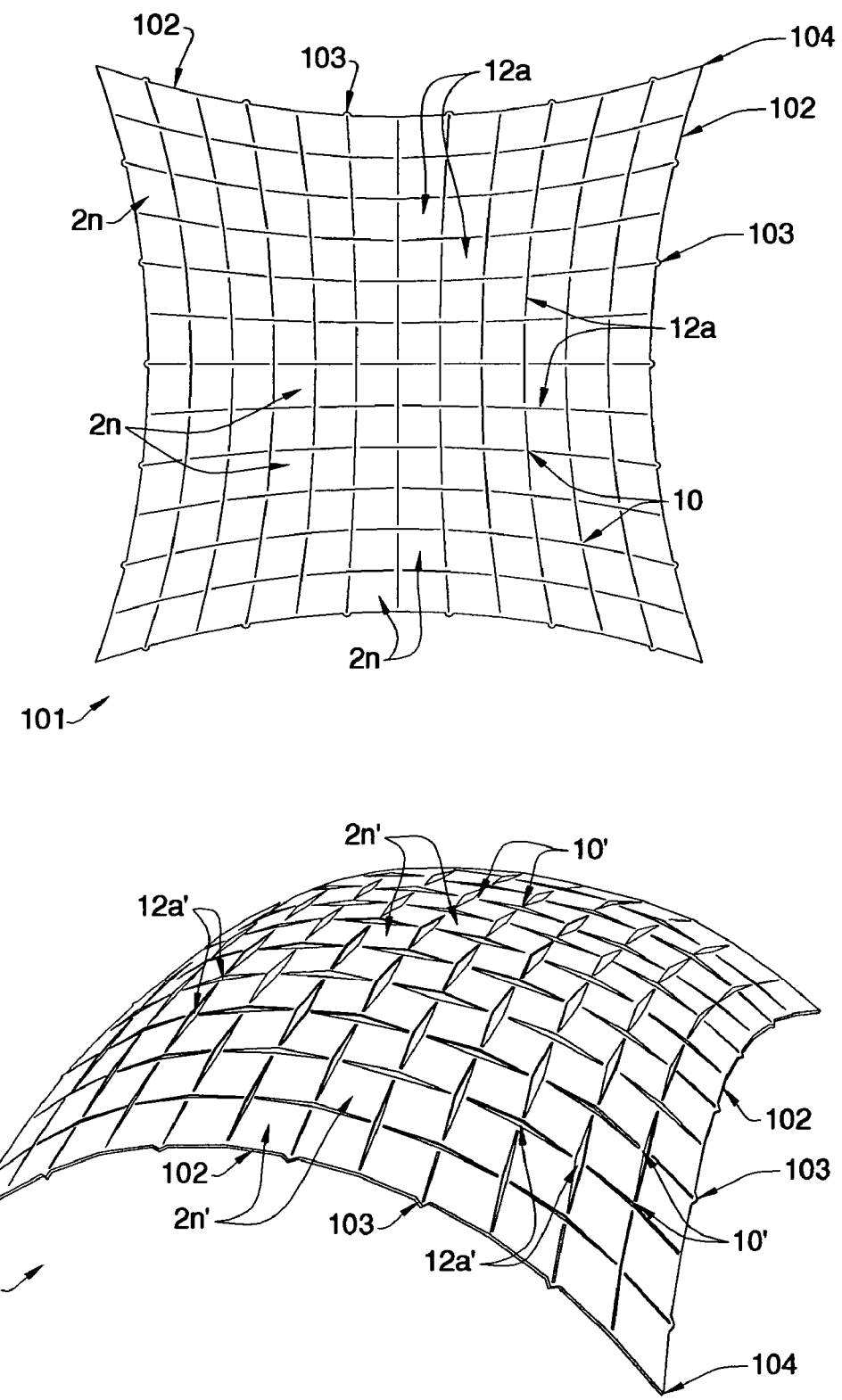
FIG. 24 shows a concave-edged module having a curved grid slitting pattern and its expanded domical state.

FIG. 24 shows the slitting pattern 105 with a curved grid and its expanded state 101. The unexpanded surface 105 is composed of curved quadrilateral regions 2*n* bound by slits 12 and vertices 10. The sheet material has concave boundary edges 102 meeting at corners 104 and an articulation 103 at every other vertex along the periphery to accommodate the slit. In the expanded state 101, the regions 2*n* have rotated to 2*n*', the slits 12 have expanded to 12' and the vertices 10 have changed to 10'. The expansion is caused by applying a force against the surface, with or without a forming surface like an anvil or a mold. In the expanded state, the outer edge 102' is curved in elevation.

Figure 25:
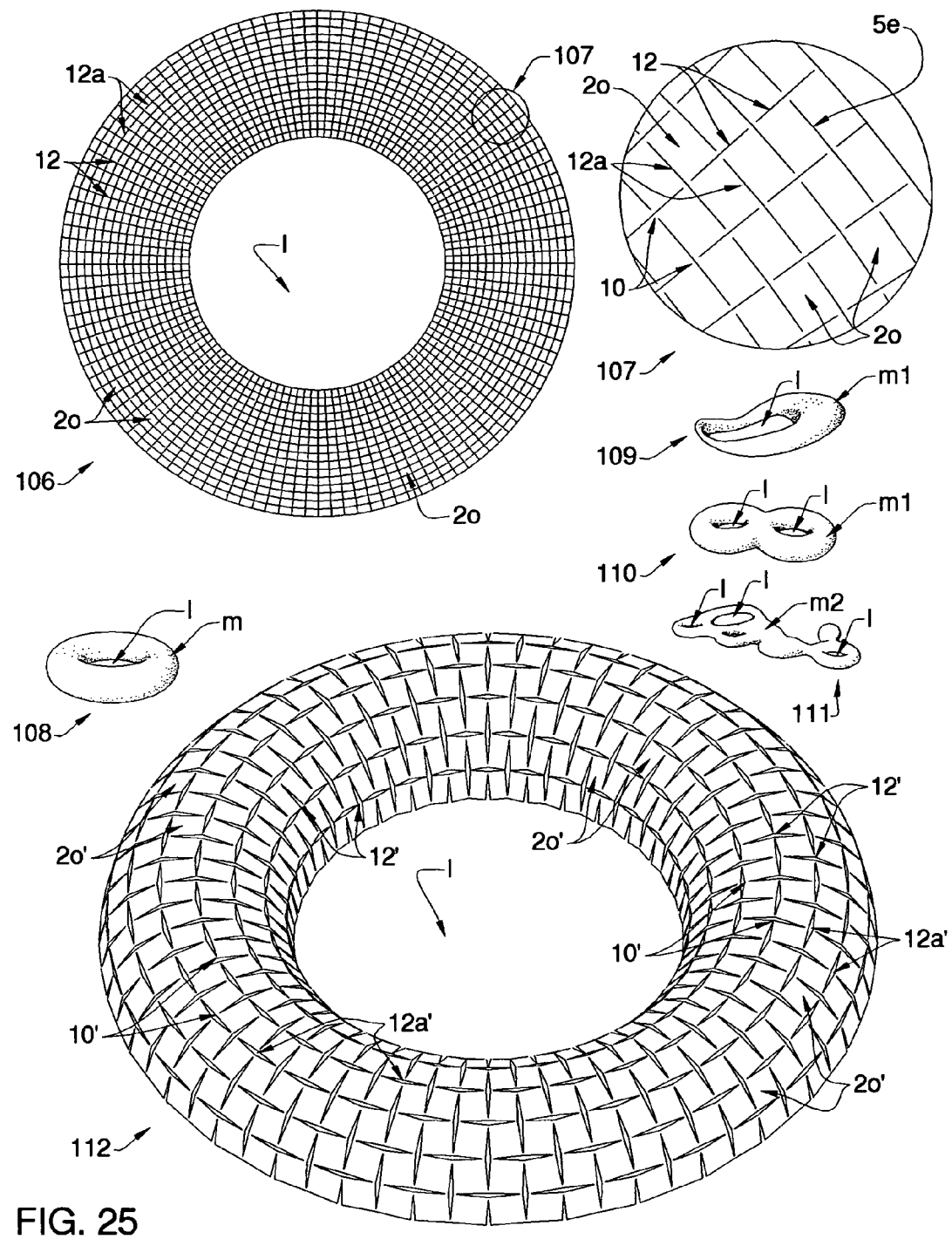
FIG. 25 shows a circular (radial) slitting pattern composed of trapezoids and its expansion into a portion of a torus and various toroidal surfaces.

FIG. 25 shows a radial slit pattern 106 shown in detail 107 and in one of its expanded state 112 which is the upper portion of the donut surface 108 shown schematically. Pattern 106 is composed of straight radial slits 15 and curved slits 12' which define curved quadrilateral regions 2*o*, and the central hole 1. In 107, the alternating arrangement of slits 12 and 12' around vertex regions 10 that bound quadrilaterals 2*o* is clearly visible. It is similar to the square grid slitting patterns shown earlier, e.g. 22 in FIG. 4. After expansion into a toroidal surface 112, the quadrilaterals have rotated to 2*o*', radial slits 12 have expanded to 12', the curved slits 12*a* have expanded to 12*a*', and the vertices 10 have transformed to 10' to enable the expansion. 109-111 shows schematic diagrams of variants of 108-109 is the double-torus surface m2 around two holes 1, 110 is the irregular torus surface m1 with a single hole, and 111 is an irregular 3-hole donut surface m3. Multi-holed toroidal surfaces, toroidal tilings and space-fillings with regular or irregular geometries can be expanded as well. The shaping force for toroidal surfaces would require a variable anvil surface or a rigid anvil around which the surface is moved progressively, or a fixed mould into which the surface is pressed by the negative mold.

Figure 26:
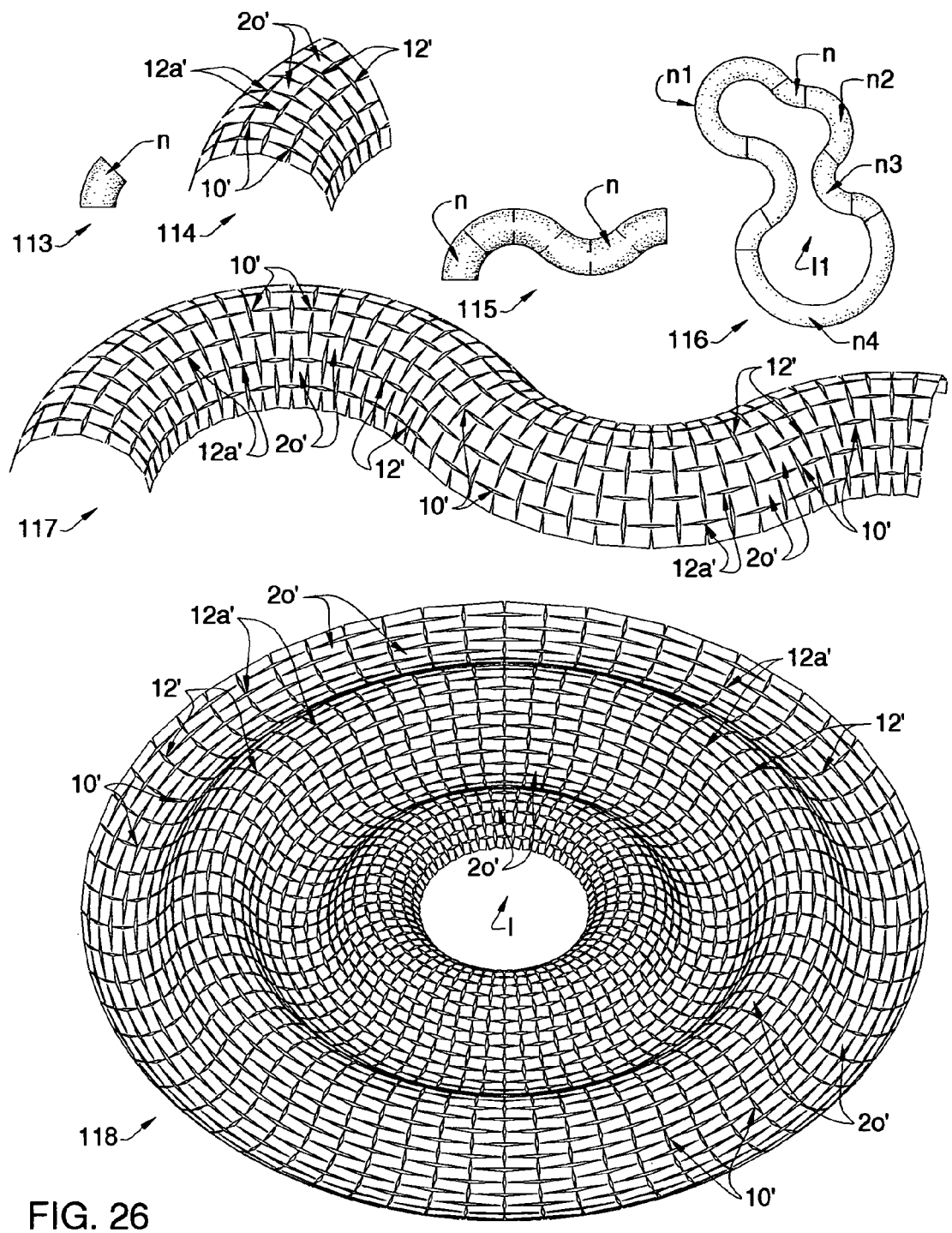
FIG. 26 shows a rippled expanded surface and other surfaces obtained from modules that are portions of a torus; the slitting patterns of the latter are pie-shaped segments of the circular pattern in FIG. 25.

FIG. 26 shows some extensions of the expanded surfaces in FIG. 25. 113 shows a schematic view of the surface n, a pie-segment of the upper half of a torus, and its expanded version 114 which is comprised of rotated quadrilaterals 2*o*' bound by expanded slits 12' and 12*a*' and transformed vertex regions 10'. The module n is repeated in an undulating group of six modules in 115 and as shown in the expanded state 117. The modules n are combined with modules n1, n2, n3 and n4 to form an irregular undulating torus around the hole 11 as one example. The concentric rippled surface shown in its expanded state in 118 is derived from a slitting pattern layout similar to 106 in FIG. 25 and can be thought of as a concentric configuration of alternating upper and lower portions of toruses of increasing diameter beginning with the innermost one similar to 112 in FIG. 25.

Figure 27:
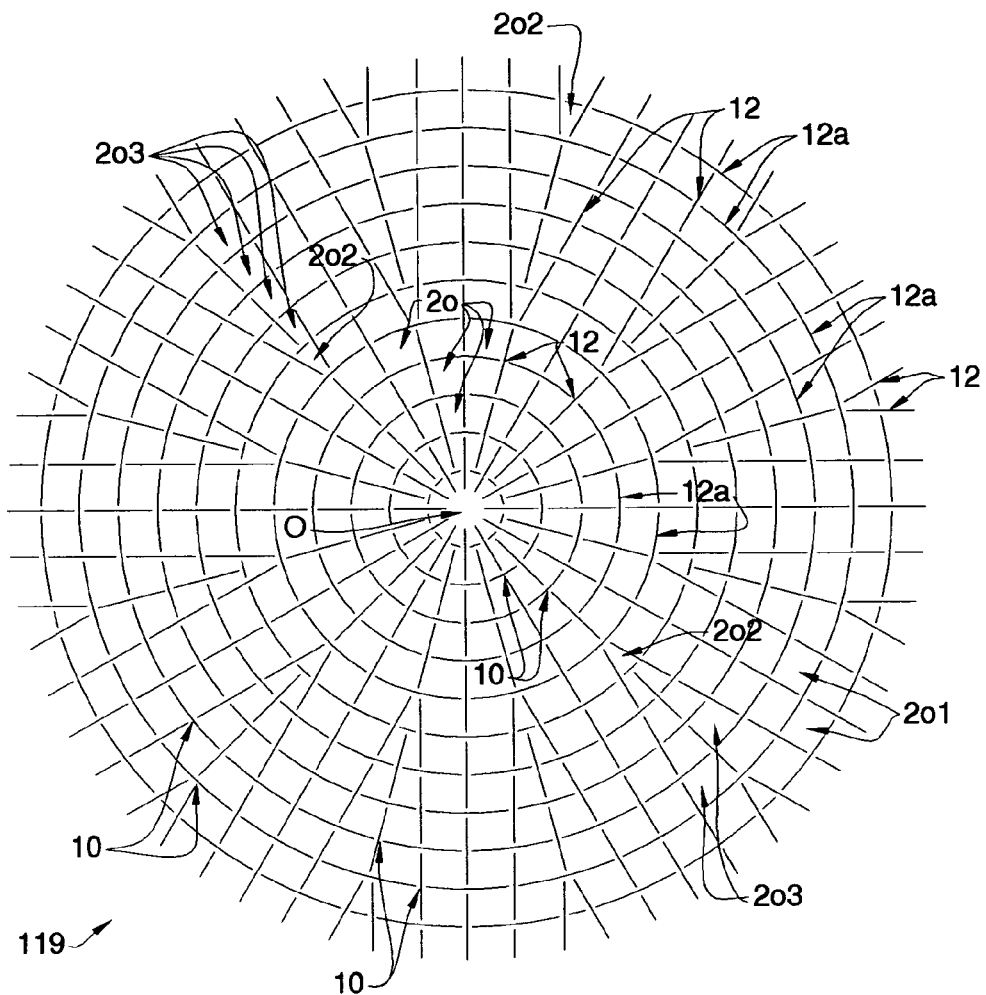
FIG. 27 shows an alternative circular slitting pattern.

FIG. 27 shows a different radial design 119 for a slitting pattern. The pattern branches successively at 12 symmetrically arranged points in a 12-fold symmetry. The central portion of four rings around the iris O has a pattern similar to 106 in FIG. 25 and is composed of curved quadrilaterals 2*o* bound by slits 12 and 12*a* and vertex regions 10. After this the pattern branches successively at regions 2*o*2 after every four rings. The polygonal regions within the branched portions comprise quadrilaterals 2*o*3 of increasing size, and then the pattern repeats. The portion between the branched portions is a periodic repeat of regions 2*o*1. Regions 2*o*1 and 2*o*3 are also bound by slits 12 and 12*a* and vertex regions 10. The pattern can be expanded by applying a force against the surface as in previous examples.

Figure 28:
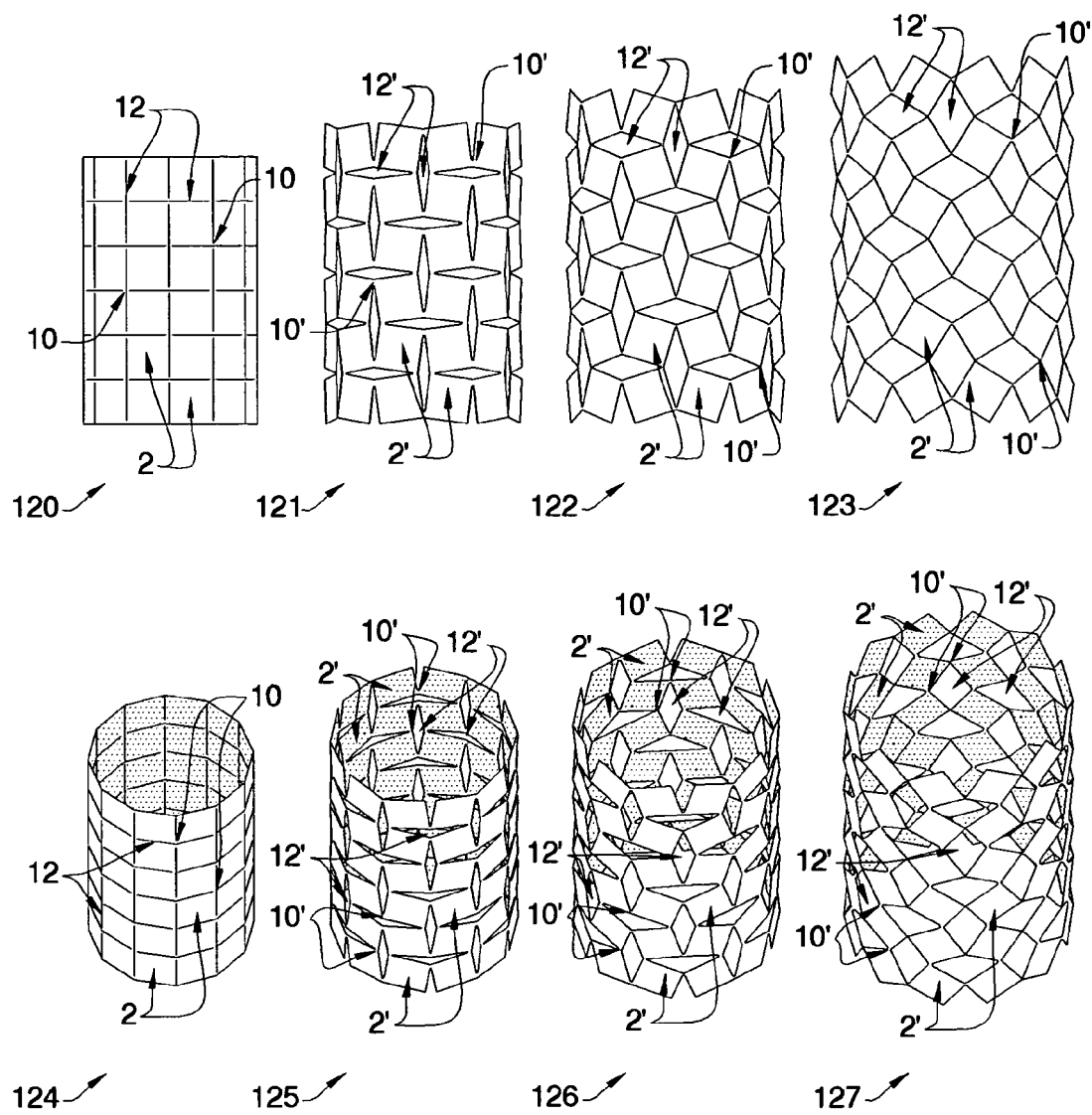
FIG. 28 shows a cylindrical slitting pattern and its expanded cylindrical states in various stages of expansion.

FIG. 28 shows an expanding cylinder as another embodiment of the invention. It is shown in four stages of expansion in elevations 120-123 and in corresponding 3-dimensional views 124-127. The unexpanded states 120 and 124 show a sheet material in a cylindrical form with a square grid slitting pattern along the surface of the cylinder. It is composed of flat square regions 2 bound by slits 12 and vertex regions 10. In the expanded states 121-123 and 125-127, the square regions have rotated to 2', the vertex regions have transformed to 10' and the slits have expanded to 12'. The unexpanded cylinder could be constructed from a flat sheet material with slitting pattern and then rolled into a cylinder and its ends seamed, or an un-slit cylindrical sheet material could be slit in its cylindrical form in one of several ways. The cylinder is expanded by applying an outward radial force along its entire length. In the case of pliable sheet material, 124 could be wrapped around a cylindrical object, or objects of another shape, larger than the unexpanded cylinder or it could act as an expandable protective or insulating sleeve for that object.

Figure 29:
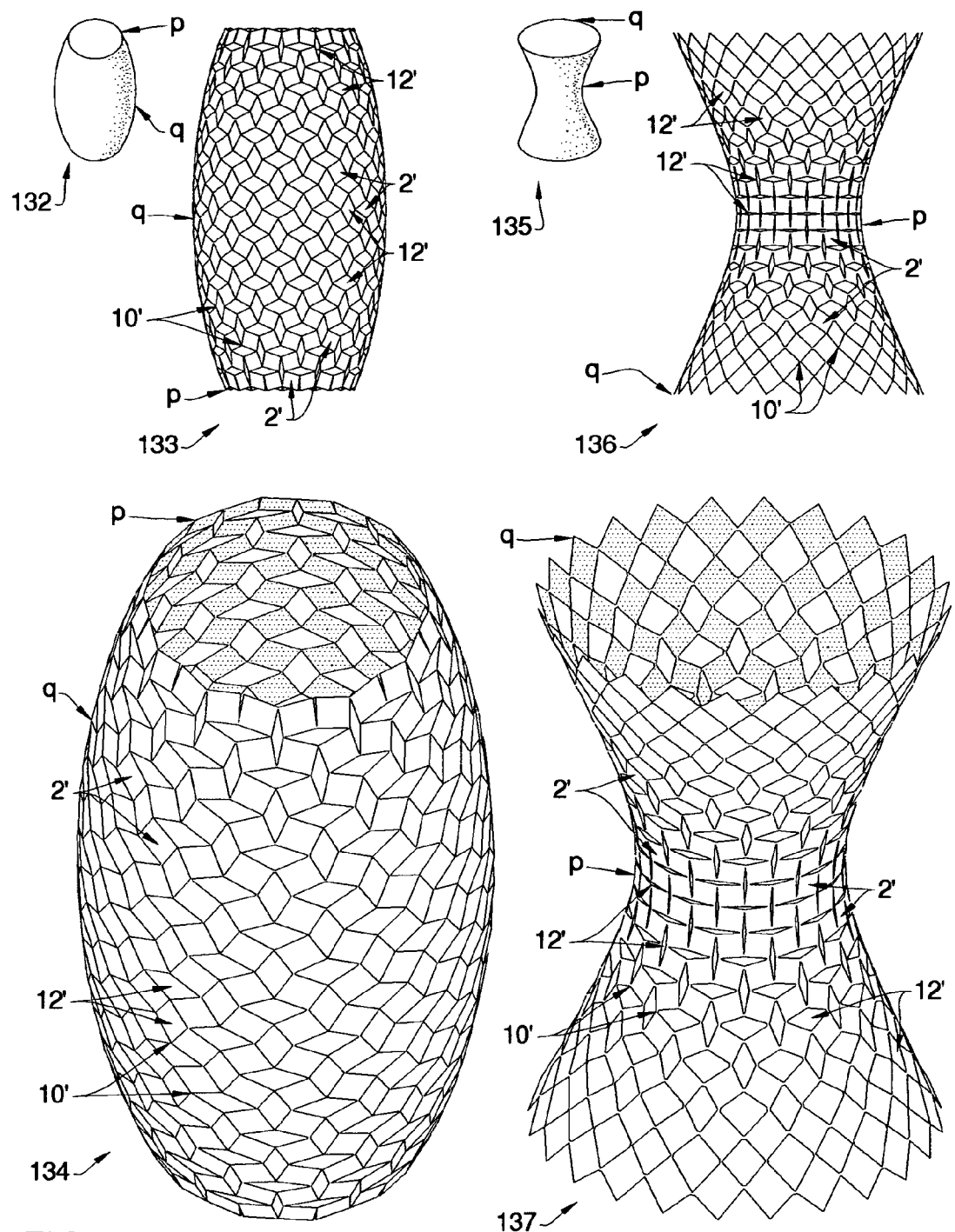
FIG. 29 shows two different expanded states, one concave (hyperboloid) and the other convex (portion of an ellipsoid), obtained from a cylindrical slitting pattern.

FIG. 29 shows a variant of the embodiment in FIG. 28. Here the expansion if the cylinder is variable and the difference in expansion of the sheet material is taken up by a variable deformation of the vertex regions. 132 and 133 are two expanded states of a cylinder; 132 has a positive curvature like a portion of an ellipsoid (an ellipsoid that has been truncated at the top and bottom ends), 133 has a negative curvature like a hyperboloid. The corresponding expanded states are shown in elevation in 133 and 136, and in corresponding 3-dimensional views in 134 and 137. Both embodiments start with an unexpanded cylindrical slitting pattern similar to 124 in FIG. 28 but with a larger square grid. In the expansion process, a variable force is applied. For example, in 133, the convex region q requires a greater expansion, and hence a greater force, than the concave region p. This situation is reversed in 136. A variable force can be achieved by a variably expanding mold, or by a graded expansion beginning from one end to the other or from the center out towards the opposite ends of the expanding cylinder. The various parts of the surface expand similarly to those in FIG. 28, but with a variable expansion determined by the desired curvature of the expanded surface. The unexpanded square regions expand to 2' by a variable rotation, the slits expand to 12' by a variable expansion, and the vertex regions squish variably to 10'. As in the plain cylinder, the unexpanded state could be rolled up from a flat sheet material with a pre-formed squire grid slitting pattern, or it could be marked on a seamless pre-formed cylinder. The latter will require some special tooling like a cylindrical cutting device like die or a laser-cutter, for example.

Figure 30:
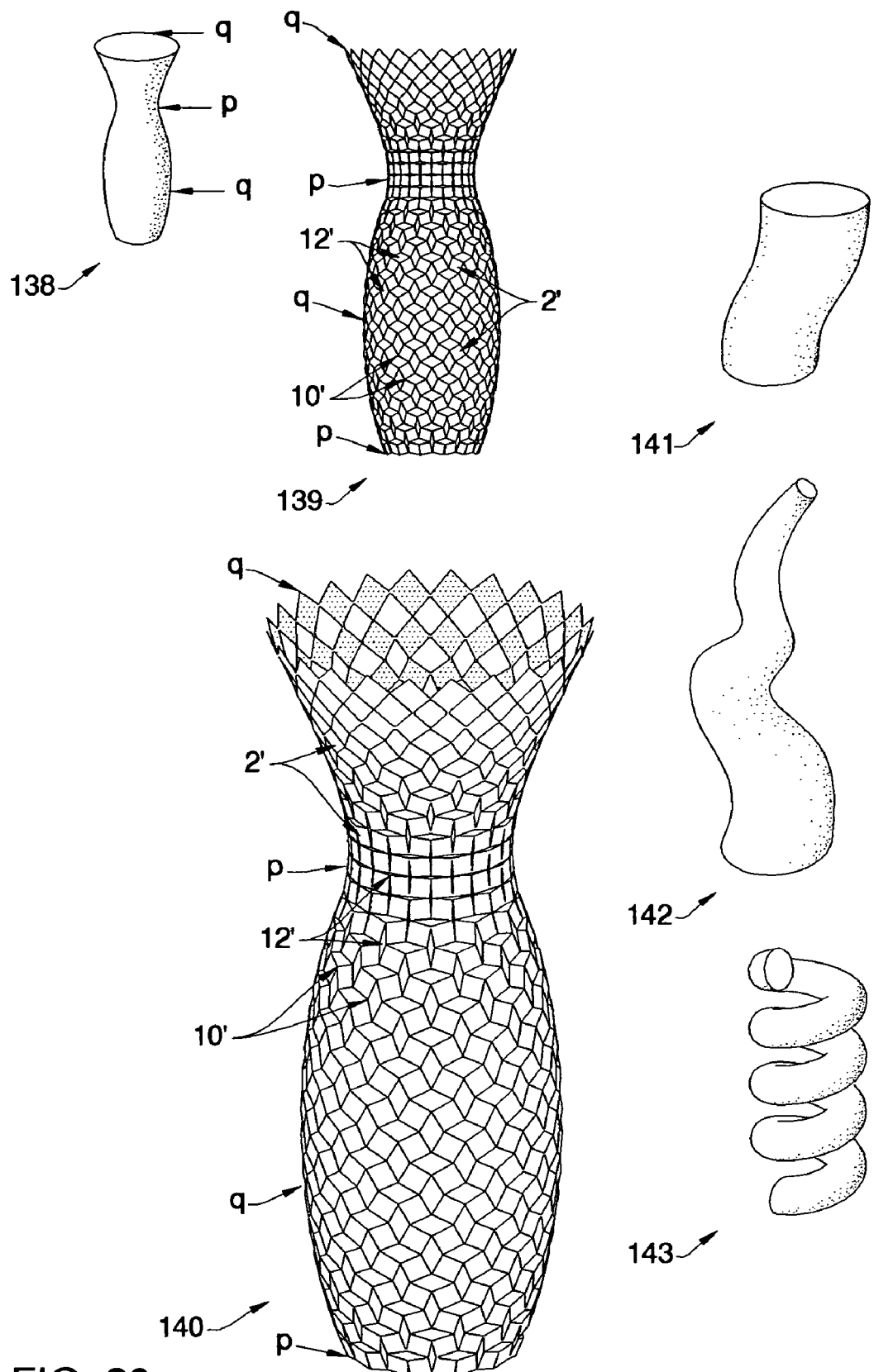
FIG. 30 shows the undulated tubular surfaces from expansion of cylindrical slitting patterns.

FIG. 30 shows other examples of tubular surfaces that are derived by expanding a cylinder or a cone in a continuously variable manner by applying a continuously variable force. This could be done in various ways—manually, by pressing progressively against a fixed or variable mold, or by applying a variable force without a mold. 139 is a schematic surface obtained by joining 132 and 135 of FIG. 29. 139 and 140 are its expanded versions in elevation and a 3-dimensional view, respectively. Its is composed of alternately rotated square regions 2', bound by expanded slits 12' meeting at deformed vertex regions 10'. The surface can be repeated to make an undulated cylinder. Other possible embodiments of the invention include other tubular surfaces some of which are shown schematically, for example, a swayed cylinder 141, an irregular undulating conical surface 142, and a helical cylinder 142.

Figure 31:
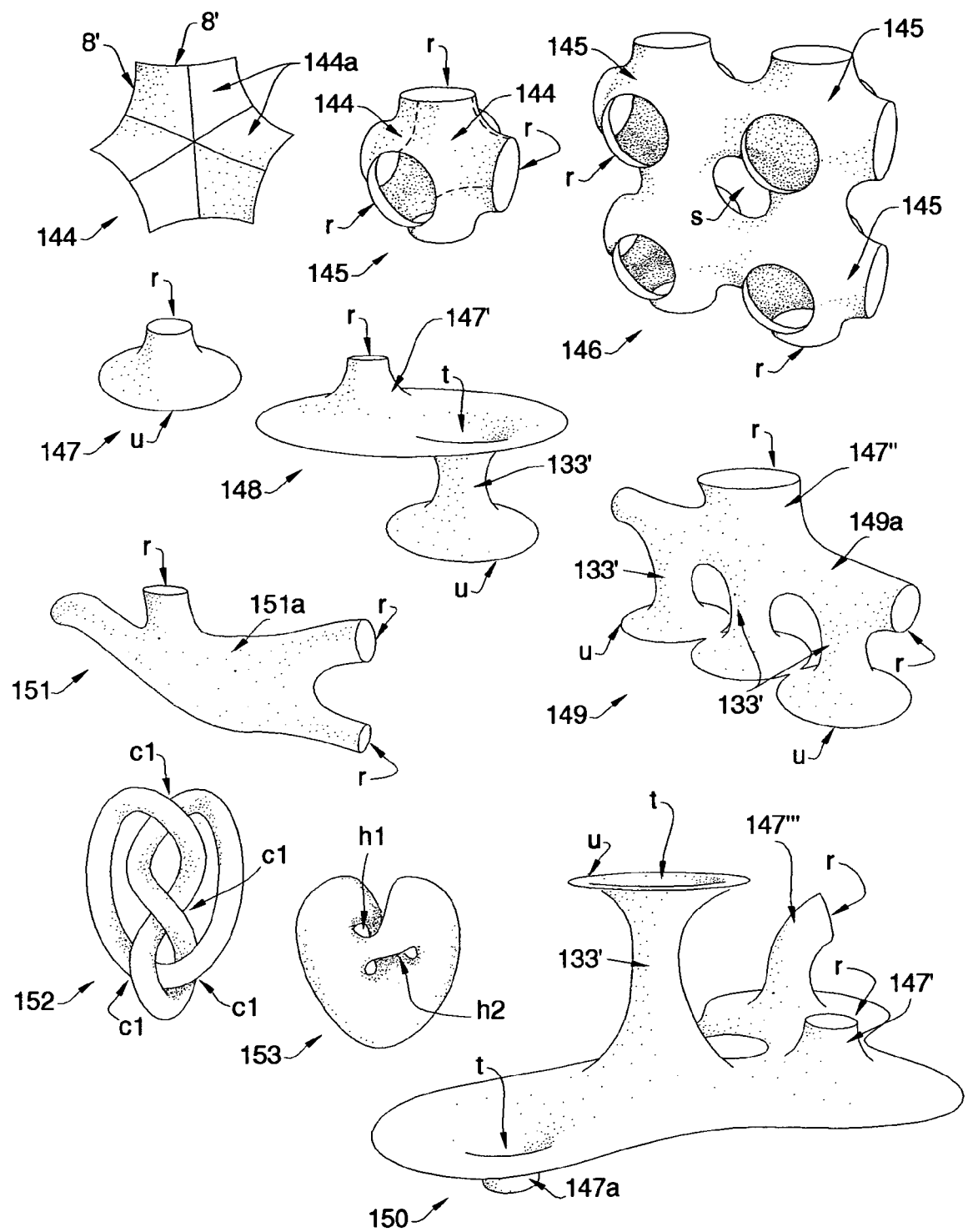
FIG. 31 shows various topological surfaces including tubular branched or labyrinth-like surfaces obtained by expansion of surface slitting patterns joined to one another.

FIG. 31 shows various schematic diagrams of topological surfaces that can be made based on the invention by expanding sheet materials with slitting patterns. In most of the instances shown, the surface is made in parts which are joined together to make a continuous surface. These parts will introduce seams in the surface and are not shown. Depending on the scale of the structure, a supporting structure may or may not be needed. 144 is a saddle hexagon, bound by six curved edges 8' in alternately convex and concave arrangement, and composed of either six curved quadrilaterals 144a as shown or three curved pentagonal surfaces, each obtained by joining two adjacent quadrilaterals 144a. Eight saddle hexagons 144 can be joined to make a 3-dimensional module 145 bound by six rings r which itself is a module for the Schwarz surface 156 with openings at r and s; this is a continuously extendable surface that divides space into inside and outside without intersecting itself 148-153 show a few examples of other topological surfaces that can be constructed using expanded sheet material based on the invention. 147 is a hyperbolic surface, a truncated pseudo-sphere with a base ring u and a ring r at a plane which truncates the vertex of the pseudo-sphere. 148 is a fusion of surface 147' and 133', where the former is based on 147 and the latter on 133 in FIG. 29. 149 is a composite surface comprising portions similar to 133' fused to a tubular surface 149a having a neck 147". 150 is another continuous surface with appendages 147', 147''', 147a and 133"; 151 is a four-pronged tubular surface 151a; 152 is a figure-8 knot configured as a hollow tube that crosses over itself four times at regions marked c1; 153 is a heart-shaped surface obtained by deforming a 2-hole donut surface having "holes" h1 and h2.

Figure 32:
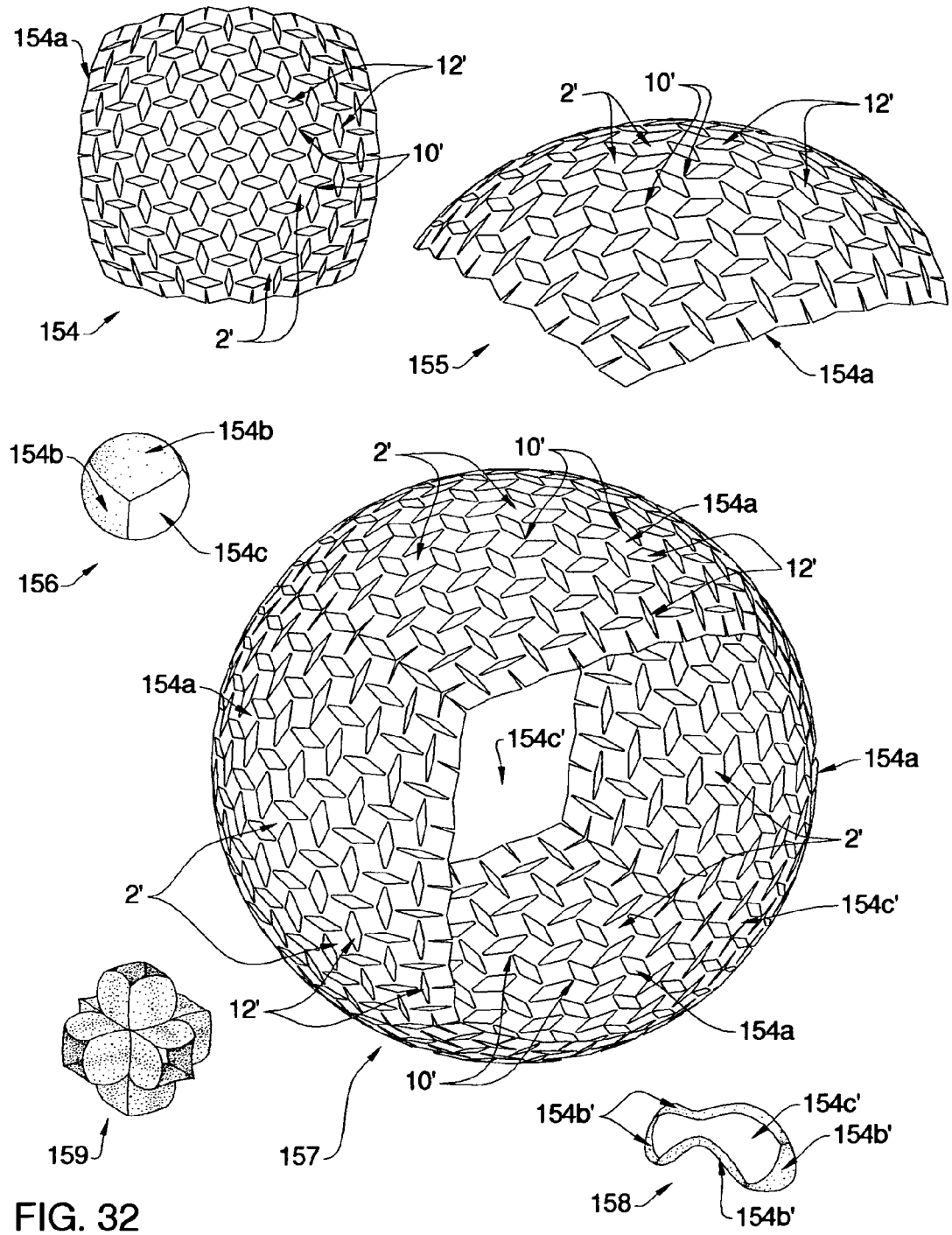
FIG. 32 shows four expanded square grid modules joined to produce a surface as a portion of a sphere-projected cubical surface or an undulating space-filling surface.

FIG. 32 shows a curved four-sided module 154a in plan view 154 and in a 3-dimensional view in 155. It is a spherically expanded surface from a 12×12 square grid slitting pattern and is composed of rotated squares 2' bound by expanded slits 12' meeting a transformed vertices 10'. In 157, four 154a modules are joined to one another in a spherical configuration with front and back ends 154d open. This configuration is shown schematically in 156 with surfaces 154b and open ends 154c. Schematic diagram 158 is an irregular derivation of 156 with surfaces 154b' and openings 154c'. 159 is a schematic view of a portion of an extendable space labyrinth composed of 3-dimensional modules 159a comprising 4-sided curved surfaces 159b, which can be expanded surfaces based on the invention, and openings 159c. This surface is similar to 146 in FIG. 31 and divides space into two parts but with the difference that two adjacent surfaces 159b are not smoothly continuous from one to the other but share a common edge where they meet. Other modular space-filling surfaces can be similarly built from this invention.

Figure 33:
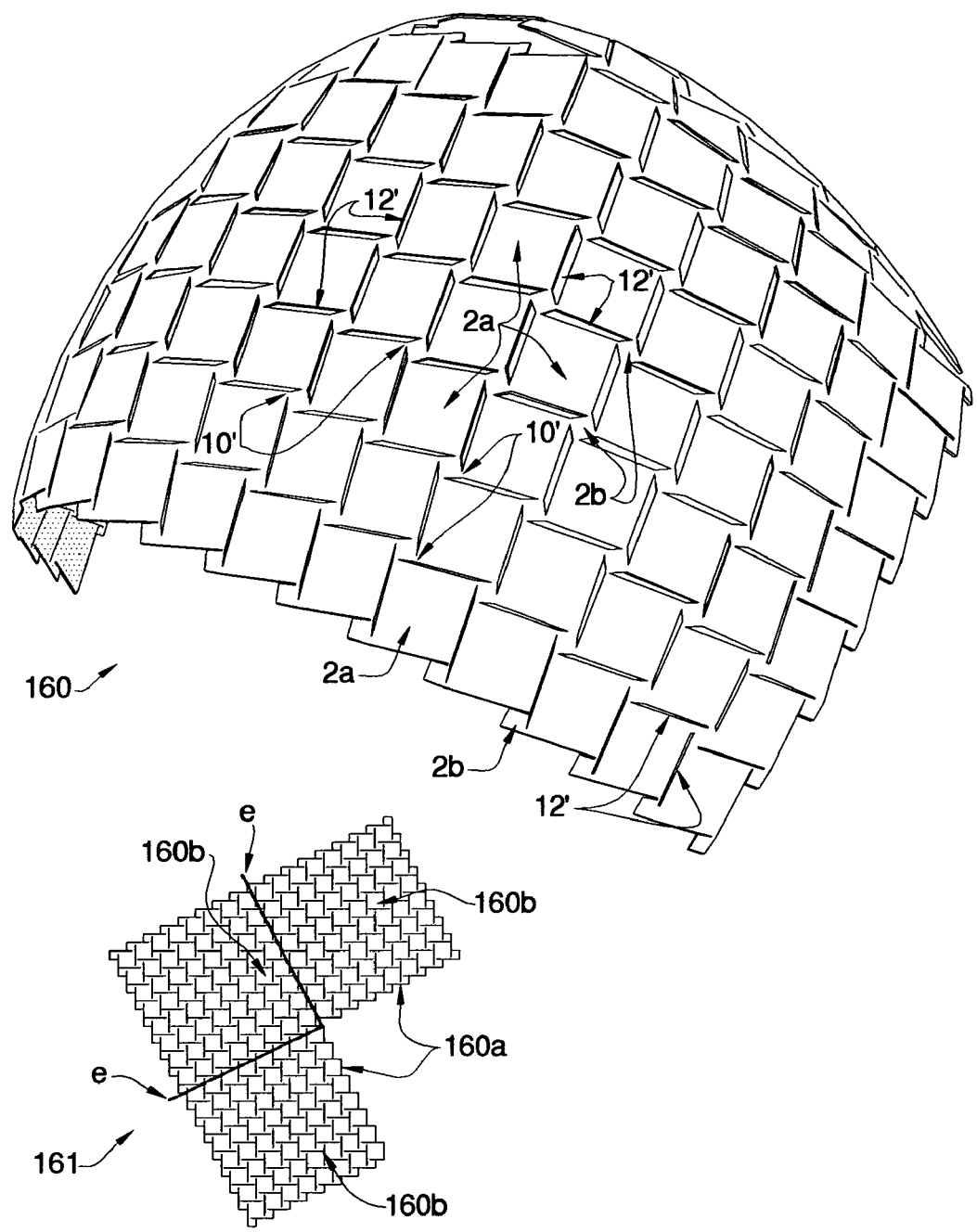
FIG. 33 shows an expanded domical form from the slitting pattern 68 in FIG. 15 as portion of a surface obtained by subdividing an ellipsoid or a sphere with cubic symmetry.

FIG. 33 shows 160, a portion of an expanded sphere derived by expanding the flat slitting pattern 161. 161 is composed of three large squares 160b demarcated by line e, each comprising large square regions 2a and small square regions 2b, bound by slits 12 and meeting at vertex regions 10. This pattern is similar to 68 in FIG. 15. After expansion, the surface is joined at seams 160c to close the surface. 160 is comprised of rotated square regions 2a' and 2b', variably expanded slits 12' and transformed vertex regions 10'. The slitting pattern 160a could be extended by adding additional large squares 160 and the pattern could be expanded and closed at the seams to generate closed or open surfaces. For example, surface 160 could be closed to make a sphere by adding three additional large squares 160. All other polyhedral surfaces can be constructed from their nets in this manner by inscribing a slit pattern on each of their faces and expanding the surface.

Figure 34:
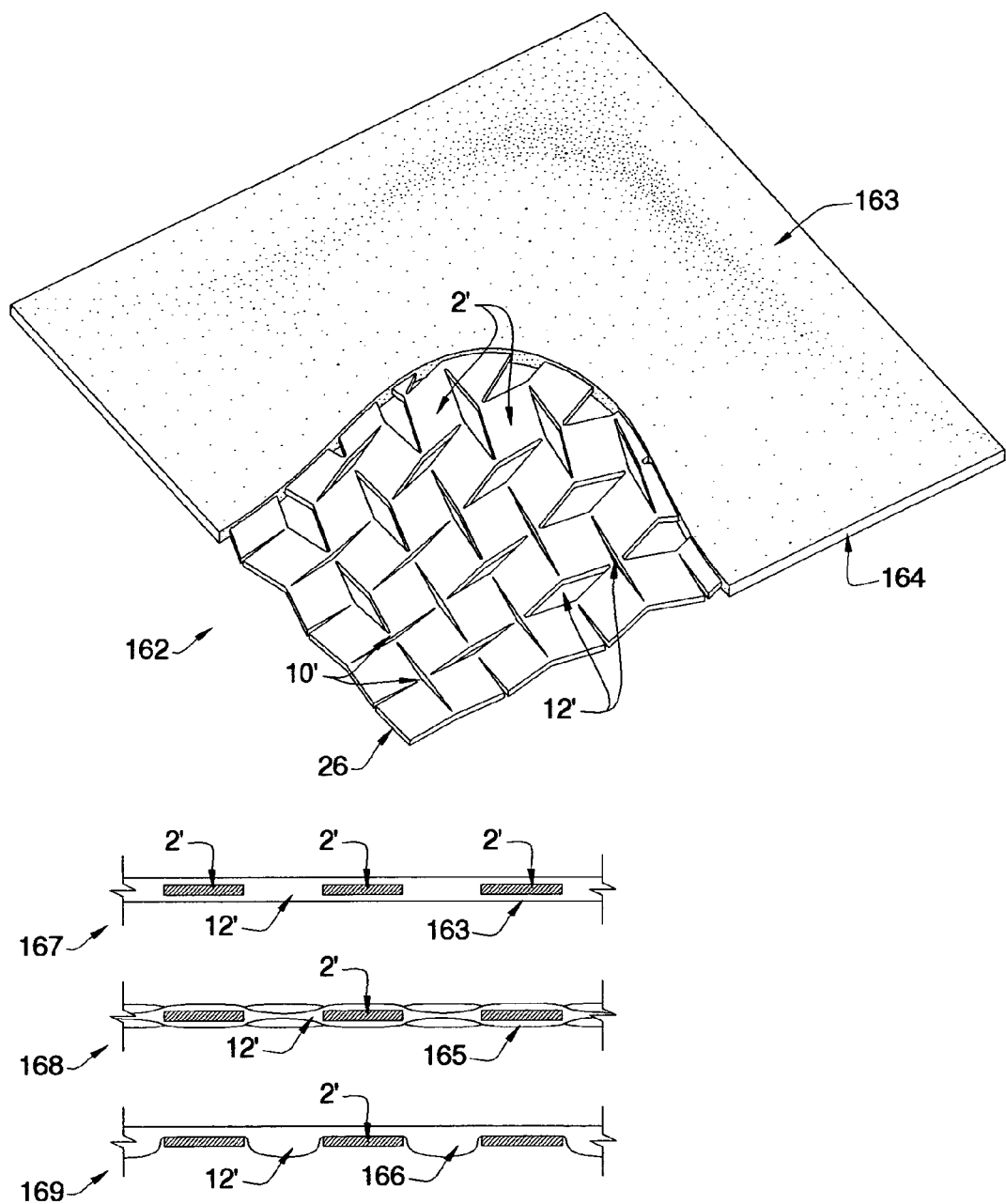
FIG. 34 shows the use of the expanded surface as a core for hardening material applied externally to the expanded surface.

In FIG. 34, 162 is a different embodiment of the invention where the expanded surface 25 of FIG. 4 is embedded within an external surface 163 made of a different material. 163 has a thickness 164 that embeds both sides of the surface 26. In section 167, 163 is shown as a material that fills the expanded slits 12' and cover both sides of rotated polygonal regions 2'. This material can be applied to the expanded surface through various known techniques like spraying, applying with a trowel, or dipping in a vat of fluid that hardens, or other. These application techniques will convert all of the expanded surfaces in this disclosure into smooth surfaces without the visible open slits. The expanded surface could also act as an inner reinforcement for the surface, as in ferro-cemento. Variant section 168 shows an externally applied material 165 applied on both sides and which shrinks at the expanded slit regions 12', thereby visually highlighting the expanded slits. Section 169 is a variant with a viscous material 166 applied from one side; this highlights the expanded slits 12' on the exposed side. The embedding materials could be opaque or clear, and of any color, and the applied material could range from cement, plaster to any synthetic plastic, resin, or rubber compound.

Figure 35:
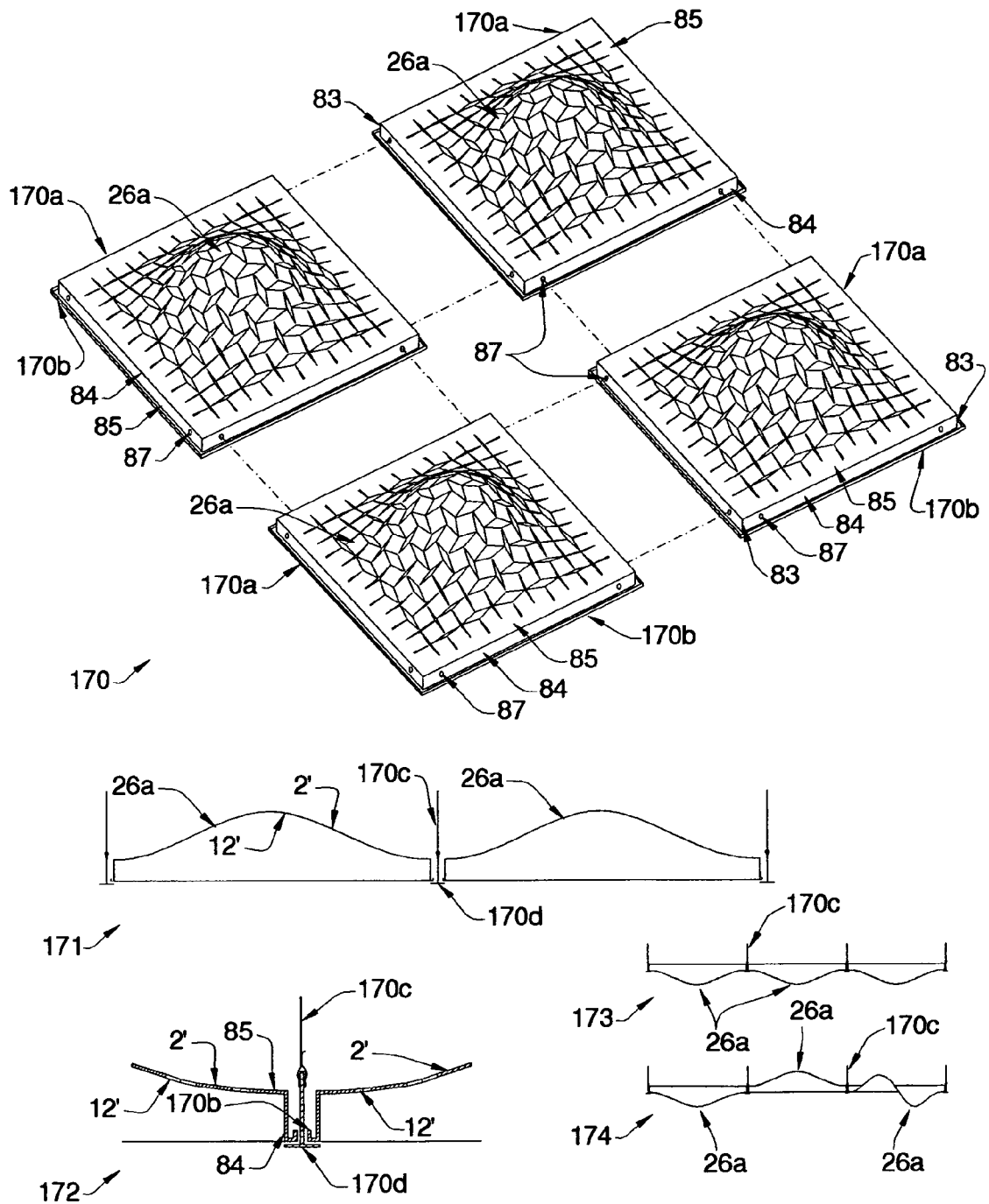
FIG. 35 shows a modular panel suspended ceiling system composed of tray-type expanded surface modules attached to one another.

FIG. 35 shows how some of the expanded surfaces shown in earlier figures can be converted into a suspended ceiling system for architectural interiors. As an example, 170 shows four inverted tray-type panel modules 170a from an extendable array of such panels; the modules are shown in an exploded view. Each module 170a is similar to 89 in FIG. 20 and comprises the expanded surface 26a, a derivation of the surface 26 in FIG. 4, surrounded by an unexpanded rim 85, vertical flanges 84 that turn inverted channel sections 170b and meet at corner edges 83. Each module has attachment holes 87 for joining one to another. 171 is a section through 170 in its unexploded state. The flanges 84 are attached by aligning the holes 87 and securing the panels through a fastening device around a runner element 170d, shown here as an inverted T-section, suspended from a hangar element 170c. 172 is a detail of attachment showing the relationship between flanges 170b and 170d. Alternative details could be used, and alternative geometries of panel modules, as in FIG. 21 for example, could be used in repeating or non-repeating arrangements. 173 is an upside-down version of 170 with inverted tray modules. 174 is a variant showing the a combination of up and down modules as well as an expanded surface 26b to achieve irregular modular architectural ceiling systems.

Figure 36:
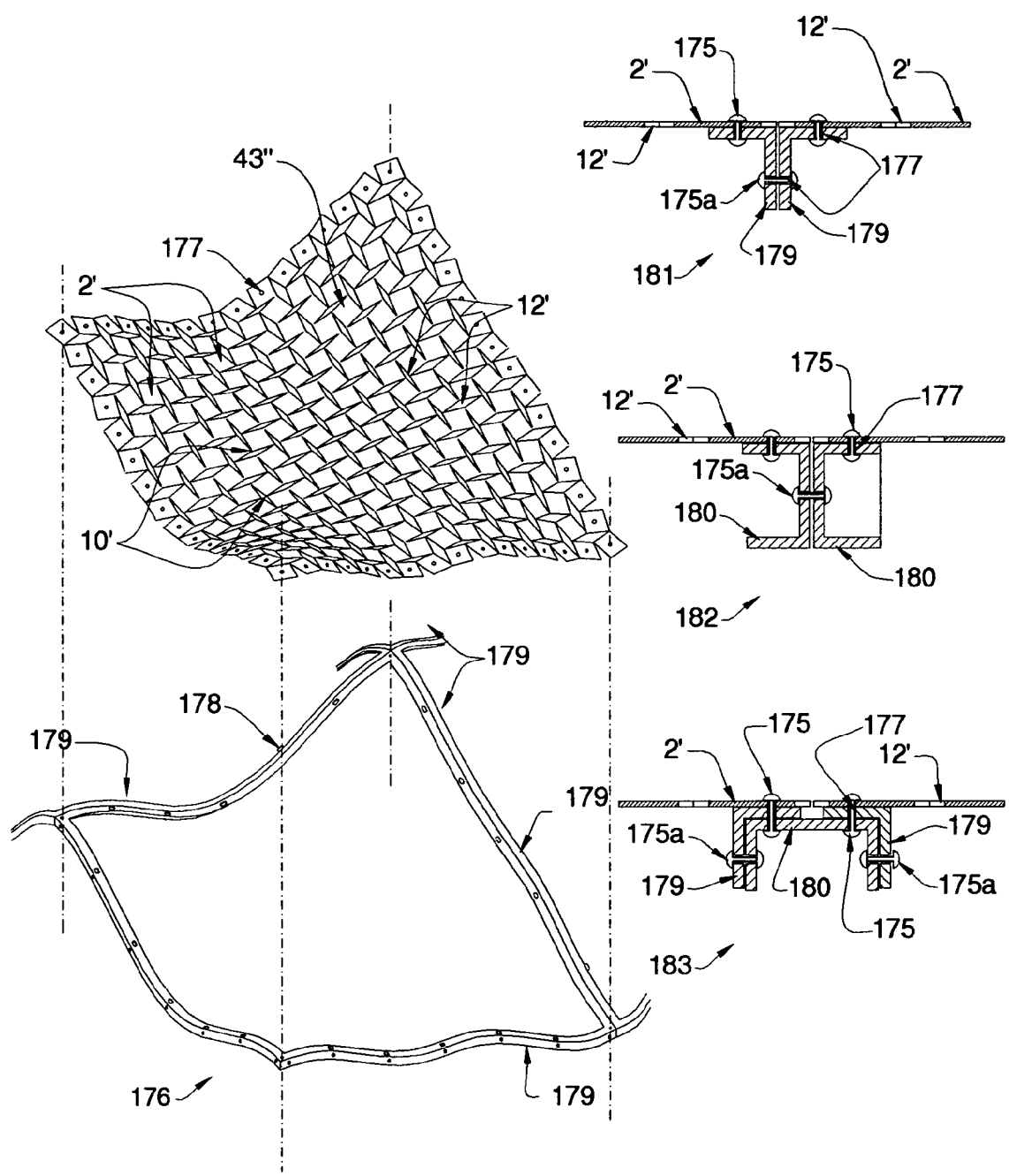
FIG. 36 shows the introduction of external structural elements or grid for joining two edges of expanded surfaces.

FIG. 36 shows an alternative application to architectural walls, ceilings, surfaces, entire building structures, envelopes and environments. 176 shows an expanded surface 43", a portion of the expanded surface 48 in FIG. 10, and the method can be extended to the entire surface 48. The surface 43" is composed of square regions 2' meeting at vertex regions 10' around expanded slits 12' as before. 43" is attached to a curved frame below composed of curved framing angle members 179 that abut face-to-face as shown in the section 181. They are held together by a fastening device 175a. 43" is attached to angles 179 through additional fastening devices 175. The squares on the perimeter of 43" have holes 177 for attachment to 179. The framing member 179 has securing holes 178 located at specific intervals or at intervals corresponding to the expanded square regions located along the expanded edge of 43". The holes 178 could be made oblong to allow for variance in expansion. 182 is a variation of detail 181 and comprises two channels 180 back-to-back which are attached with the fastening element 175*a*. In 183, two angles 179 are joined to a channel 180 and attached through 175*a*. In both alternatives, the expanded surface is attached to the supporting elements through 175. This method of using external framing members for fastening an expanded surface could be used for any other surface shown in this disclosure.

Figure 37:
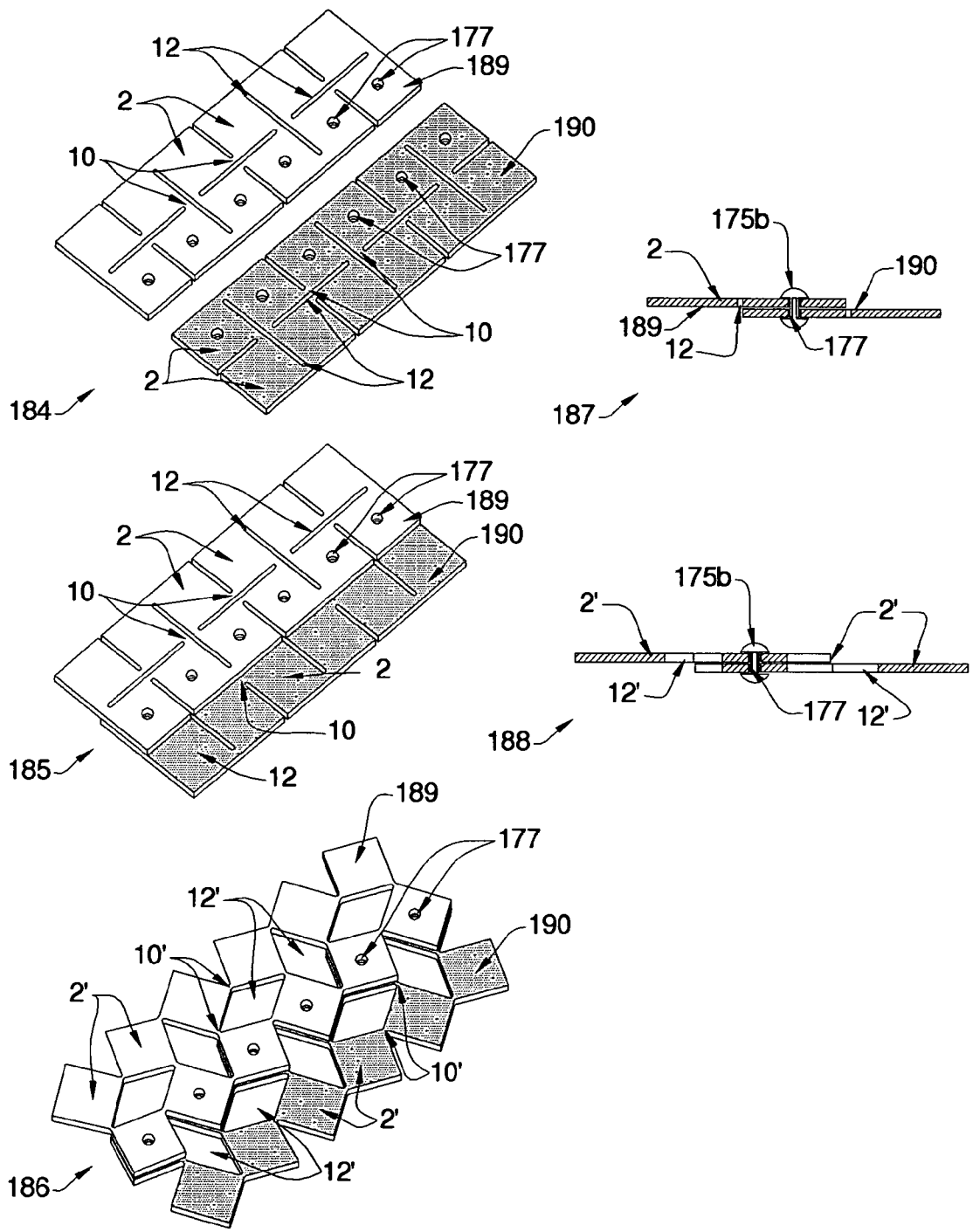
FIG. 37 shows a technique to attach two pieces of slit surfaces, preferably before expansion.

FIG. 37 shows an alternative way to join pieces of expanded material without an external supporting member as in FIGS. 36. Without external structural supports, this embodiment will be restricted in the size of the surfaces which will tend to be smaller than the ones with supporting framing members. 184 shows edge portions of two unexpanded sheets 189 and 190 that need to be joined, each sheet comprising square polygonal regions 2, silts 12 and vertex regions 10, as in previous examples. The outermost square regions of the sheet have holes 177 within each square region 2. In 185, the two sheet surfaces are overlapped so the holes 177 of each are aligned. After alignment, a fastening device is inserted to join the two surfaces. This device could be selected from a variety of known techniques like welding, riveting, bolting, etc. In detail section 187, the two sheets are attached by inserting a fastener 175*b* in the aligned holes 177; 175*b* is shown here as a positive and a negative element engaged with threads, welds or adhesives. After the two sheets are secured, the surface is expanded by the application of external force as in previous examples. The two joined sheets now behave as one continuous surface as shown in 186. Detail section 188 shows the two joined surfaces in the expanded state with the fastener 175*b* fully secured, and the regions 2' separated by expanded slits 12'.

Figure 38:
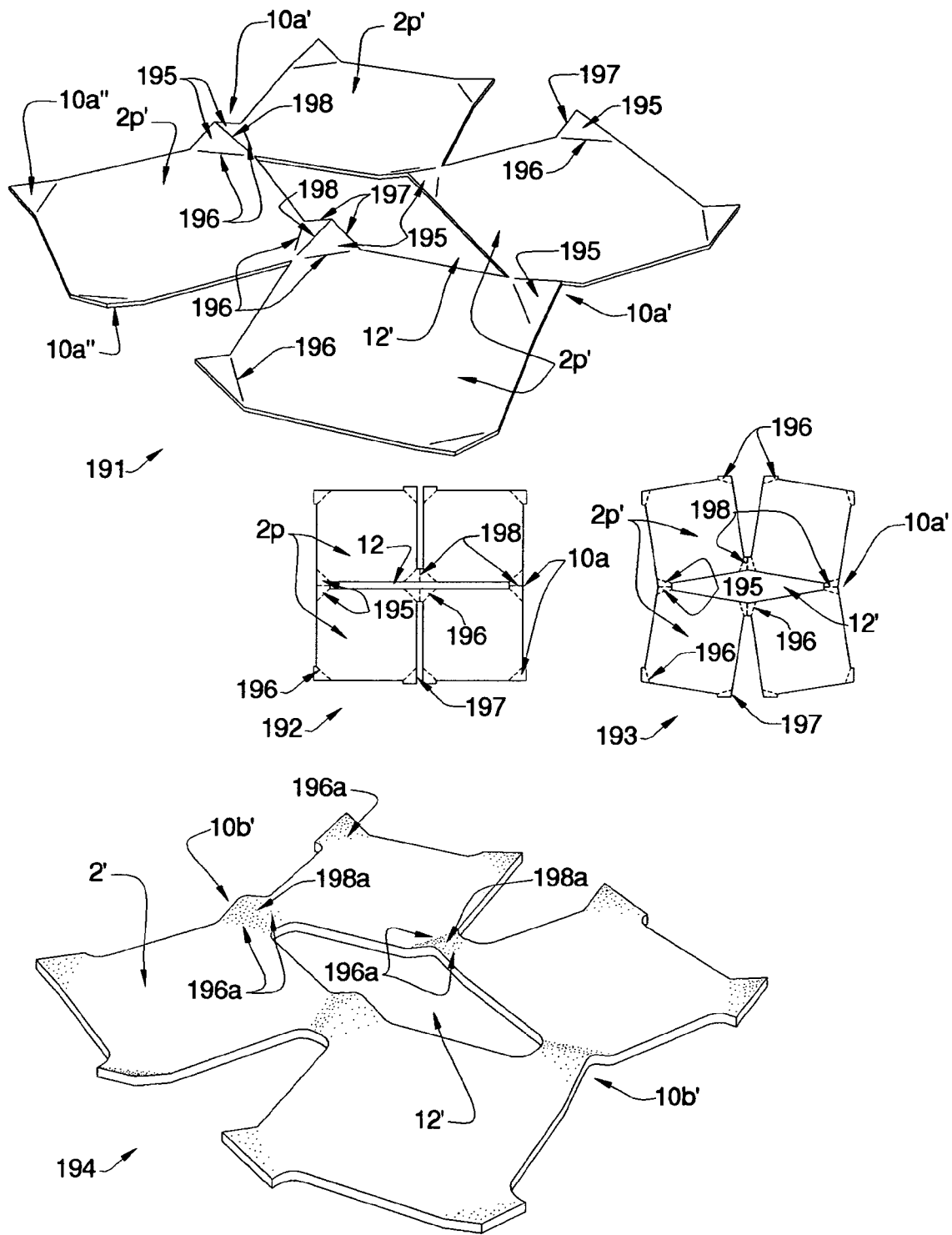
FIG. 38 shows detail of material deformation in the "joint" or vertex regions after expansion of a slit sheet material.

FIG. 38 shows an alternative detail of the expansion process. In the examples shown thus far, the vertex region 10 transformed to 10' by adjustment of the material within the sheet. The vertex region adjusted variably by a combination of stretching and compressing of the material so the surface could change its form to different curvatures. Examples 191 and 194 show two different alternatives to the material deformation of the vertex regions. In 191, the four transformed polygonal regions 2*p*' are shown as part of a larger sheet material. Each region 2*p*' is bound by four transformed vertex regions comprising two of 10*a*' and 10*a*", and one expanded full slit 12' in the middle. The vertex region 10*a*' is half of the vertex region 10*a*'. 10*a*' comprises two folded surfaces 195 meeting at the ridge 198. Each surface 195 is bound by the ridge, a folded edge 196 shared with the regions 2*p*' and the outer edge 197. 192 and 193 show the plan view of the expanded and unexpanded states. 194 is a variant where the folded edges 196 and ridge 198 of 191 have been replaced by smoother folds 196*a* and 198*a*. 191 requires a score for folding out of relatively rigid sheet materials, 192 requires a pliable sheet material like fabric, rubber sheets, etc. The curving of expanded states is enabled by a variable fold angle at the ridge 198 and edge 196. In this model, the transformed vertex region 10*a*' acts as an invisible tetrahedron which varies its dihedral angles and one of its edge lengths defined by the length between the outer ends of edges 197.

Expanded sheet and tubular material with slit designs could be used for a multitude of applications besides architectural surfaces. These range from furniture to fixtures, containers and receptacles, packaging material, cloth and clothing, toys, human wear like shoes, gloves and bands, insular and protective sleeves for objects in consumer and industrial settings, medical applications like band-aids and gauzes, or micro-filters for purification of matter. Expanded sheet material yardage for all textile and fabric applications in a wide range of materials is possible. Micro-size meshes, where the polygonal sizes reach the orders of one-hundredths of an inch, or one-thousandths of an inch, would be needed for industrial meshes used in, say, filtration and purification processes where undesired substances are removed from a fluids, powders, and compounds in the chemical and food industries. Sequential layering of meshes of different sizes may be used in fluid purification (e.g. water), especially with the addition of anti-bacterial and physico-chemical agents.

Figure 39:
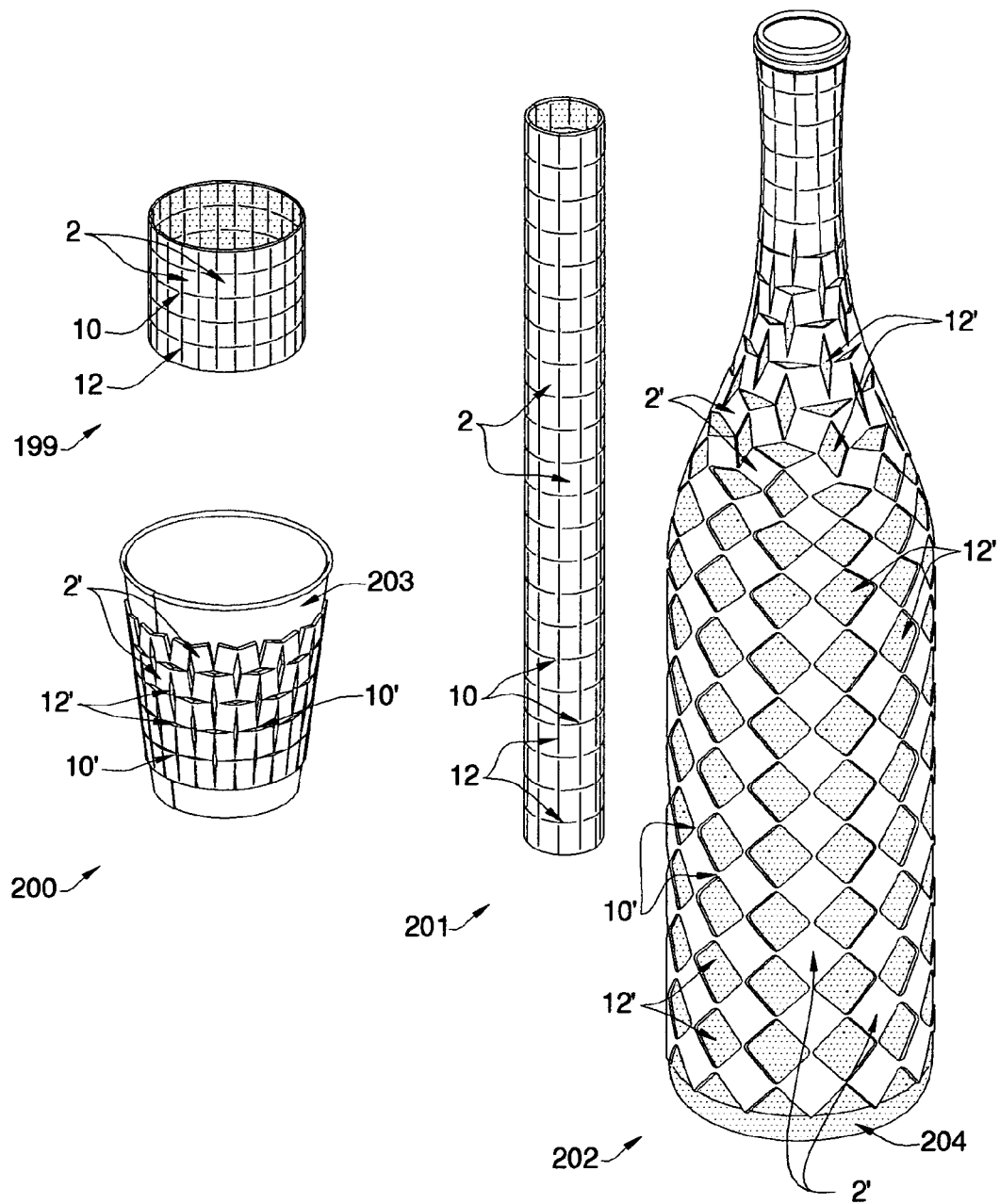
FIG. 39 shows the application of expanded surfaces to insular and protective sleeves for containers.

FIGS. 39-45 show miscellaneous applications to designs of products using the invention. FIG. 39 shows two applications of the invention as an external sleeve for cylindrical objects, each shown in their unexpanded and expanded states. 199 is a cylindrical sleeve of a suitable insular and pliable sheet material like paper, neoprene or foam for example. It has a preformed slit pattern, a rectangular grid wrapped around a cylinder as in 124 of FIG. 28. This sleeve is composed of four-sided-regions 2 bound by slit edges 12 meeting at vertex regions 10. In the expanded state 200, it is shown wrapped around a conical cup 203 made of paper, plastic or other suitable material. The four-sided regions 2 have rotated to 2', the slits 12 have expanded to 12' and the vertex regions has transformed variably to 10. 201 is a similar sleeve design with a rectangular grid slitting pattern made from a stretchable sheet material. The pattern is composed of four-side regions 2 bound by slits 12 meeting at vertex regions 10. In its expanded state 202, shown wrapped around a bottle 204, the regions 2 have variably rotated and expanded to 2', the slits have expanded variably to 12' around the transformed vertex regions 10 to 10'. In this application, it could act as a protective sleeve for fragile containers or an insular sleeve for hot fluids. Other related applications include packaging material for objects, various products (e.g. fruits and vegetables), and so on. By substantially increasing the thickness of the sheet material to, say, 1" to 3" or more, a packaging surface for heavier objects is possible, both as an extendable surface or a sleeve-type application.

Figure 40:
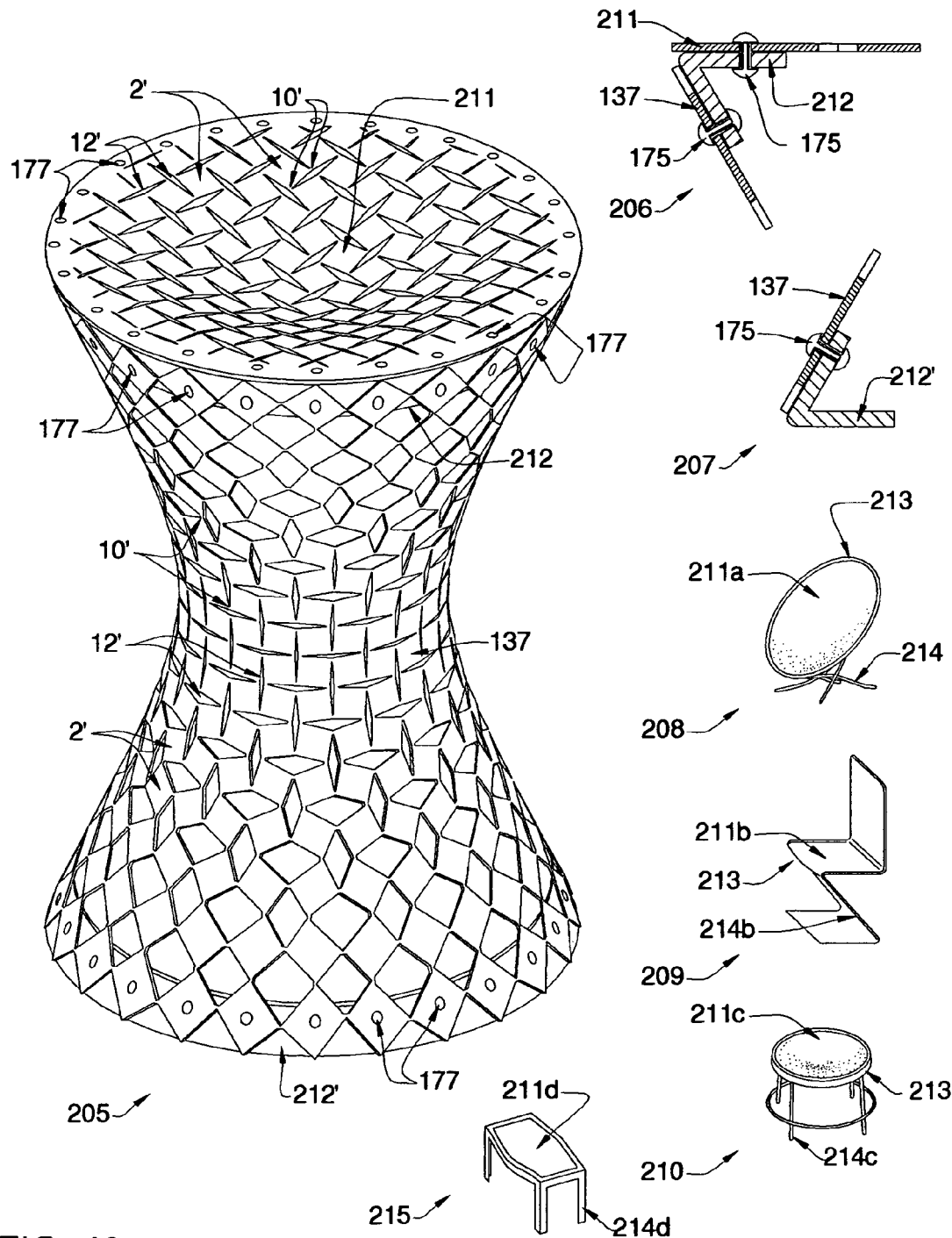
FIG. 40 shows the application of expanded surfaces to seating systems (stools, chairs, benches, etc.).

FIG. 40 shows different applications of the invention to furniture design. 205 is a stool with an expanded hyperboloid body 137 shown earlier in FIG. 29 and a top expanded surface 211 for seating. As before, the two expanded surfaces comprise the rotated square regions 2' bound by expanded slits 12' and transformed vertex regions 10'. The two surfaces, 137 and 211, are joined by a circular structural angle piece 212 to which the surfaces 137 and 211 are attached at points 177 through a fastening device 175 like a rivet; alternatively, screws, pins, welds or adhesives could be used. This is shown in the detail section 206. The detail section 207 shows the angle piece 212', also attached at points 177 through fasteners, as the base rim to hold the expanded edge of 137. 208 is a lounge chair with an oval rim 213 to which the expanded surface 211*a* (shown schematically) is fastened; it has a supporting frame 214 composed of four interwoven S-shaped curved frame members. 209 is an office chair with a bent tubular steel frame 214*b* with an expanded surface 211*b* (shown schematically) as a seat with its own edge framing member 213. 210 is stool with a tubular frame 214*a* and a seat 211*c* (shown schematically) with a circular rim 213 attached to 214*a*. 215 is a stool from a folded sheet and comprising an expanded surface 211*d* (shown schematically) and supporting legs 214*d*. Other types of furniture, designed as a continuous expanded surface with or without framing structural elements, can be similarly designed as alternatives to the examples shown here and based on the invention.

Figure 41:
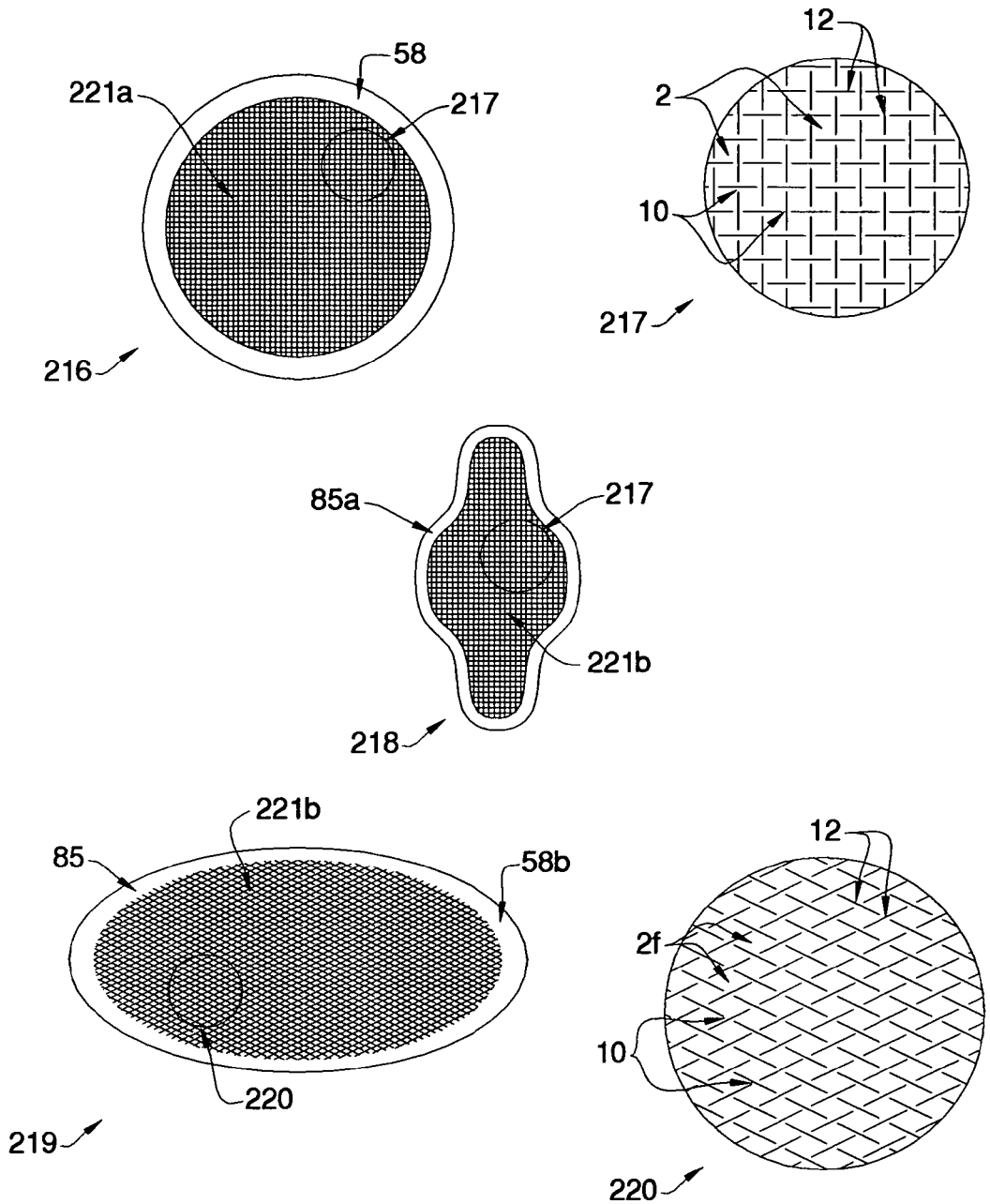
FIG. 41 shows the application of expanded surfaces to gauzes and band-aids.

FIG. 41 shows an application of the invention at a much smaller scale to gauzes and band-aids. 216, 218 and 219 are three examples of band-aid designs with expanded grids so the surface can expand to match the morphology of the body part, thus avoiding wrinkles produced by non-expandable band-aids, especially in areas having an accentuated compound curvature like elbows, knees, and fingertips. The expanded surface could be made of an antiseptic absorbent material with an exterior adhesive layer which may also be expandable. More than one layer of expanded material could be used for extra absorbency and for housing anti-bacterial agents. The additional layer may have a different size of slit openings and orientation, and the size of openings after expansion would be in the range of existing gauze sizes. 216 is a circular band-aid with an expanded surface region 221a bound by an unexpanded rim 58, with detail 217 showing the polygonal regions 2 bound by unexpanded slits 12 meeting at vertex regions 10. 218 is a variation of 216 with a different outer profile and comprising the expanded surface region 221b bound by the rim 58a and shown in detail 217. 219 has an expanded surface region 221c with a rhombic geometry and an unexpanded rim 58b. Detail 220 shows the rhombic regions 2f bound by slits 12 meeting at vertex regions 10.

Figure 42:
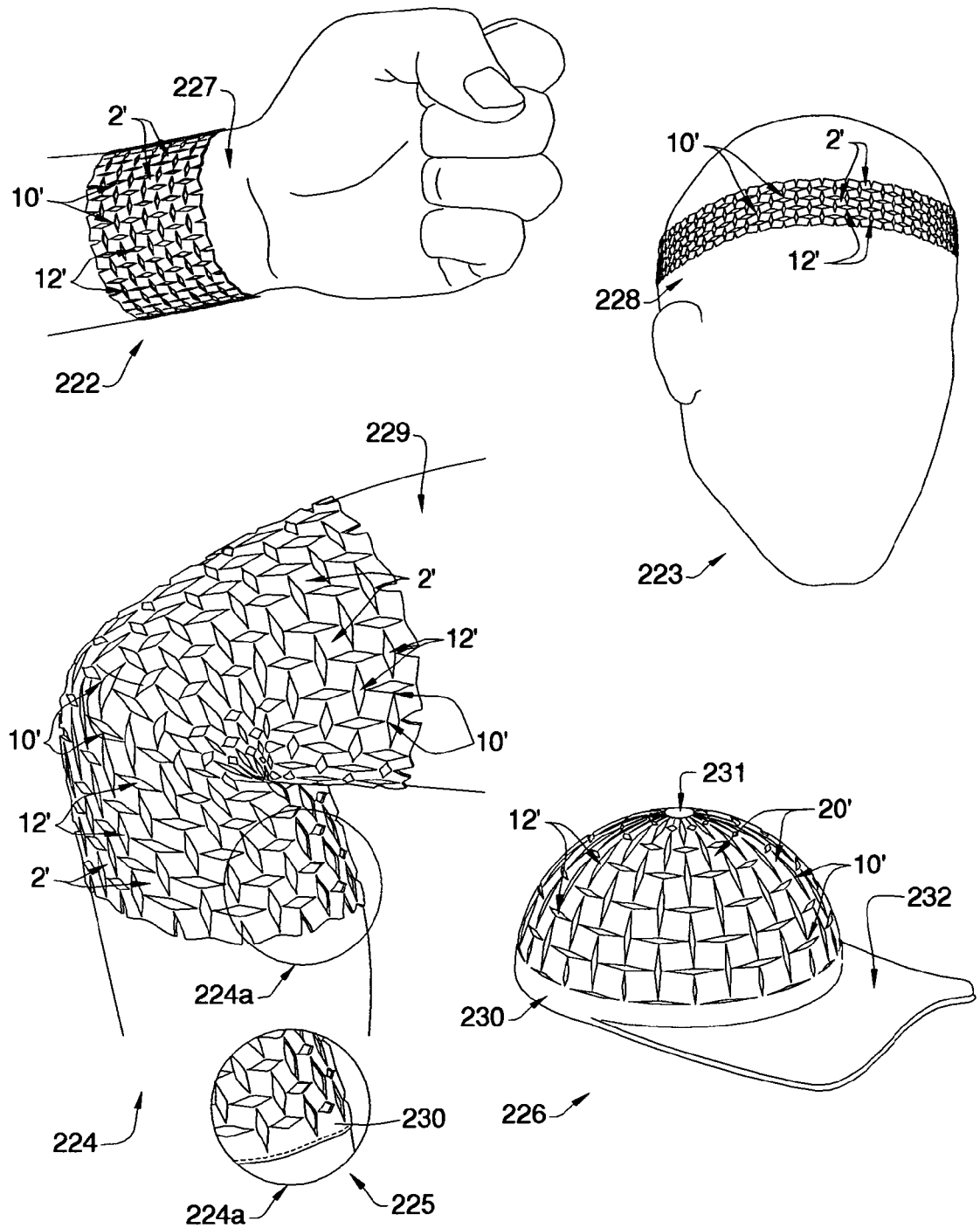
FIG. 42 shows the application of expanded surfaces to human wear—wrist-bands, knee-bands, head-bands, cap, etc.

FIG. 42 shows applications of the invention for human wear; the sizes of slits and polygonal regions shown in these examples are for illustrative purposes only and could be varied to more suitable sizes based on the specific application. Wrist-bands, head-bands, elbow- and knee-bands are simple applications of the invention using elastic or non-elastic sheet material. These could be simply sausage-cut from long tubular sleeves manufactured with pre-formed slit designs. 222 shows a wrist band as a slip-on or wrap-around sleeve around the wrist 227 and based on the expanded square grid tube of the type shown in 199 of FIG. 39. Shown in the expanded state here, it comprises rotated square regions 2', expanded slits 12' around transformed vertex regions 10', as in previous applications. 223 is a head-band around the fore-head 228, also from the expanded square grid but from a slimmer section of a much wider tubular slit design. It is comprised of rotated square regions 2', expanded slits 12' meeting at transformed vertex regions 10'. 224 shows a knee-band, also from tubular expanded sheet material, comprising expanded square regions 2', expanded slits 12' meeting at transformed vertex regions 10'. 225 shows an alternative to the edge of the knee-bend (indicated by 224a in 224) with an un-cut rim 230 made from an elastic material. This rim 230 could also be applied to 222 and 223. 226 is an application of the invention to a baseball cap with the visor 232. The expanded grid on the head portion of the cap is composed of curved trapezoidal regions 2o' arranged radially from the iris 231 at the apex which remains unexpanded. Regions 2o' increase in size from the apex 231 to the rim 230; each region is bound by expanded slits 12' that meet at vertex regions 10'. Alternative slit designs could be used for the cap and other headwear.

Figure 43:
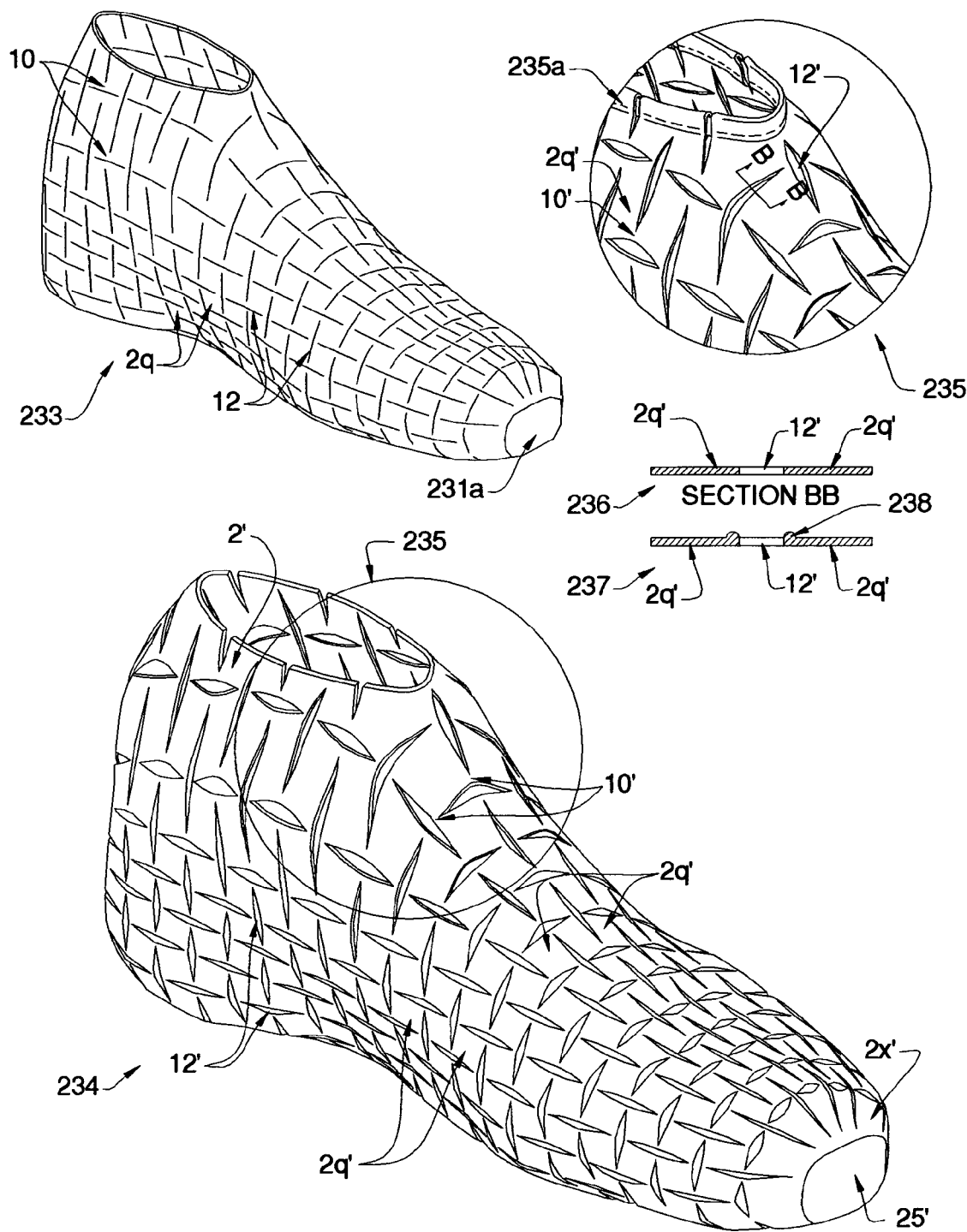
FIG. 43 shows an expanded surface footwear based on the invention.

FIG. 43 shows an example of footwear based in the invention. It could be adapted to be a design for a sock, a slipper, a sandal or a special type of shoe which expands to fit different sizes ("one size fits all") or adjusts to the shape of each foot in still and moving positions. The shoe or sandal could have a sole which does not expand but flexes, or the sole could expand as well in special applications like water-shoes for aquatic environments. The expanded surface could be part of a multi-layer shoe membrane, and more than one expanded surface could be layered. 233 shows the footwear in an unexpanded state comprising a grid of slits 12 that define polygonal regions 2q bound by vertex regions 10. The grid is shaped to fit the morphology of a foot and is thus composes of polygonal regions of different lengths, angles and curvatures. All polygonal regions 2q are predominantly 4-sided regions except at some locations on the boundary. Special radial regions 2r' are added to the toe region capped by an unexpanded region 2s. In the expanded state 234, the polygonal regions have rotated variably to 2q', the slits have expanded variably to 12', and the vertex regions have transformed variably to 10' to enable the expansion. 235 is a detail of the expanded state 234. The rim 235a is added as an alternative by folding over the edge of sheet material. 236 is a detail of the section BB through an expanded slit 2q'. 237 is a variation of 236 where the slits have raised edges 238 for stiffening.

Figure 44:
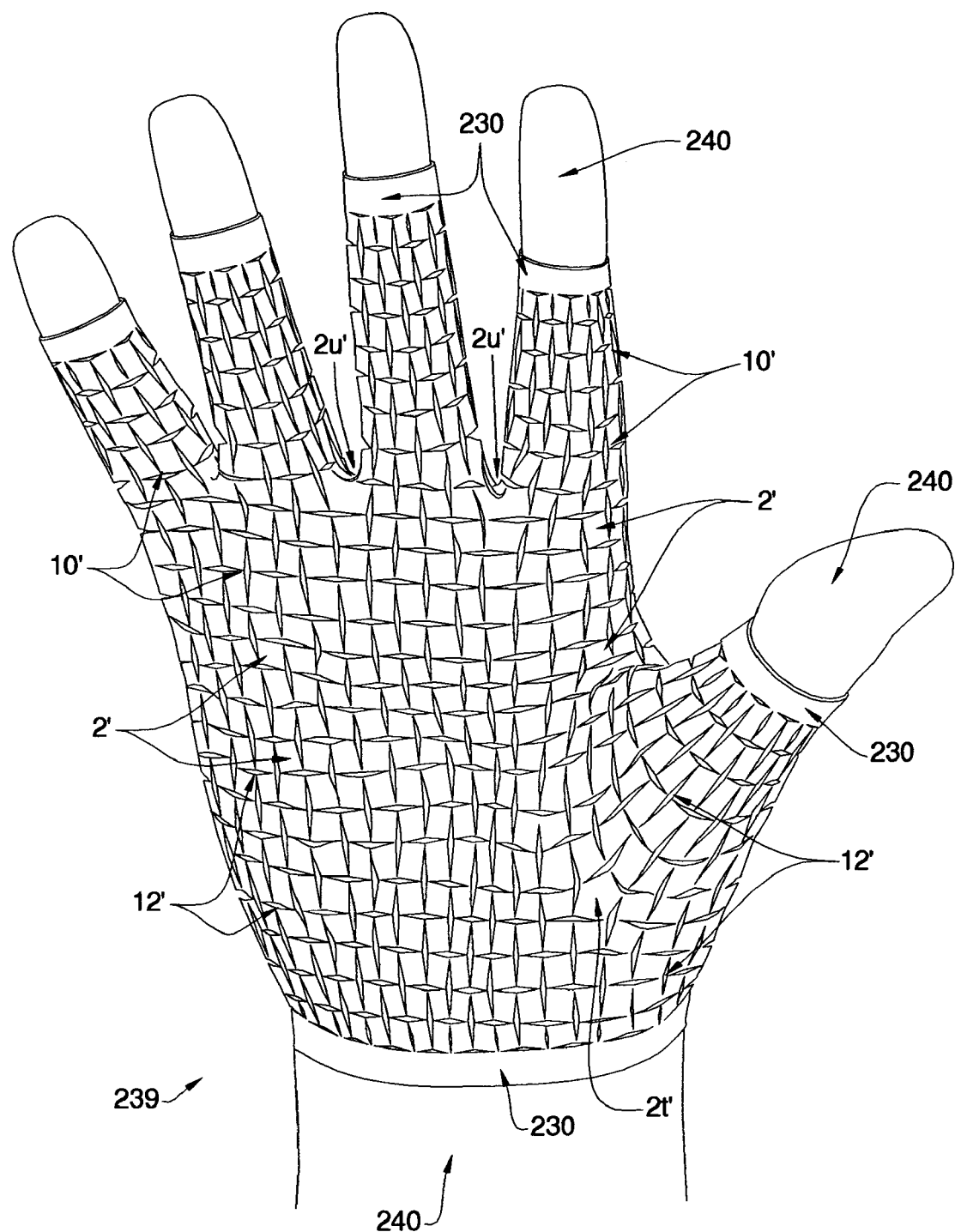
FIG. 44 shows an expanded surface glove based on the invention.

FIG. 44 shows an example of a glove 239 based on the invention. The glove surface is preferably made from a single-piece cast flexible material with pre-designed slit pattern and stiffened edges similar to 238 in FIG. 43. It has rims 230 around the human body elements 240. The expanded surface comprises the 4-sided regions 2' in varying sizes and angles, bound by vertex regions 10' and variably expanded slits 12'. Special polygonal regions 2t' at the base of the thumb and 2o' at the saddle between the fingers are added to the pattern. It is possible to make the glove from a sheet material with an evenly distributed pattern of square regions and slits, but in this embodiment the glove will need to be constructed from parts which are seamed or sown together as in conventional leather or cloth gloves.

Figure 45:
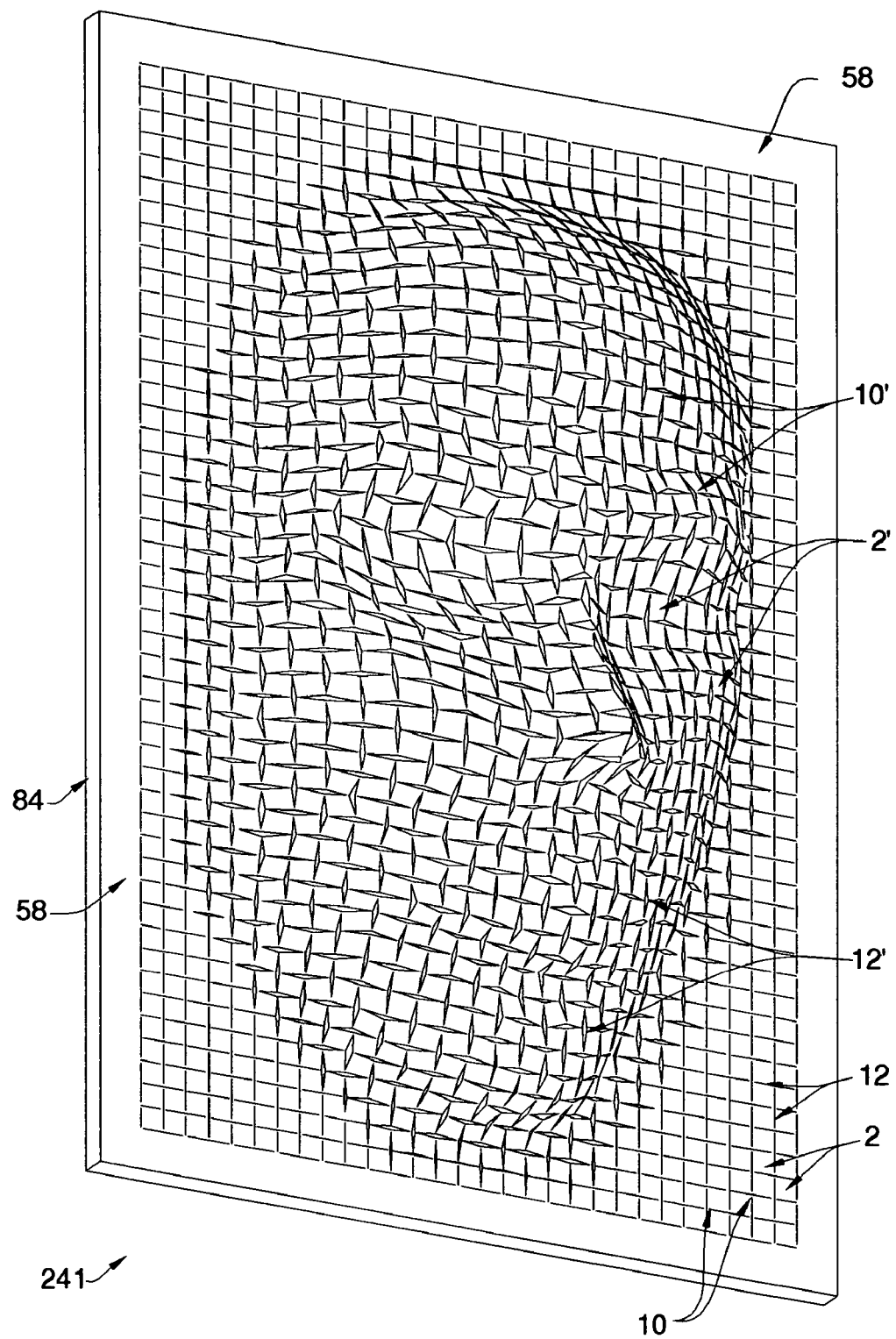
FIG. 45 shows an expanded surface as a sculpting device or, alternatively, a masking material.

FIG. 45 shows a framed expanded surface 241 based on the invention. It can be used as a sculptural surface or for making imprints of objects. In the illustration shown, a face imprint on the expanded surface is shown. The frame 58, with sides 84 for rigidity, bounds a flat slit surface composed of polygonal regions 2 bound by vertex regions 10 and slits 12 as seen on the unexpanded periphery in this particular embodiment. After expansion, the square regions transform to 2', the slits expand to 12' and the vertex regions adjust to 10', all simultaneously and variably. In the embodiment shown, an elastic sheet material is used; the square regions change their size and shape as the surface shapes-itself to the morphology of the face. With smaller squares, it will be possible to use a non-elastic material that permits deformation at the vertex regions. The frame geometry and the slit designs could be altered to accommodate other geometries disclosed here.

Figure 46:
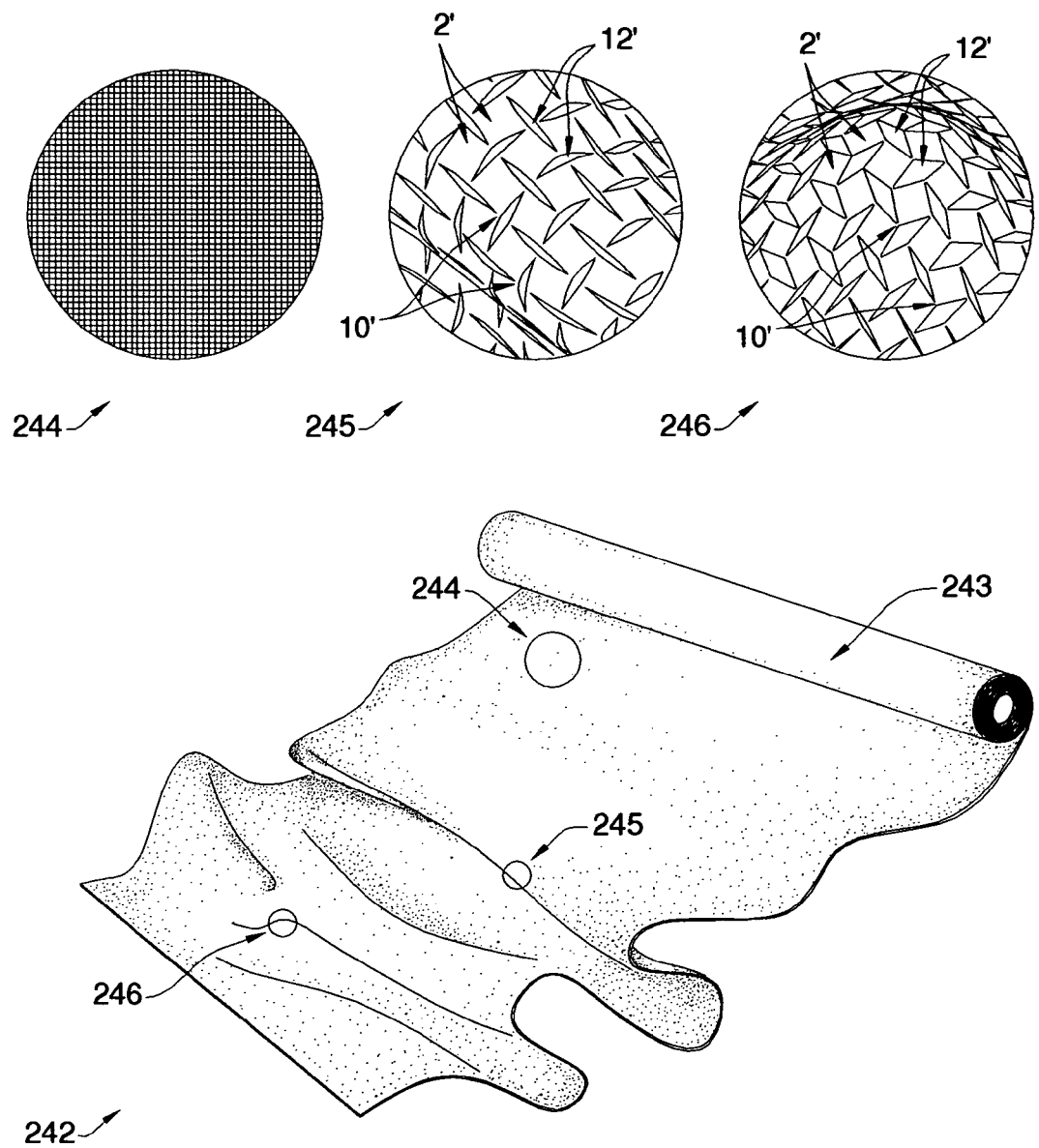
FIG. 46 shows the application of expanded surface to textile material.

FIG. 46 shows the application of the invention to textile yardage. The sheet material is formed with slit patterns using known forming methods and is delivered in rolls which are then converted into useful objects like clothing, apparel and fashion design, bags, bedding and camping products, industrial fabrics, meshes, etc. Different textile applications will depend on the geometry of expansion grids and on the sizes of slits which could vary. Though sizes of polygonal regions larger than an inch or so may not be functional for human wear, the smallest size of polygons in expanded textiles could be extremely small from, say, one-tenths of an inch and smaller, and reaching the thickness of yarn, even micro-filaments, or size of openings in woven textiles. One method of forming, first suggested by Frei Otto in the context of building, could be as follows: the yardage material is cast between two long encasing sheets of standard width and sealed at the periphery. The two sheets are joined to each other in a slit pattern design, with each slit forming a seal between two sheets. Fluid casting material is injected between the two sheets and spread evenly throughout its length. The material is allowed to set and the encasing sheets removed. The polygonal regions of the slit design will become inflated due to the pressure of the injected fluid, and the textile material in this embodiment will have uniforms bumps throughout. The cast sheet could also have strengthening filaments added at points of weakness, for example, at the vertex regions, or an entire cross grid of filaments could be laid or woven to pass through each vertex regions in two directions. In FIG. 46, the expanded surface yardage 242 is shown as a roll 243 and with three details. The unexpanded flat state 244 shows a close-up of the slit pattern, the unexpanded roll state 245 and the slightly expanded state 246 where there is a double curvature to the fabric. As before, the unexpanded state is comprised of polygonal regions 2, bound by vertex regions 10 and slits 12. In the variably expanded state, the regions morph variably—the polygonal regions rotate to 2', the slits expand to 12' and the vertex regions change to 10'. Other orientation of the slit grid and other geometries of slit designs could be used to produce a variety of yardage materials.

What is claimed is the following:

1. 3-dimensional curved surface structures from expanded sheet material, wherein
    said sheet material has a finite surface with a boundary, wherein said surface comprises a plurality of slits, polygonal regions and vertex regions distributed over said surface, wherein
    each said slit has two opposing ends, two opposing sides of finite length joined at said ends and width, wherein each said slit is surrounded by four said vertex regions alternating with four said polygonal regions, wherein one said vertex region each lies at each said end of said slit and another vertex region each lies at each said side of said slit, wherein
    two said polygonal regions and two said slits meet at each said vertex region in an alternating manner, wherein first said slit meets said vertex region at one of its said ends and second said slit meets said vertex region at one of its said side, wherein
    expansion of said sheet material is enabled by rotation of each said polygonal region around said vertex region to create an expansion of said slits into four-sided openings, wherein said rotation is enabled by a deformation of said sheet material at said vertex regions without producing a fold in the said vertex region, wherein
    said shape of said polygonal region remains the same after said expansion, and wherein
    said expansion is produced by applying an external force to form said sheet material into said curved surface structures.

2. 3-dimensional curved surface structures from expanded sheet materialaccording to claim 1, wherein
    said slits are selected from the group comprising:
        straight slits,
        bent slits,
        curved slits,
        irregular slits, or
        any combination of above.

3. 3-dimensional curved surface structures from expanded sheet material according to claim 1, wherein
    said slits are selected from the group comprising:
        slits of same length,
        slits of unequal lengths,
        slits in incremental lengths,
        slits of same width,
        slits of unequal widths,
        slits of incremental widths, or
        any combination of above.

4. 3-dimensional curved surface structures from expanded sheet material according to claim 1, wherein
    said polygonal regions are selected from the group comprising:
        regular polygons of one kind, each said polygon having equal edges and equal angles at said vertex regions,
        regular polygons of more than one kind,
        non-regular polygons having equal edges and unequal angles at said vertex regions,
        non-regular polygons having unequal edges and equal angles at said vertex regions,
        irregular polygons having unequal edges and unequal angles at said vertex regions,
        polygons with straight edges,
        polygons with curved edges,
        polygons with asymmetric edges, or
        any combination of above.

5. 3-dimensional curved surface structures from expanded sheet material according to claim 1, wherein
    said openings are selected from the group comprising:
        openings of same size,
        openings of different size,
        variably expanded openings in incremental sizes, or
        any combination of above.

6. 3-dimensional curved surface structures from expanded sheet material according to claim 1, wherein
    said plurality of slits are applied to pre-formed said sheet material.

7. 3-dimensional curved surface structures from expanded sheet material according to claim 1, wherein
    said plurality of slits are pre-formed in said sheet material.

8. 3-dimensional curved surface structures from expanded sheet material according to claim 1, wherein
    said sheet material is selected from the group comprising:
        substantially rigid sheet material,
        flexible sheet material,
        stretchable sheet material, or
        any range in between the above.

9. 3-dimensional curved surface structures from expanded sheet material according to claim 1, wherein
    said external force is selected from the group comprising:
        force applied along the surface of said sheet material,
        force applied perpendicular to the surface of said sheet material,
        force applied at an angle to the surface of said sheet material, or
        any combination of above.

10. 3-dimensional curved surface structures from expanded sheet material according to claim 1, wherein
    said curved surface structures are selected from the group comprising:
        surfaces with a convex curvature,
        surfaces with a concave curvature,
        surfaces with a combination of concave and concave curvature,
        surfaces with a uniform curvature,
        surfaces with an irregular curvature,
        surfaces with an continuously smooth curvature that divide space into inside and outside,
        closed surfaces,
        open surfaces, or
        any combination of above.

11. 3-dimensional curved surface structures from expanded sheet material according to claim 1, wherein
    said boundary of said sheet material is expanded using said slits.

12. 3-dimensional curved surface structures from expanded sheet material according to claim 11, wherein said curved surface structure is attached to second said curved surface structure by overlapping said boundary of first said surface structure with said boundary of second surface structure and securing both surface structures through attachment means to enable a plurality of said structures.

13. 3-dimensional curved surface structures from expanded sheet material according to claim 1, wherein
said boundary is an unexpanded said sheet material.

14. 3-dimensional curved surface structures from expanded sheet material according to claim 13, wherein
said boundary is shaped as a structural flange.

15. 3-dimensional curved surface structures from expanded sheet material according to claim 14, wherein
said structural flange is designed with means of attachment to join with adjacent said surface structures enabling a plurality of said surface structures.

16. 3-dimensional curved surface structures from expanded sheet material according to claim 1, wherein
said curved surface structures are attached to one another through external structural elements joined to said boundary enabling a plurality of said structures.

17. 3-dimensional curved surface structures from expanded sheet material according to claim 8, wherein
said curved surface structures have design applications selected from the group comprising:
architectural surfaces and structures,
furniture and fixtures,
containers and receptacles,
toys,
packaging material,
textile material,
human wear like shoes, gloves, bands and clothing,
insular and protective sleeves for objects,
medical applications like band-aids and gauzes, or
micro-filters for purification of matter.

18. 3-dimensional curved surface structures from expanded sheet material according to claim 1, wherein
at least a portion of said curved surface structures is embedded within an externally applied material to produce a continuous surface without openings.

19. 3-dimensional curved surface structures from expanded sheet material according to claim 8, wherein
said sheet material is a metal sheet.

20. Expanded sheet material having slitting designs, wherein
said slitting designs comprise a plurality of slits, polygonal regions and vertex regions distributed over its surface, wherein
each said slit has two opposing ends, two opposing sides of finite length joined at said ends and width, wherein each said slit is surrounded by four said vertex regions alternating with four said polygonal regions, wherein one said vertex region each lies at each said end of said slit and another vertex region each lies at each said side of said slit, wherein
two said polygonal regions and two said slits meet at each said vertex region in an alternating manner, wherein first said slit meets said vertex region at one of its said ends and second said slit meets said vertex region at one of its said side, wherein
expansion of said sheet material is enabled by rotation of each said polygonal region around said vertex region to create an expansion of said slits into four-sided openings, wherein said rotation is enabled by a deformation of said sheet material at said vertex regions without producing a fold in the said vertex region, wherein
said shape of said polygonal region remains the same after said expansion, and wherein
said expansion is produced by applying an external force to said sheet material.

21. Expanded sheet material according to claim 20, wherein
said slits are selected from the group comprising:
straight slits,
bent slits,
curved slits,
irregular slits, or
any combination of above.

22. Expanded sheet material according to claim 20, wherein
said slits are selected from the group comprising :
slits of same length,
slits of unequal lengths,
slits in incremental lengths,
slits of same width,
slits of unequal widths,
slits of incremental widths, or
any combination of above.

23. Expanded sheet material according to claim 20, wherein
said polygonal regions are selected from the group comprising:
regular polygons of one kind, each said polygon having equal edges and equal angles at said vertex regions,
regular polygons of more than one kind,
non-regular polygons having equal edges and unequal angles at said vertex regions,
non-regular polygons having unequal edges and equal angles at said vertex regions,
irregular polygons having unequal edges and unequal angles at said vertex regions,
polygons with straight edges,
polygons with curved edges,
polygons with asymmetric edges, or
any combination of above.

24. Expanded sheet material according to claim 20, wherein
said plurality of slits are applied to pre-formed said sheet material.

25. Expanded sheet material according to claim 20, wherein
said plurality of slits are pre-formed in said sheet material.

26. Expanded sheet material according to claim 20, wherein
said sheet material is selected from the group comprising:
substantially rigid sheet material,
flexible sheet material,
stretchable sheet material, or
any range in between the above.

* * * * *